US012809334B2

(12) United States Patent
Nemani et al.

(10) Patent No.: US 12,809,334 B2
(45) Date of Patent: Nov. 24, 2026

(54) TWO-TIER PROGNOSTIC MODEL FOR EXPLAINABLE REMAINING USEFUL LIFE PREDICTION

(71) Applicants: Iowa State University Research Foundation, Inc., Ames, IA (US); Percēv LLC, Davenport, IA (US)

(72) Inventors: Venkat Pavan Nemani, Ames, IA (US); Chao Hu, Sudbury, MA (US); Hao Lu, Qingdao (CN); Andrew T. Zimmerman, Bettendorf, IA (US)

(73) Assignees: Iowa State University Research Foundation, Inc., Ames, IA (US); Percev LLC, Davenport, IA (US)

( * ) Notice: Subject to any disclaimer, the term of this patent is extended or adjusted under 35 U.S.C. 154(b) by 402 days.

(21) Appl. No.: 18/540,455

(22) Filed: Dec. 14, 2023

(65) Prior Publication Data

US 2024/0210913 A1 Jun. 27, 2024

Related U.S. Application Data

(60) Provisional application No. 63/387,654, filed on Dec. 15, 2022.

(51) Int. Cl.
*G05B 19/4065* (2006.01)

(52) U.S. Cl.
CPC .................... *G05B 19/4065* (2013.01); *G05B 2219/50185* (2013.01)

(58) Field of Classification Search
None
See application file for complete search history.

(56) References Cited

U.S. PATENT DOCUMENTS

2007/0277613 A1* 12/2007 Iwatsubo ............ G01M 13/045 702/141
2012/0191384 A1* 7/2012 Kalgren ................. G01D 18/00 702/58

FOREIGN PATENT DOCUMENTS

CN 105741005 A * 7/2016

OTHER PUBLICATIONS

Li et al, “An Improved Exponential Model for Predicting Remaining Useful Life of Rolling Element Bearings”, 2015, IEEE, pp. 7762-7772 (Year: 2015).*

(Continued)

*Primary Examiner* — David Earl Ogg
(74) *Attorney, Agent, or Firm* — Goodhue, Coleman & Owens, P.C.

(57) ABSTRACT

A method for predicting remaining useful life for industrial equipment and associated sensor modules are provided. The method includes monitoring machine sensor data for the industrial equipment in an industrial environment using at least one sensor and applying a two-tier model implemented by a computing device by executing a set of instructions from a non-transitory machine readable memory using a processor of the computing device. The two-tier model receives as input sensor data comprising the machine sensor data and applies physics of failure of the industrial equipment to determine a prediction for remaining useful life for the industrial equipment, uncertainty in the prediction for the remaining useful life for the industrial equipment, and an explanation to the prediction for the remaining useful life for the industrial equipment.

26 Claims, 39 Drawing Sheets

(56) References Cited

OTHER PUBLICATIONS

Lipton et al, "Learning to Diagnose With LSTM Recurrent Neural Networks", Mar. 2017, ICLR 2016, pp. 1-10 (Year: 2017).*
Pecht et al, "Introduction to PHM", 2018, Prognostics and Health Management of Electronics: Fundamentals, Machine Learning, and the Internet of Things, pp. 3-18 (Year: 2018).*
Xia et al, "A Two-Stage Approach for the Remaining Useful Life Prediction of Bearings Using Deep Neural Networks", Jun. 2019, IEEE Transactions on Industrial Informatics, vol. 15, No. 6, pp. 3703-3710 (Year: 2019).*
Wang et al, "A Probabilistic Framework for Remaining Useful Life Prediction of Bearings", 2021, IEEE Transactions on Instrumentation and Measurement, vol. 70, pp. 1-12 (Year: 2021).*
OnQ, "Developers: Building smarter edge computing solutions with smart sensors", Jul. 2021, Qualcomm Technologies, pp. 1-3 (Year: 2021).*
Hotait et al, "Intelligent Online Monitoring of Rolling Bearing: Diagnosis and Prognosis", 2021, Entropy, pp. 1-15 (Year: 2021).*
A.Z. Hinchi, M. Tkiouat, Rolling element bearing remaining useful life estimation based on a convolutional long-short-term memory network, Procedia Comput. Sci. 127 (2018) 123-132.
D. Eager, A.-M. Pendrill, N. Reistad, Beyond velocity and acceleration: jerk, snap and higher derivatives, Eur. J. Phys. 37 (6) (2016) 065008.
J. Deutsch, M. He, and D. He, "Remaining Useful Life Prediction of Hybrid Ceramic Bearings Using an Integrated Deep Learning and Particle Filter Approach," Appl. Sci., 7(7), Art. No. 7, Jul. 2017.
J.R. Stack, T.G. Habetler, R.G. Harley, Fault classification and fault signature production for rolling element bearings in electric machines, IEEE Trans. Ind. Appl. 40 (3) (2004) 735-739.
J.Z. Sikorska, M. Hodkiewicz, L. Ma, Prognostic modelling options for remaining useful life estimation by industry, Mech. Syst. Signal Process. 25 (5) (2011) 1803-1836.
K. Liu, Y. Shang, Q. Ouyang, W.D. Widanage, A data-driven approach with uncertainty quantification for predicting future capacities and remaining useful life of lithium-ion battery, IEEE Trans. Ind. Electron. 68 (4) (2021) 3170-3180.
L. Ren, Y. Sun, H. Wang, L. Zhang, Prediction of bearing remaining useful life with deep convolution neural network, IEEE Access 6 (2018) 13041-13049.
L. van der Maaten, G. Hinton, Visualizing Data using t-SNE, J. Mach. Learn. Res. 9 (86) (2008) 2579-2605.
M. Yuan, Y. Wu, L. Lin, Fault diagnosis and remaining useful life estimation of aero engine using LSTM neural network, in: 2016 IEEE International Conference on Aircraft Utility Systems (AUS), 2016, pp. 135-140.
M.S. Arulampalam, S. Maskell, N. Gordon, T. Clapp, A tutorial on particle filters for online nonlinear/non-Gaussian Bayesian tracking, IEEE Trans. Signal Process. 50 (2) (2002) 174-188.
N. Gebraeel, M. Lawley, R. Liu, V. Parmeshwaran, Residual life predictions from vibration-based degradation signals: a neural network approach, IEEE Trans. Ind. Electron. 51 (3) (2004) 694-700.
N. Li, Y. Lei, J. Lin, S.X. Ding, An improved exponential model for predicting remaining useful life of rolling element bearings, IEEE Trans. Ind. Electron. 62 (12) (2015) 7762-7773.
N.J. Gordon, D.J. Salmond, A.F.M. Smith, Novel approach to nonlinear/non-Gaussian Bayesian state estimation, IEE Proc. F Radar Signal Process. 140 (2) (Apr. 1993) 107-113.
N.Q.K. Le, Q.-T. Ho, E.K.Y. Yapp, Y.-Y. Ou, H.-Y. Yeh, DeepETC: A deep convolutional neural network architecture for investigating and classifying electron transport chain's complexes, Neurocomputing 375 (2020) 71-79.
P. Wang, B.D. Youn, C. Hu, A generic probabilistic framework for structural health prognostics and uncertainty management, Mech. Syst. Signal Process. 28 (2012) 622-637.
R. Huang, L. Xi, X. Li, C. Richard Liu, H. Qiu, and J. Lee, "Residual life predictions for ball bearings based on self-organizing map and back propagation neural network methods," Mech. Syst. Signal Process., 21(1), pp. 193-207, Jan. 2007.
T. Li, M. Bolic, P.M. Djuric, Resampling methods for particle filtering: classification, implementation, and strategies, IEEE Signal Process. Mag. 32(3) (2015) 70-86.
T.H. Loutas, D. Roulias, G. Georgoulas, Remaining useful life estimation in rolling bearings utilizing data-driven probabilistic E-support vectors regression, IEEE Trans. Reliab. 62 (4) (2013) 821-832.
W. Mao, J. He, J. Tang, and Y. Li, "Predicting remaining useful life of rolling bearings based on deep feature representation and long short-term memory neural network," Adv. Mech. Eng. 2018, 10(12) 1-18.
Y. Qian, R. Yan, Remaining useful life prediction of rolling bearings using an enhanced particle filter, IEEE Trans. Instrum. Meas. 64 (10) (Oct. 2015) 2696-2707.
Y. Qian, R. Yan, S. Hu, Bearing degradation evaluation using recurrence quantification analysis and Kalman filter, IEEE Trans. Instrum. Meas. 63 (11) (2014) 2599-2610.
Y. Yoo and J.-G. Baek, "A Novel Image Feature for the Remaining Useful Lifetime Prediction of Bearings Based on Continuous Wavelet Transform and Convolutional Neural Network," Appl. Sci., 8(7), Art. No. 7, Jul. 2018, 17 pages.
A. Muetze, E.G. Strangas, The useful life of inverter-based drive bearings: methods and research directions from localized maintenance to prognosis, IEEE Ind. Appl. Mag. 22 (4) (2016) 63-73.
A. Saxena et al., "Metrics for evaluating performance of prognostic techniques," in 2008 International Conference on Prognostics and Health Management, Oct. 2008, pp. 1-17.
A. Soualhi, K. Medjaher, N. Zerhouni, Bearing health monitoring based on Hilbert-Huang transform, support vector machine, and regression, IEEE Trans. Instrum. Meas. 64 (1) (2015) 52-62.
B. Lakshminarayanan, A. Pritzel, C. Blundell, Simple and scalable predictive uncertainty estimation using deep ensembles, Adv. Neural Inf. Process. Syst. 30 (2017) 6402-6413.
B. Wang, Y. Lei, N. Li, and J. Lin, "An improved fusion prognostics method for remaining useful life prediction of bearings," in: 2017 IEEE International Conference on Prognostics and Health Management (ICPHM), Jun. 2017, pp. 18-24.
B. Wang, Y. Lei, N. Li, N. Li, A hybrid prognostics approach for estimating remaining useful life of rolling element bearings, IEEE Trans. Reliab. 69 (1) (2020) 401-412.
B. Wang, Y. Lei, N. Li, T. Yan, Deep separable convolutional network for remaining useful life prediction of machinery, Mech. Syst. Signal Process. 134 (2019) 106330.
B. Wang, Y. Lei, T. Yan, N. Li, L. Guo, Recurrent convolutional neural network: A new framework for remaining useful life prediction of machinery, Neurocomputing 379 (2020) 117-129.
C. Anger, R. Schrader, and U. Klingauf, "Unscented Kalman filter with gaussian process degradation model for bearing fault prognosis," 2012, 12 pages.
C. Hu, B. D. Youn, and P. Wang, "Time-Dependent Reliability Analysis in Operation: Prognostics and Health Management," in: C. Hu, B. D. Youn, and P. Wang, (Eds.) Engineering Design under Uncertainty and Health Prognostics, Cham: Springer International Publishing, 2019, pp. 233-301.
C. Hu, B. D. Youn, P. Wang, and J. Taek Yoon, "Ensemble of data-driven prognostic algorithms for robust prediction of remaining useful life," Reliab. Eng. Syst. Saf., vol. 103, pp. 120-135, Jul. 2012.
C. Hu, G. Jain, P. Tamirisa, T. Gorka, Method for estimating capacity and predicting remaining useful life of lithium-ion battery, Appl. Energy 126 (2014) 182-189.
C. Hu, H. Ye, G. Jain, C. Schmidt, Remaining useful life assessment of lithium-ion batteries in implantable medical devices, J. Power Sources 375 (2018) 118-130.
C.-G. Huang, H.-Z. Huang, Y.-F. Li, A bidirectional LSTM prognostics method under multiple operational conditions, IEEE Trans. Ind. Electron. 66 (11) (2019) 8792-8802.
D. Roman, S. Saxena, V. Robu, M. Pecht, and D. Flynn, "Machine learning pipeline for battery state-of-health estimation," Nat. Mach. Intell., 3(5), Art. No. 5, May 2021.
D. Wang, K. Tsui, Statistical modeling of bearing degradation signals, IEEE Trans. Reliab. 66 (4) (2017) 1331-1344.

(56) References Cited

OTHER PUBLICATIONS

F. Di Maio, K.L. Tsui, E. Zio, Combining Relevance Vector Machines and exponential regression for bearing residual life estimation, Mech. Syst. Signal Process. 31 (2012) 405-427.
F. O. Heimes, "Recurrent neural networks for remaining useful life estimation," in 2008 International Conference on Prognostics and Health Management, Oct. 2008, pp. 1-6.
G.G. Rigatos, Particle filtering for state estimation in nonlinear industrial systems, IEEE Trans. Instrum. Meas. 58 (11) (2009) 3885-3900.
J. Gu et al., "Recent Advances in Convolutional Neural Networks," ArXiv151207108 Cs, Oct. 2017, Accessed: Dec. 31, 2020.
J. Wu, C. Wu, S. Cao, S.W. Or, C. Deng, X. Shao, Degradation data-driven timeto-failure prognostics approach for rolling element bearings in electrical machines, IEEE Trans. Ind. Electron. 66 (1) (2019) 529-539.
J.N. Sua, S.Y. Lim, M.H. Yulius, X. Su, E.K.Y. Yapp, N.Q.K. Le, H.-Y. Yeh, M.C.H. Chua, Incorporating convolutional neural networks and sequence graph transform for identifying multilabel protein Lysine PTM sites, Chemom. Intell. Lab. Syst. 206 (2020) 104171.
L. Cui, X. Wang, Y. Xu, H. Jiang, J. Zhou, A novel Switching Unscented Kalman Filter method for remaining useful life prediction of rolling bearing, Measurement 135 (2019) 678-684.
L. Guo, N. Li, F. Jia, Y. Lei, J. Lin, A recurrent neural network based health indicator for remaining useful life prediction of bearings, Neurocomputing 240 (2017) 98-109.
L. Liao, Discovering prognostic features using genetic programming in remaining useful life prediction, IEEE Trans. Ind. Electron. 61 (5) (2014) 2464-2472.
M. Behzad, H.A. Arghan, A.R. Bastami, M.J. Zuo, Prognostics of rolling element bearings with the combination of Paris law and reliability method, in: 2017 Prognostics an System Health Management Conference (PHM-Harbin), 2017, pp. 1-6.
M. Kordestani, M. Saif, M.E. Orchard, R. Razavi-Far, K. Khorasani, Failure prognosis and applications—a survey of recent literature, IEEE Trans. Reliab. 70 (2) (2021) 728-748.
M. Sadoughi, C. Hu, Physics-based convolutional neural network for fault diagnosis of rolling element bearings, IEEE Sens. J. 19 (11) (2019) 4181-4192.
M.D. McKay, R.J. Beckman, W.J. Conover, A comparison of three methods for selecting values of input variables in the analysis of output from a computer code, Technometrics 21 (2) (1979) 239-245.
N. Henmi, S. Takeuchi, New method using piezoelectric jerk sensor to detect rolling bearing failure, Int. J. Autom. Technol. 7 (5) (2013) 550-557.
P. Malhotra et al., "Multi-Sensor Prognostics using an Unsupervised Health Index based on LSTM Encoder-Decoder," ArXiv160806154 Cs, Aug. 2016, 10 pages.
R.K. Singleton, E.G. Strangas, S. Aviyente, Extended Kalman Filtering for Remaining-Useful-Life Estimation of Bearings, IEEE Trans. Ind. Electron. 62 (3) (2015) 1781-1790.
S. Fort, H. Hu, and B. Lakshminarayanan, "Deep Ensembles: A Loss Landscape Perspective," ArXiv191202757 Cs Stat, Jun. 2020, Accessed: Jun. 17, 2021.
S. Shen, H. Lu, M. Sadoughi, C. Hu, V. Nemani, A. Thelen, K. Webster, M. Darr, J. Sidon, S. Kenny, A physics-informed deep learning approach for bearing fault detection, Eng. Appl. Artif. Intell. 103 (2021) 104295.
S. Wu, Y. Jiang, H. Luo, S. Yin, Remaining useful life prediction for ion etching machine cooling system using deep recurrent neural network-based approaches, Control Eng. Pract. 109 (2021) 104748.
S.A. McInerny, Y. Dai, Basic vibration signal processing for bearing fault detection, IEEE Trans. Educ. 46 (1) (2003) 149-156.
T. Benkedjouh, K. Medjaher, N. Zerhouni, S. Rechak, Remaining useful life estimation based on nonlinear feature reduction and support vector regression, Eng. Appl. Artif. Intell. 26 (7) (2013) 1751-1760.
T. Wang, Jianbo Yu, D. Siegel, and J. Lee, "A similarity-based prognostics approach for Remaining Useful Life estimation of engineered systems," in: 2008 International Conference on Prognostics and Health Management, Oct. 2008, pp. 1-6.
T.e. Han, C. Liu, R. Wu, D. Jiang, Deep transfer learning with limited data for machinery fault diagnosis, Appl. Soft Comput. 103 (2021) 107150.
W. Peng, Z.-S. Ye, N. Chen, Bayesian Deep-Learning-Based Health Prognostics Toward Prognostics Uncertainty, IEEE Trans. Ind. Electron. 67 (3) (2020) 2283-2293.
W. Qian, S. Li, P. Yi, K. Zhang, A novel transfer learning method for robust fault diagnosis of rotating machines under variable working conditions, Measurement 138 (2019) 514-525.
X. Jin, Y.i. Sun, Z. Que, Y. Wang, T. W.S. Chow, Anomaly Detection and Fault Prognosis, IEEE Trans. Ind. Appl. 65 (9) (2016) 2046-2054.
X. Jin, Z. Que, Y.i. Sun, Y. Guo, W. Qiao, A data-driven approach for bearing fault prognostics, IEEE Trans. Ind. Appl. 55 (4) (2019) 3394-3401.
X. Li, W. Zhang, Q. Ding, Deep learning-based remaining useful life estimation of bearings using multi-scale feature extraction, Reliab. Eng. Syst. Saf. 182 (2019) 208-218.
Y. Chang, H. Fang, A hybrid prognostic method for system degradation based on particle filter and relevance vector machine, Reliab. Eng. Syst. Saf. 186 (Jun. 2019) 51-63.
Y. Chang, H. Fang, Y. Zhang, A new hybrid method for the prediction of the remaining useful life of a lithium-ion battery, Appl. Energy 206 (2017) 1564-1578.
Y. Gal and Z. Ghahramani, "Dropout as a Bayesian Approximation: Representing Model Uncertainty in Deep Learning," in International Conference on Machine Learning, Jun. 2016, pp. 1050-1059.
Y. Jiang, S. Yin, J. Dong, O. Kaynak, A review on soft sensors for monitoring, control, and optimization of industrial processes, IEEE Sens. J. 21 (11) (2021) 12868-12881.
Y. LeCun, Y. Bengio, and G. Hinton, "Deep learning," Nature, 521(7553), Art. No. 7553, May 2015, doi: 10.1038/nature14539.
Y. Lei, N. Li, L. Guo, N. Li, T. Yan, J. Lin, Machinery health prognostics: a systematic review from data acquisition to RUL prediction, Mech. Syst. Signal Process. 104 (2018) 799-834.
Y. Qian, R. Yan, R.X. Gao, A multi-time scale approach to remaining useful life prediction in rolling bearing, Mech. Syst. Signal Process. 83 (2017) 549-567.
Y. Wang, Y. Peng, Y. Zi, X. Jin, K. Tsui, A two-stage data-driven-based prognostic approach for bearing degradation problem, IEEE Trans. Ind. Inform. 12 (3) (2016) 924-932.

* cited by examiner

Table 1
Architecture of a PLSTM network with Gaussian layer.

| Layer | Output shape | # Parameters |
|---|---|---|
| Input | (Sample,20,1) | 0 |
| LSTM | (Sample,60) | 14,880 |
| Dense | (Sample,20) | 1,220 |
| Gaussian | [(Sample,1), (Sample,1)] | 42 |
| Total: | | 16,142 |

FIG. 16

Table 2
Architecture of a CLSTM model with Gaussian layer.

| Layer | Output shape | # Parameters |
|---|---|---|
| Input | (Sample,20,2) | 0 |
| LSTM | (Sample,80) | 26,560 |
| Dense | (Sample,20) | 1,620 |
| Gaussian | [(Sample,1), (Sample,1)] | 42 |
| Total: | | 28,222 |

FIG. 17

Table 3

Algorithm for the proposed predictor-corrector LSTM model for bearing prognostics

Algorithm: Probabilistic RUL prediction for bearing prognostics (test dataset)

Inputs: Accelerometer vibration signal a(t) over the past k time steps

Lookback time k: 20 time steps

Cutoff: 0.3 ips

M= 5 trained PLSTMs an CLSTMs

Output: Probabilistic remaining useful life RUL ($\mu_{final}, \sigma_{final}$) at time t 1. Calculate the velocity vibration $v(t) = \int_0^t a(t)dt$ and the corresponding FFT in frequency domain v(f), calculate $V^{RMS}_{BFF=sf/2}$ and $V^{RMS}_{0.2\omega=sf/2}(t)$ <u>Predictor LSTM model</u>

2. Reshape input feature $F= V^{RMS}_{0.2\omega=sf/2}(t-k+1 \rightarrow t)$ into shape $X_p$ =(1,lookback,1). The input sample at a given time t is of the form $F(t-k+1 \rightarrow t)$ with the corresponding output will be F(t+1)
3. Use $V^{RMS}_{BFF=sf/2}(t)$ in eq.(B1) to determine FPT is reached. Proceed if $t \geq t_{FPT}$
4. for each PLSTM m= 1:M
5. Initialize: forcast time $t^f$+1, f= F(t)
6. While (f≤ 0.3ips)
7. Next step prediction: (f, $\sigma_t$)= PLSTM($X_p$)
8. Modify X = concatenate(X, f)
9. Update X =X $(t+t^f-k+1 \rightarrow t+t^f)$
10. $t^f = t^f + 1$
11. end while
12. $\mu^{RUL}_m(t) + t^f$. Calculate aleatoric uncertainty $\sigma^{RUL}_m(t)$ using $\sigma_f$
13. end for (line 7)
14. calculate assemble mean and variance RUL($\mu_{.p}, \mu_{.p}$) as $\mu_{.p}(t) = 1/M\sum_{m-1}^{M} \mu^{RUL}_m(t)$ and $\sigma^2_{,p}(t) = 1/M\sum_{m-1}^{M} (\sigma^{RUL2}_m(t) + \mu^2_p(t)$ This is the final output on EnPLSTM.

FIG. 18 Continued.

Corrector LSTM model

15. Reshape input features $V^{RMS}_{0.2\omega=sf/2}(t\text{-}k+1 \rightarrow t)$ and RUL μ.p(t-k+1→t) Into shape Xc -(1, lookback, 2 )

16.6. Determine the error correction ΔRUL(μc, σc)=CLSTM(Xc) for each CLTM and calculate assemble correction ΔRUL(μc, σc) similar to line 14.

17.7. Calculate the final RUL prediction using Eq. (15).

18.8. Temporal Fusion: Use Eq. (17) for smoothing the RUL prediction.

FIG. 18

Table 4
Summary of bearings from XJTU-SY dataset [29]

| Operating Condition | Bearing ID | Rotating Speed (rpm) | Radial Force (kN) |
|---|---|---|---|
| Condition (1) | Bearing 1_1, Bearing 1_2, Bearing 1_3, Bearing 1_4, Bearing 1_5 | 2100 | 12 |
| Condition (2) | Bearing 2_1, Bearing 2_2, Bearing 2_3, Bearing 2_4, Bearing 2_5 | 2250 | 11 |
| Condition (3) | Bearing 3_1, Bearing 3_2, Bearing 3_3, Bearing 3_4, Bearing 3_5 | 2400 | 10 |

FIG. 19

Table 5
Evaluation metrics for various probabilistic models

| | RMSE (min) | wt RMSE (min) | α -accuracy% | β -probability | PEP% | NLL |
|---|---|---|---|---|---|---|
| Particle Filter | 34.0 ± 8.9 | 3.1 ± 0.6 | 15.2 ± 3.4 | 0.13 ± 0.04 | 60.8 ± 14.5 | 22.0 ± 10.5 |
| MC Dropout | 31.8 ± 10.5 | 3.6 ± 2.3 | 23.9 ± 10.1 | 0.20 ± 0.11 | 35.5 ± 16.4 | 4.8 ± 1.4 |
| PLSTM | 23.7 ± 9.2 | 1.8 ± 0.6 | 22.4 ± 15.1 | 0.24 ± 0.11 | 68.3 ± 11.6 | 7.5 ± 2.1 |
| EnPLSTM | 21.2 ± 7.8 | 1.6 ± 0.5 | 26.6 ± 8.1 | 0.27 ± 0.09 | 68.3 ± 14.4 | 6.3 ± 1.9 |
| EnP/CLSTM | 15.9 ± 5.2 | 1.4 ± 1.2 | 46.1 ± 14.0 | 0.35 ± 0.10 | 62.4 ± 10.7 | 3.8 ± 1.3 |

FIG. 20

Table 6

| B ID | FPT (min) | EOL (min) | ΔT (min) | RMSE Quadratic | Similarity | CNN-RUL | PF | MC Dropout | PLSTM | EnPLSTM | ENP/CLSTM |
|---|---|---|---|---|---|---|---|---|---|---|---|
| 1_1 | 79 | 121 | 43 | 13.5 | 13.8 | 7.5 | 20.1 | 29.2 | 13.0 | 13.0 | 10.9 |
| 12 | 55 | 96 | 42 | 17.9 | 8.7 | 8.5 | 17.1 | 10.3 | 12.0 | 12.0 | 12.4 |
| 13 | 60 | 150 | 91 | 91.6 | 26.9 | 23.3 | 39.4 | 25.8 | 23.5 | 23.5 | 12.2 |
| 15 | 26 | 41 | 16 | 128.8 | 62.3 | 40.2 | 14.0 | 27.8 | 14.1 | 14.1 | 29.4 |
| 21 | 456 | 489 | 34 | 12.1 | 19.7 | 16.5 | 16.2 | 90.0 | 6.0 | 5.9 | 6.9 |
| 22 | 50 | 154 | 105 | 53.8 | 28.0 | 33.4 | 47.3 | 36.2 | 34.0 | 34.0 | 33.0 |
| 2_3 | 316 | 398 | 83 | 15.2 | 19.0 | 20.8 | 30.1 | 24.7 | 14.1 | 14.1 | 11.1 |
| 2_4 | 32 | 35 | 4 | 10.7 | 18.5 | 45.9 | 4.6 | 29.9 | 7.7 | 7.7 | 8.1 |
| 25 | 123 | 199 | 77 | 42.7 | 20.5 | 33.6 | 38.4 | 15.8 | 16.5 | 16.4 | 11.3 |
| 3_1 | 2404 | 2527 | 124 | 62.4 | 32.7 | 36.9 | 56.4 | 38.0 | 39.8 | 39.8 | 26.0 |
| 3_2 | 2450 | 2495 | 46 | 22.5 | 16.7 | 7.8 | 21.5 | 8.8 | 12.1 | 12.1 | 3.7 |
| 3 3 | 343 | 352 | 10 | 31.8 | 25.6 | 41.4 | 4.9 | 35.2 | 8.4 | 8.4 | 7.9 |
| 3_4 | 1420 | 1479 | 60 | 19.9 | 17.3 | 23.3 | 17.2 | 48.4 | 4.6 | 4.0 | 5.2 |
| 3_5# | 8(20) | 25 | 6 | 3.3 | 21.0 | 1.2 | 7.9 | 46.9 | 5.5 | 5.5 | 5.8 |
| Net | | | 74 | 44.1 | 23.6 | 25.3 | 34.4 | 31.6 | 21.0 | 20.9 | 16.1 |

FIG. 21A

| B | FPT | EOL | ΔT | wtRMSE | | | | | | | |
|---|---|---|---|---|---|---|---|---|---|---|---|
| ID | (min) | (min) | (min) | Quadratic | Similarity | CNN -RUL | PF | MC Dropout | PLSTM | EnPLSTM | ENP/CLSTM |
| 1_1 | 79 | 121 | 43 | 1.6 | 1.7 | 1.1 | 2.6 | 4.4 | 1.4 | 1.4 | 1.5 |
| 12 | 55 | 96 | 42 | 1.9 | 1.4 | 1.2 | 2.1 | 1.5 | 1.5 | 1.5 | 1.7 |
| 1_3 | 60 | 150 | 91 | 10.7 | 2.7 | 2.9 | 3.3 | 3.1 | 1.6 | 1.6 | 1.0 |
| 1_5 | 26 | 41 | 16 | 19.2 | 14.2 | 10.0 | 3.1 | 5.5 | 3.6 | 3.6 | 6.2 |
| 2_1 | 456 | 489 | 34 | 1.0 | 2.4 | 2.7 | 2.7 | 11.4 | 0.8 | 0.8 | 0.9 |
| 2_2 | 50 | 154 | 105 | 6.3 | 1.9 | 2.6 | 3.2 | 2.5 | 2.3 | 2.3 | 2.5 |
| 2_3 | 316 | 398 | 83 | 1.4 | 1.6 | 1.5 | 2.5 | 2.0 | 1.2 | 1.2 | 1.0 |
| 2_4 | 32 | 35 | 4 | 3.2 | 5.8 | 13.71 | .7 | 8.4 | 2.2 | 2.2 | 2.1 |
| 2_5 | 123 | 199 | 77 | 4.8 | 2.6 | 4.0 | 4.1 | 1.0 | 1.1 | 1.1 | 0.8 |
| 3_1 | 2404 | 2527 | 124 | 5.2 | 2.1 | 2.0 | 4.4 | 3.8 | 2.3 | 2.3 | 1.4 |
| 3_2 | 2450 | 2495 | 46 | 1.6 | 1.4 | 0.8 | 2.9 | 1.0 | 1.2 | 1.2 | 0.4 |
| 3_3 | 343 | 352 | 10 | 3.2 | 4.0 | 8.3 | 1.5 | 10.4 | 2.1 | 2.1 | 1.8 |
| 3_4 | 1420 | 1479 | 60 | 2.0 | 1.6 | 2.7 | 1.8 | 4.8 | 0.5 | 0.5 | 0.6 |
| 3_5# | 8(20) | 25 | 6# | 2.4 | 7.4 | 0.6 | 1.4 | 15.2 | 2.6 | 2.6 | 2.6 |
| Net | | | 7414.7 | 2.3 | | 2.6 | 3.1 | 3.5 | 1.6 | 1.6 | 1.4 |

FIG. 21B

TWO-TIER PROGNOSTIC MODEL FOR EXPLAINABLE REMAINING USEFUL LIFE PREDICTION

RELATED APPLICATIONS

This application claims priority to U.S. Provisional Patent Application No. 63/387,654, filed Dec. 15, 2022, hereby incorporated by reference in its entirety.

STATEMENT OF GOVERNMENT SUPPORT

This invention was made with Government support under grant/contract no. IIP2036044 awarded by the National Science Foundation. The government has certain rights in this invention.

FIELD OF THE INVENTION

The present disclosure relates to predicting remaining useful life of industrial equipment. More particularly, but not exclusively, the present disclosure relates to a model for producing an explainable remaining useful life prediction.

BACKGROUND

Machines are subject to failure. Industrial machines in the industrial environment are subject to failure which may create permanent damage to the equipment, compromise worker safety, or cause delays during repair or replacement. One way to avoid such costs is to perform maintenance prior to failure, but this requires being able to predict when failure will occur. Therefore, various attempts at predicting industrial equipment failure have been made. To date, such attempts have generally not been accurate, and there have been various problems preventing failure prediction from being accurate as will be further discussed here. Moreover, predictive maintenance technologies are often distrusted as most attempts are presented as "black box" type predictions without context. Furthermore, where predictions are too conservative, they cause unnecessary maintenance which may increase costs and increase downtime. Yet aggressive predictions do not always prevent downtime.

Therefore, what is needed are new and improved methods, apparatus, and systems for predicting remaining useful life of industrial equipment.

SUMMARY

Therefore, it is a primary object feature, or advantage of the present disclosure to improve over the state of the art.

It is a further object, feature, or advantage of the present disclosure to provide effective failure prediction in industrial equipment to reduce downtime.

It is a still further object, feature, or advantage of the present disclosure to minimize repair costs in industrial equipment.

Another object, feature, or advantage of the present disclosure to increase worker safety.

Yet another object, feature, or advantage of the present disclosure is to provide methods and systems for preventative maintenance that do not require large training datasets which are difficult if not impossible to generate.

A further object, feature, or advantage is to provide context alongside failure predictions.

A still further object, feature, or advantage is to provide failure predictions which are considered trustworthy.

Another object, feature, or advantage is to avoid conservative predictions which cause unnecessary maintenance.

Yet another object, feature, or advantage is to avoid overly aggressive predictions which do not always prevent downtime.

A further object, feature of advantage is to use physics-inspired models to allow for predictions to be made with either reduced or non-existent training datasets.

A still further object, feature, or advantage is to provide risk-based or probabilistic predictions which allows users to leverage context to make better decisions.

Another object, feature, or advantage is to provide explainable or "non-black-box" predictions which assist users in interpreting predictions without their own intuition such as to assist them in answering, "Why a certain prediction is made" and/or "What triggered this failure mode".

Yet another object, feature, or advantage is to provide an approach that may be applied to any complex piece of industrial equipment including rolling element bearings.

A still further object, feature, or advantage is to provide methods that me applied within Industrial Internet-of-Things (IIoT) devices.

Another object, feature, or advantage is to provide methods which use deep learning (DL) to predict failures without requiring heavy computing resources.

Yet another object, feature, or advantage is to provide methods which may be used in embedded systems such as in self-contained sensor units which may be battery powered.

One or more of these and/or other objects, features, or advantages of the present disclosure will become apparent from the specification and claims that follow. No single aspect need provide each and every object, feature, or advantage. Different aspects may have different objects, features, or advantages. Therefore, the present disclosure is not to be limited to or by any objects, features, or advantages stated herein.

According to one aspect, methods and systems are provided for predicting the remaining useful life of bearings thereby enabling the user to schedule appropriate maintenance in rotating industrial equipment, reducing machine downtime and ensuring user safety. Rotating machine vibration data is highly non-linear and contains a significant amount of noise, restricting the prediction accuracy of purely vibration data-driven prediction methods. By including the physics of bearing failure in our prediction method, we not only enhance the prediction accuracy but are also able to gain user trust by justifying why a certain prediction is made. Obtaining this trust is a major challenge for most black-box deep learning models.

The method may build a framework using a physics-based deep learning method to enable risk-based maintenance of rolling element bearings which are key components in rotating machinery. The framework may use machine vibration data, shaft rotation speed, and loading conditions to predict the remaining life of bearings. This aspect may provide (1) a two-tier explanation to the remaining useful life predictions based on the importance of events during bearing operation while focusing on the physics-based characteristic frequencies of bearing failure, (2) providing uncertainty in remaining useful life predictions to enable risk-based maintenance, and (3) using simple, lightweight models that can scale well.

According to another aspect, probabilistic prediction of the remaining useful life (RUL) of bearings is recognized to be critically important, especially in an industrial setting where unplanned maintenance needs, unscheduled equipment downtime, or catastrophic failures can cost a company millions of dollars and threaten worker safety. Current research in the field of bearing prognostics clearly shows the advantage of a deep learning-based solution, but the reliability of purely data-driven predictions is questionable in harsh industrial environments with varying operational conditions.

To make this work industrially relevant, ISO guidelines may be adopted to determine bearing failure thresholds (specifically ISO 10816), which are defined in the velocity domain, while considering characteristic bearing fault frequencies defined by the geometry of each bearing. A two-stage Long Short-Term Memory (LSTM) model ensemble may be used which includes: (1) a predictor step to forecast and (2) a corrector step to offset the RUL prediction. Each LSTM model within the ensemble may be customized to include a Gaussian layer that captures the aleatoric uncertainty in the forecasted parameter, and the ensemble of all the individual LSTM models provides the epistemic uncertainty in the RUL prediction.

According to another aspect, a method for predicting remaining useful life for industrial equipment is provided. The method includes monitoring machine sensor data for industrial equipment in an industrial environment using at least one sensor and applying a two-tier model implemented by a computing device by executing a set of instructions from a non-transitory machine-readable memory using a processor of the computing device. The two-tier model receives as input sensor data comprising the machine sensor data and applies physics of failure of the industrial equipment to determine a prediction for remaining useful life for the industrial equipment, uncertainty in the prediction for the remaining useful life for the industrial equipment, and an explanation to the prediction for the remaining useful life for the industrial equipment. The two-tier model may include both a forecast tier and a classification tier. The explanation of the remaining useful life prediction for the industrial equipment may be based on events occurring during operation of the industrial equipment in the industrial environment as well as physics-based characterizations of industrial equipment failure. The physics-based characterizations of the industrial equipment failure may be physics-based characteristic frequencies of failure. The industrial equipment may include a bearing such as a rolling element bearing. The sensor data may further include shaft rotation speed and loading conditions associated with the rolling element bearing. The two-tier model may include a physics-based deep learning method. The two-tier model may be an ensemble model. The model may be a two-stage Long Short-Term Memory (LSTM) model ensemble. The machine sensor data may include vibration data and the at least one sensor may include an accelerometer. A sensor module may be configured for performing the method. The sensor module may include a battery disposed within a housing along with the memory and the computing device and the sensor module may be powered by the battery.

According to another aspect, a sensor module for predicting remaining useful life for industrial equipment in an industrial environment is provided. The sensor module includes a sensor housing, a processor disposed within the sensor housing, at least one sensor for sensing machine data for the industrial equipment, the at least one sensor operatively connected to the processor. The processor is configured to apply a model which receives as input sensor data including the machine data and applies physics of failure of the industrial equipment to determine a prediction for remaining useful life for the industrial equipment, uncertainty in the prediction for the remaining useful life for the industrial equipment, and an explanation to the prediction for the remaining useful life for the industrial equipment. The model may be a two-tier model including a forecast tier and a classification tier. The model may include a physics-based deep learning method. The model may be a two-stage Long Short-Term Memory (LSTM) model ensemble. The industrial equipment may include a bearing such as a rolling element bearing. The sensor data may further include shaft rotation speed and loading conditions associated with the rolling element bearing. The machine data may include vibration data. The at least one sensor may include at least one accelerometer for sensing vibration data. The sensor module may further include a network interface operatively connected to the processor and wherein the sensor module is configured to communicate output from the model through the network interface. The network interface may be a wireless network interface. The sensor module may further include a battery disposed within the sensor housing and the sensor module may be powered by the battery.

According to another aspect, a method for predicting remaining useful life for industrial equipment is provided. The method includes monitoring machine sensor data for the industrial equipment in an industrial environment using at least one sensor module comprising a computing device having a non-transitory machine readable memory, at least one sensor and a processor. The method further includes applying a two-tier model implemented by the computing device by executing a set of instructions from a non-transitory machine readable memory using a processor of the computing device of the sensor module, wherein the two-tier model receives as input sensor data comprising the machine sensor data and applies physics of failure of the industrial equipment to determine output comprising a prediction for remaining useful life for the industrial equipment, uncertainty in the prediction for the remaining useful life for the industrial equipment, and an explanation to the prediction for the remaining useful life for the industrial equipment. The method further includes communicating the output from the at least one sensor module to a computer having a user interface for conveying the output to a user. The at least one sensor may include at least one accelerometer for sensing machine vibration data.

BRIEF DESCRIPTION OF THE DRAWINGS

Illustrated aspects of the disclosure are described in detail below with reference to the attached drawing figures, which are incorporated by reference herein.

for Bearing 1_1 in the x-direction. FPT, EOL and $2\sigma_{V^{RMS}}$ are also plotted.

Figure 7A:
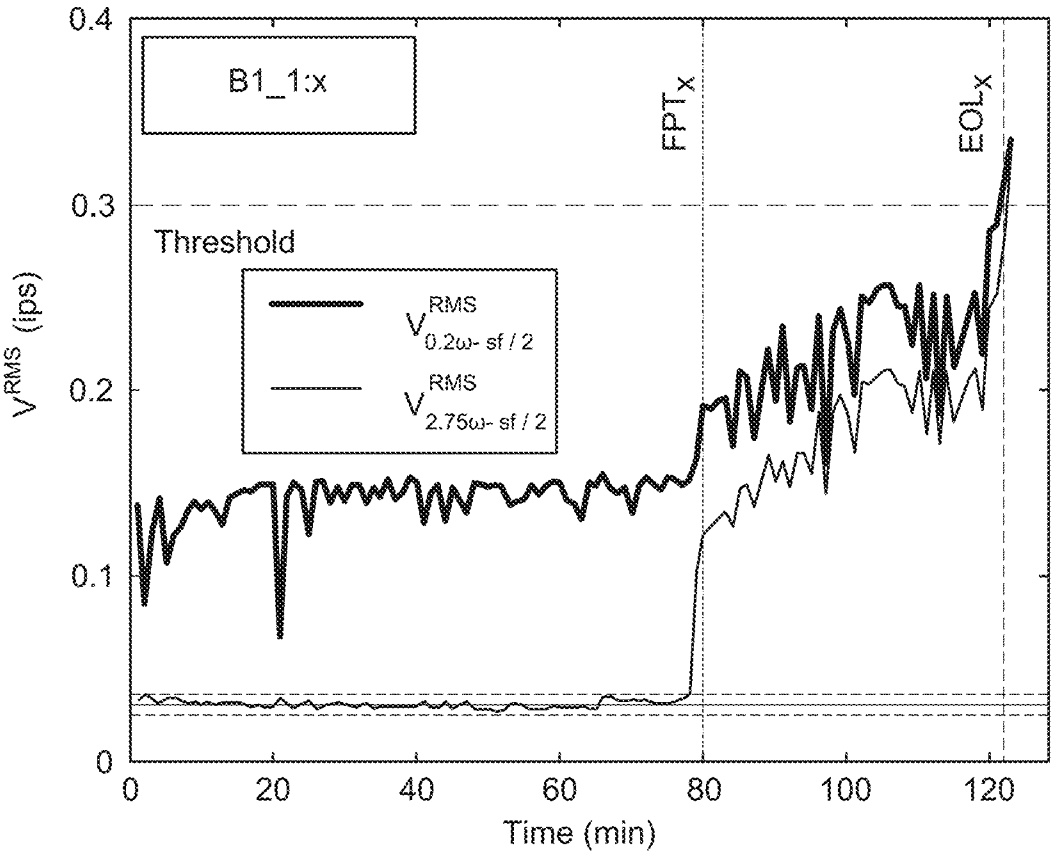
FIG. 7A illustrates development of feature $$V^{RMS}_{0.2\omega-sf/2} \text{ and } V^{RMS}_{2.75\omega-sf/2}$$
Figure 7B:
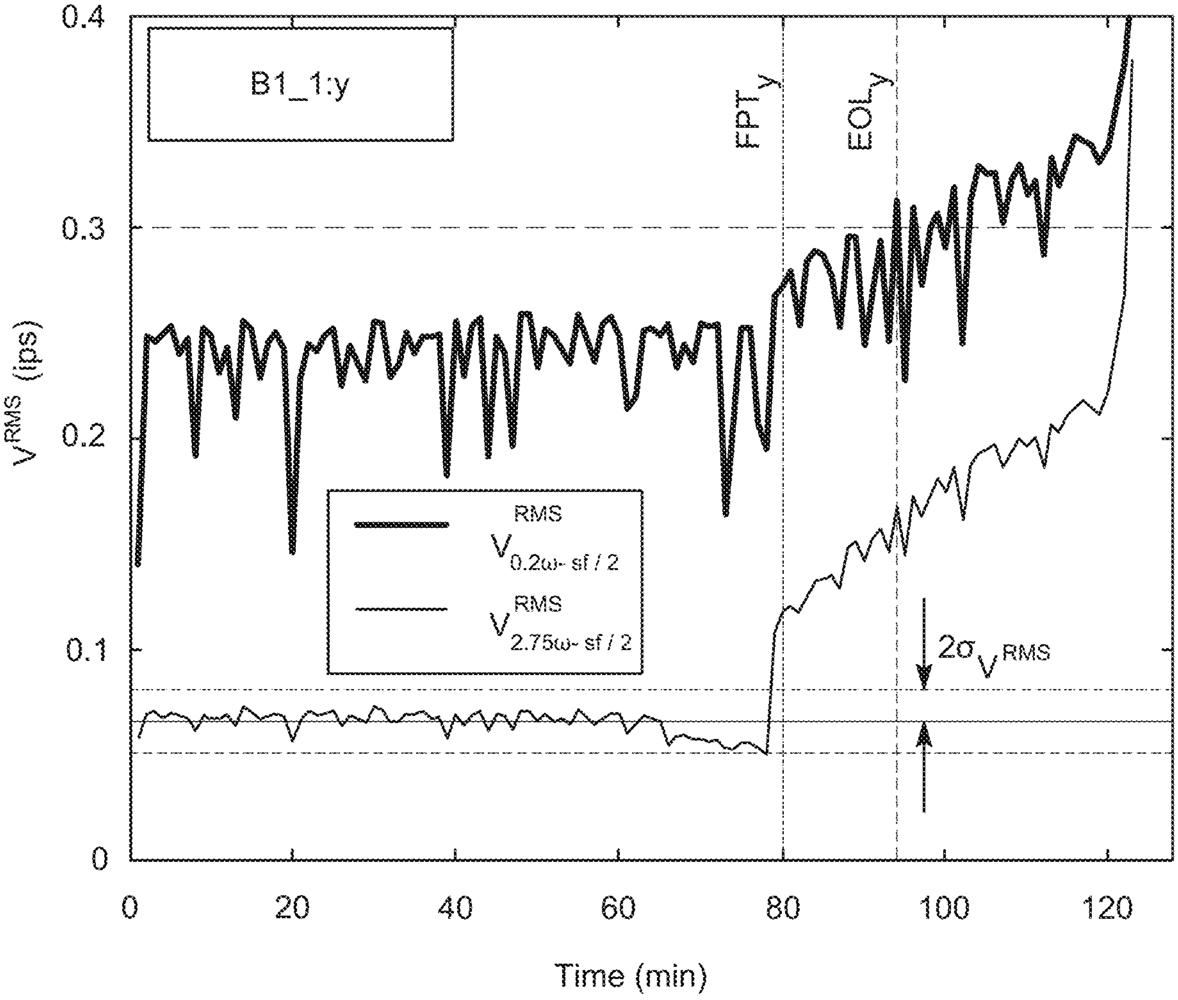

FIG. 7B illustrates development of feature $$V^{RMS}_{0.2\omega-sf/2} \text{ and } V^{RMS}_{2.75\omega-sf/2}$$

for Bearing 1_1 in the y-direction. FPT, EOL and $2\sigma_{V^{RMS}}$ are also plotted.

Figure 7C:
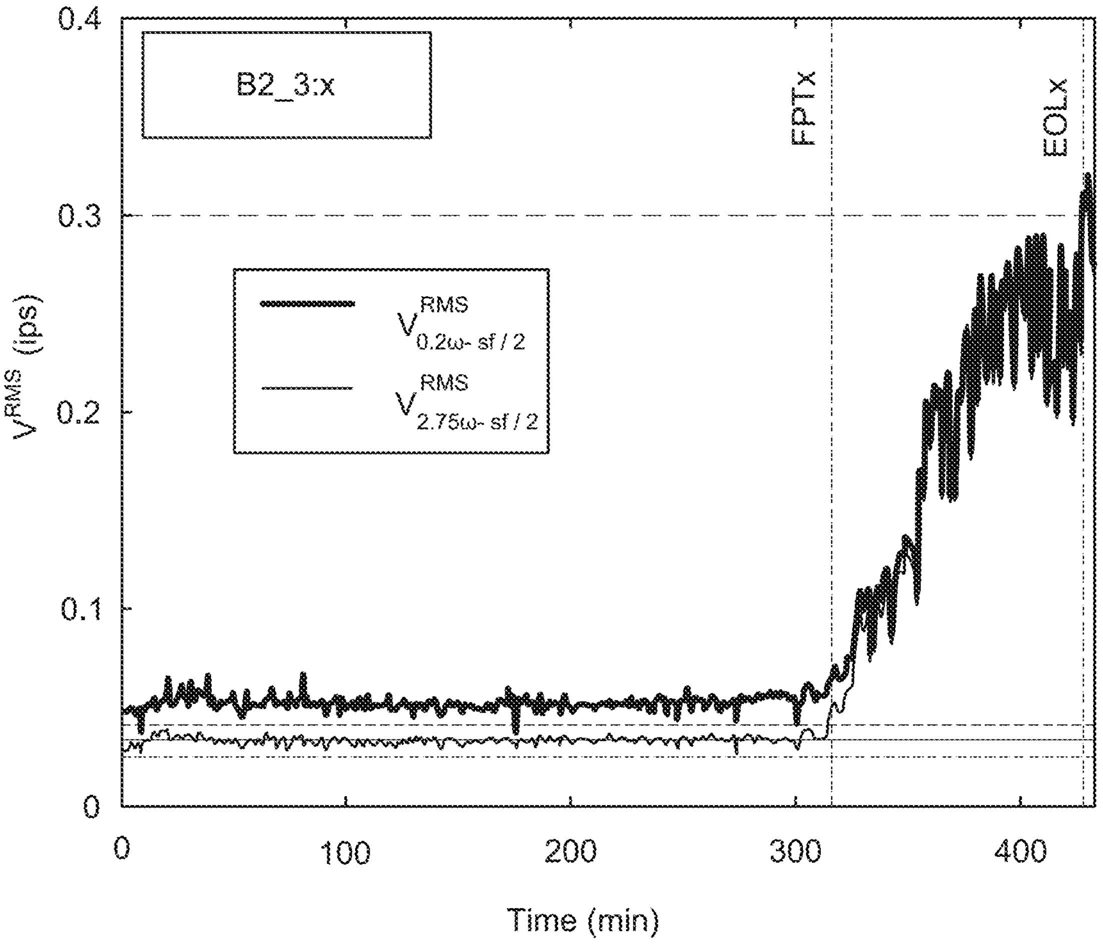

FIG. 7C illustrates development of feature $$V^{RMS}_{0.2\omega-sf/2} \text{ and } V^{RMS}_{2.75\omega-sf/2}$$

for Bearing 2_3 in the x-direction. FPT, EOL and $2\sigma_{V^{RMS}}$ are also plotted.

Figure 7D:
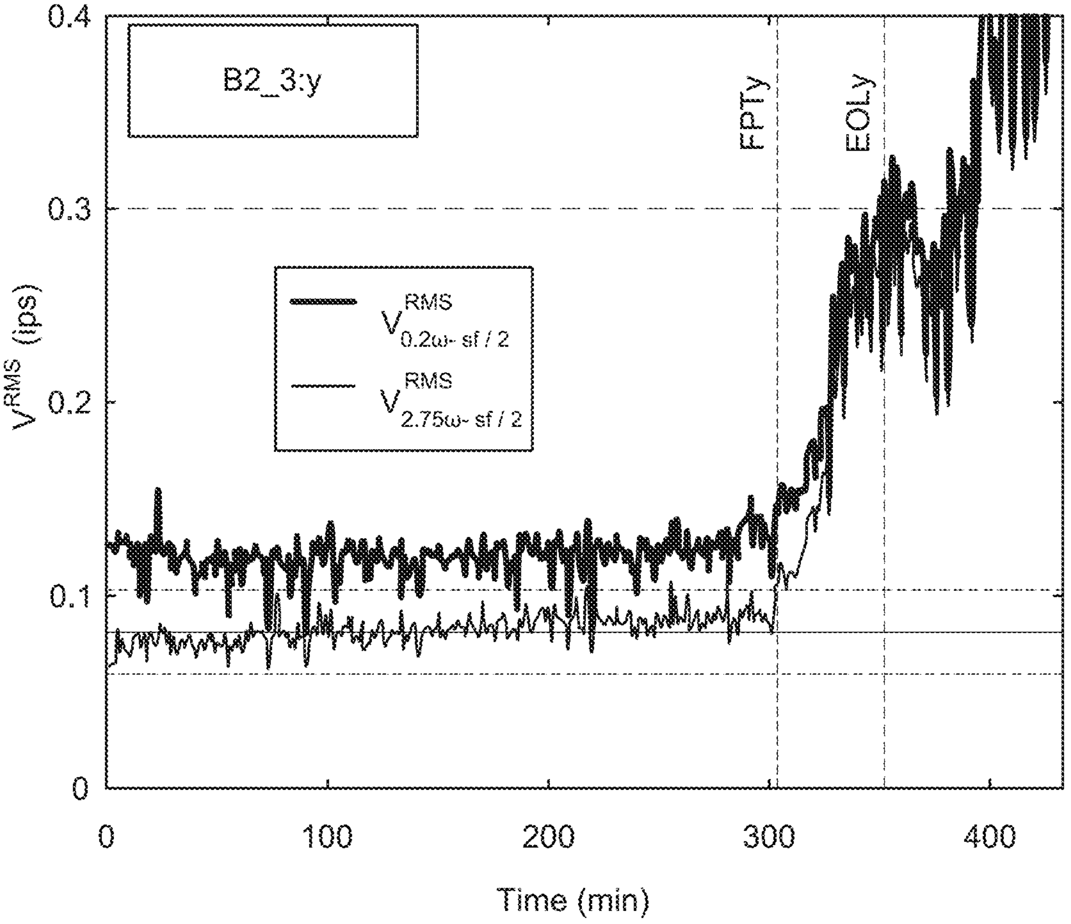

FIG. 7D illustrates development of feature $$V^{RMS}_{0.2\omega-sf/2} \text{ and } V^{RMS}_{2.75\omega-sf/2}$$

for Bearing 2_3 in the y-direction. FPT, EOL and $2\sigma_{V^{RMS}}$ are also plotted.

Figure 8:
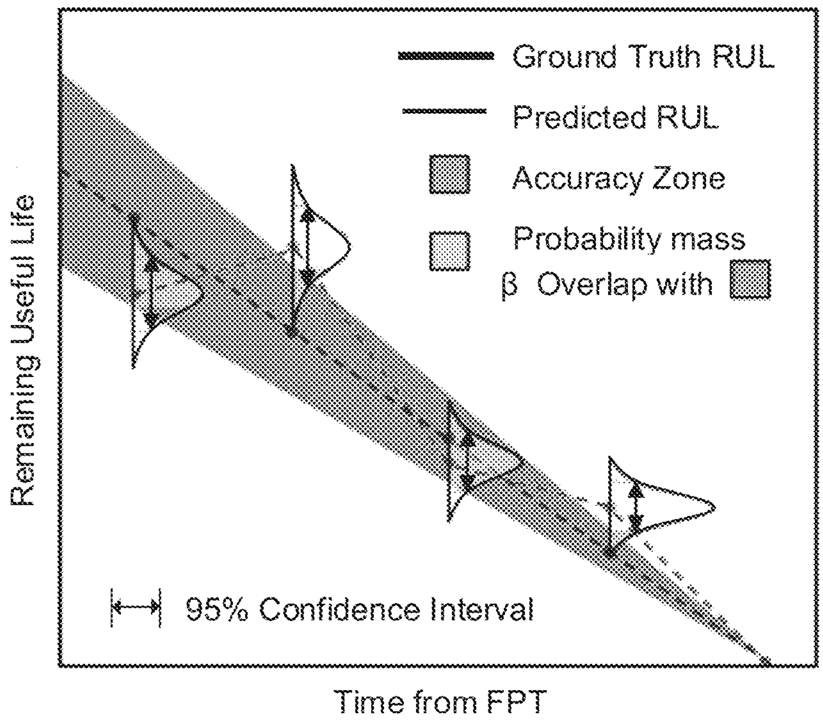

FIG. 8 illustrates uncertainty quantification metrics.

Figure 9A:
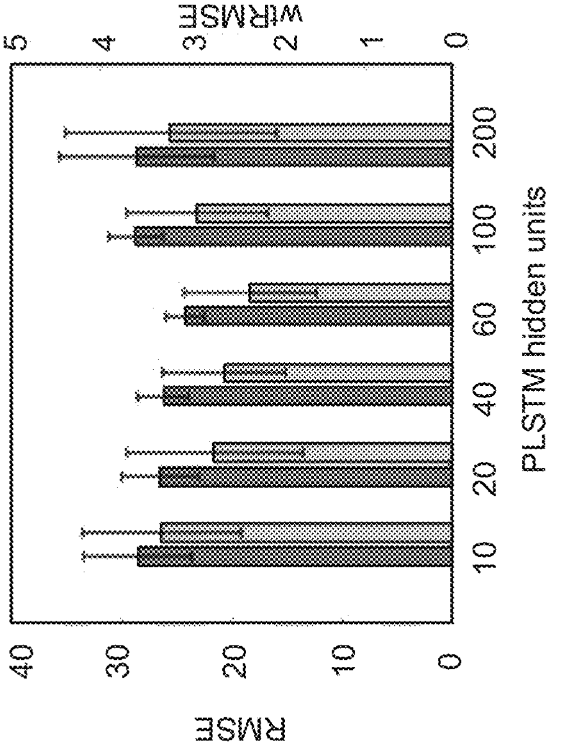

FIG. 9A illustrates performance of various PLSTM on the training dataset.

Figure 9B:
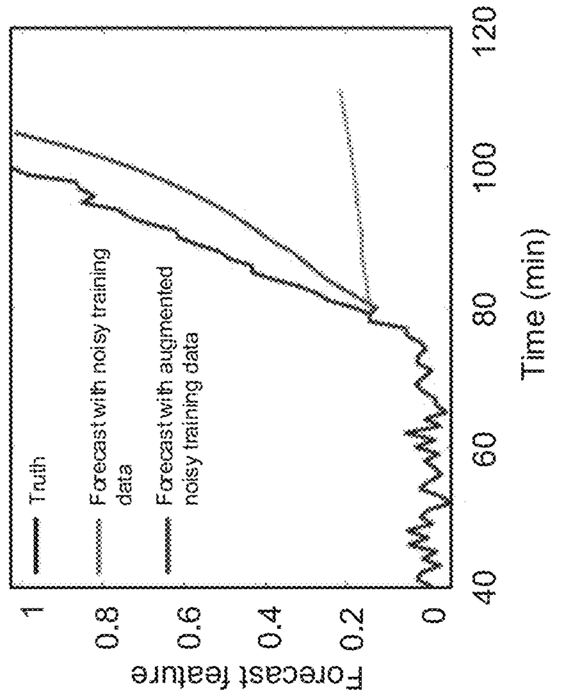

FIG. 9B illustrates a demonstration of the effect of data augmentation on noisy feature forecasting using a toy problem.

Figure 10A:
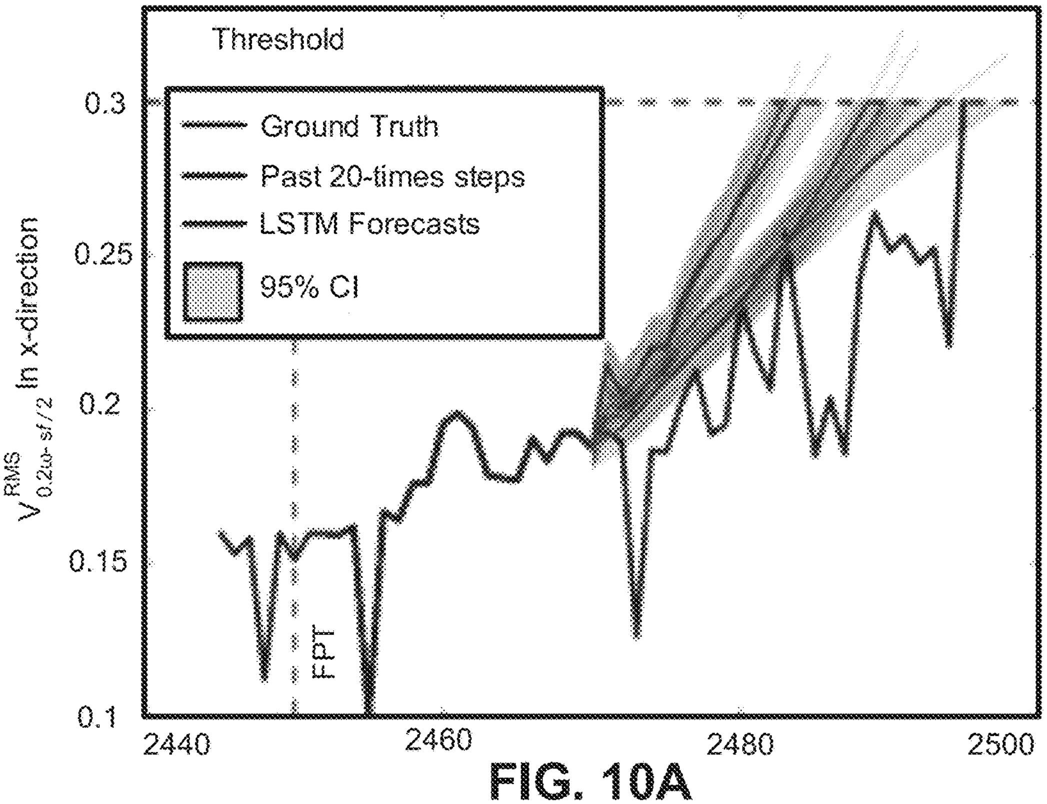

FIG. 10A illustrates forecast of the feature $$V^{RMS}_{0.2\omega-sf/2}$$

by the PLSTM.

Figure 10B:
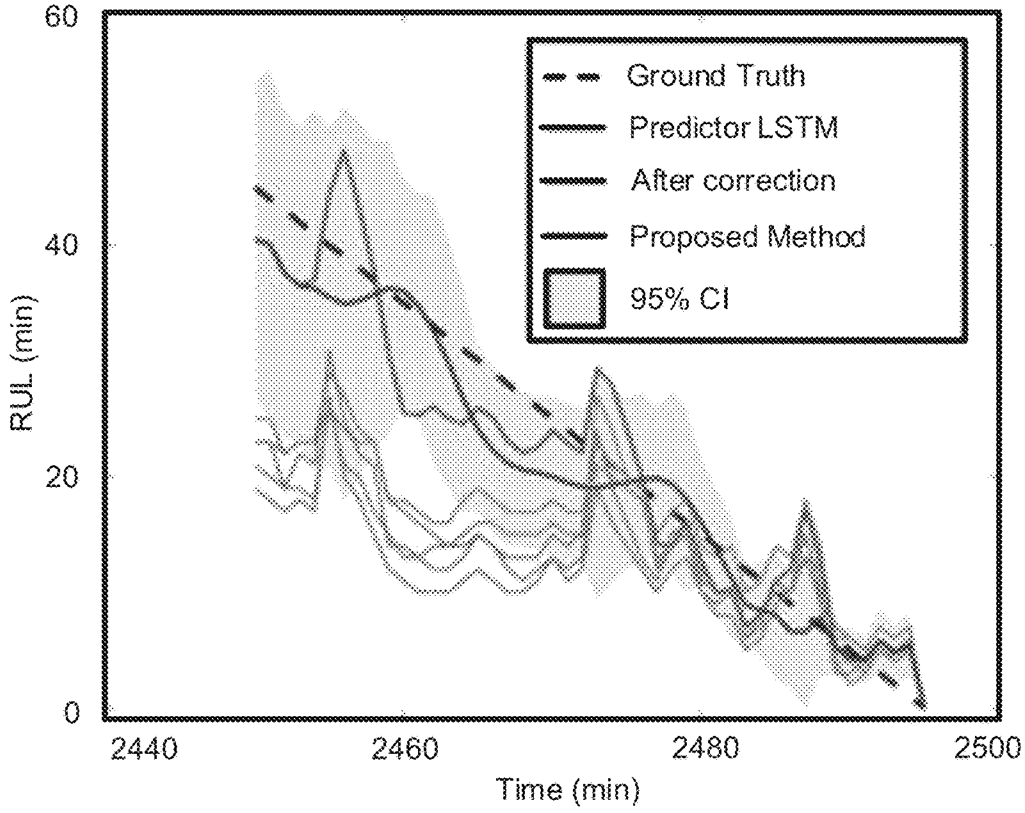

FIG. 10B illustrates RUL prediction results for Bearing 3_2.

Figure 11A:
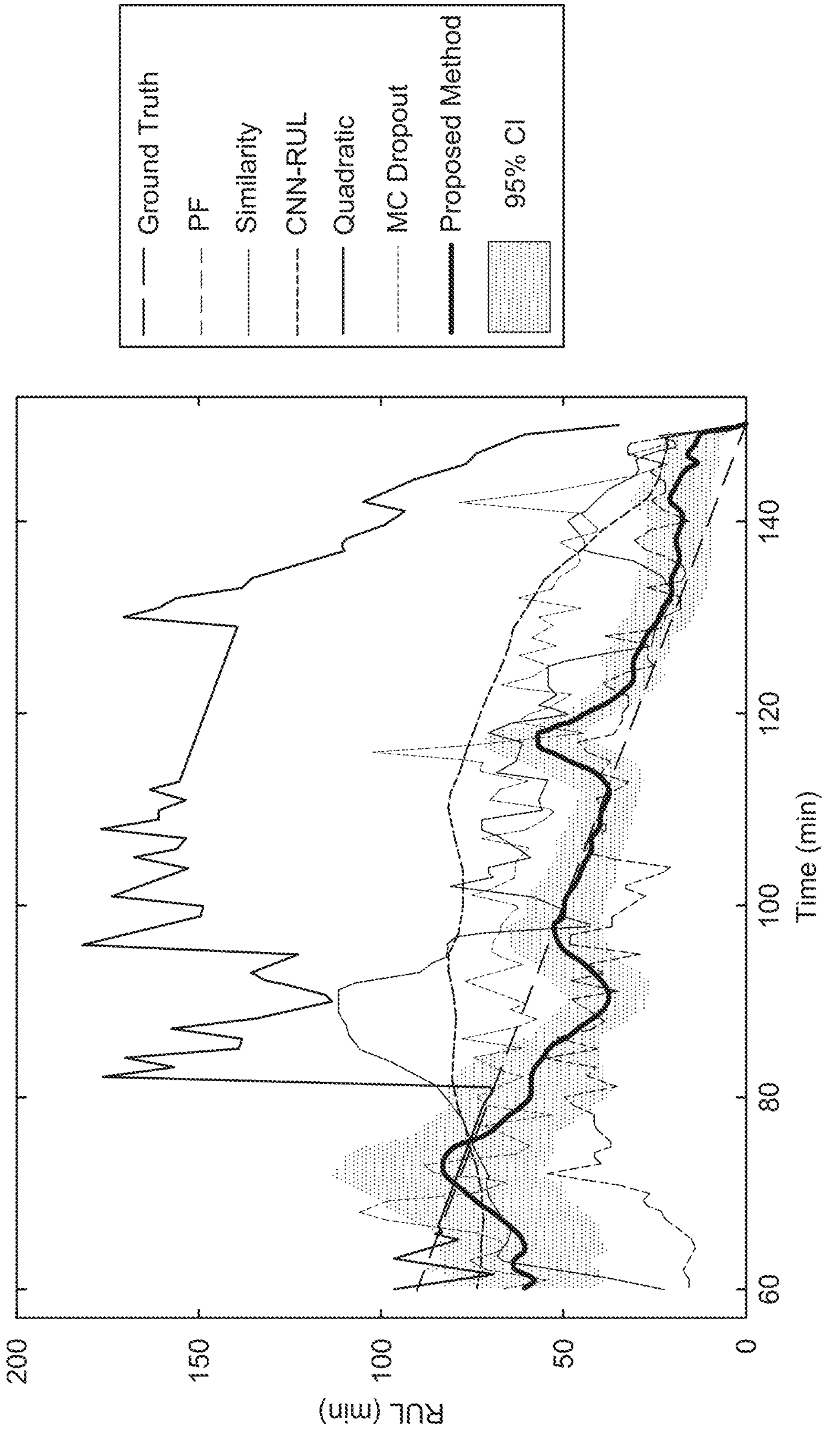
Figure 11B:
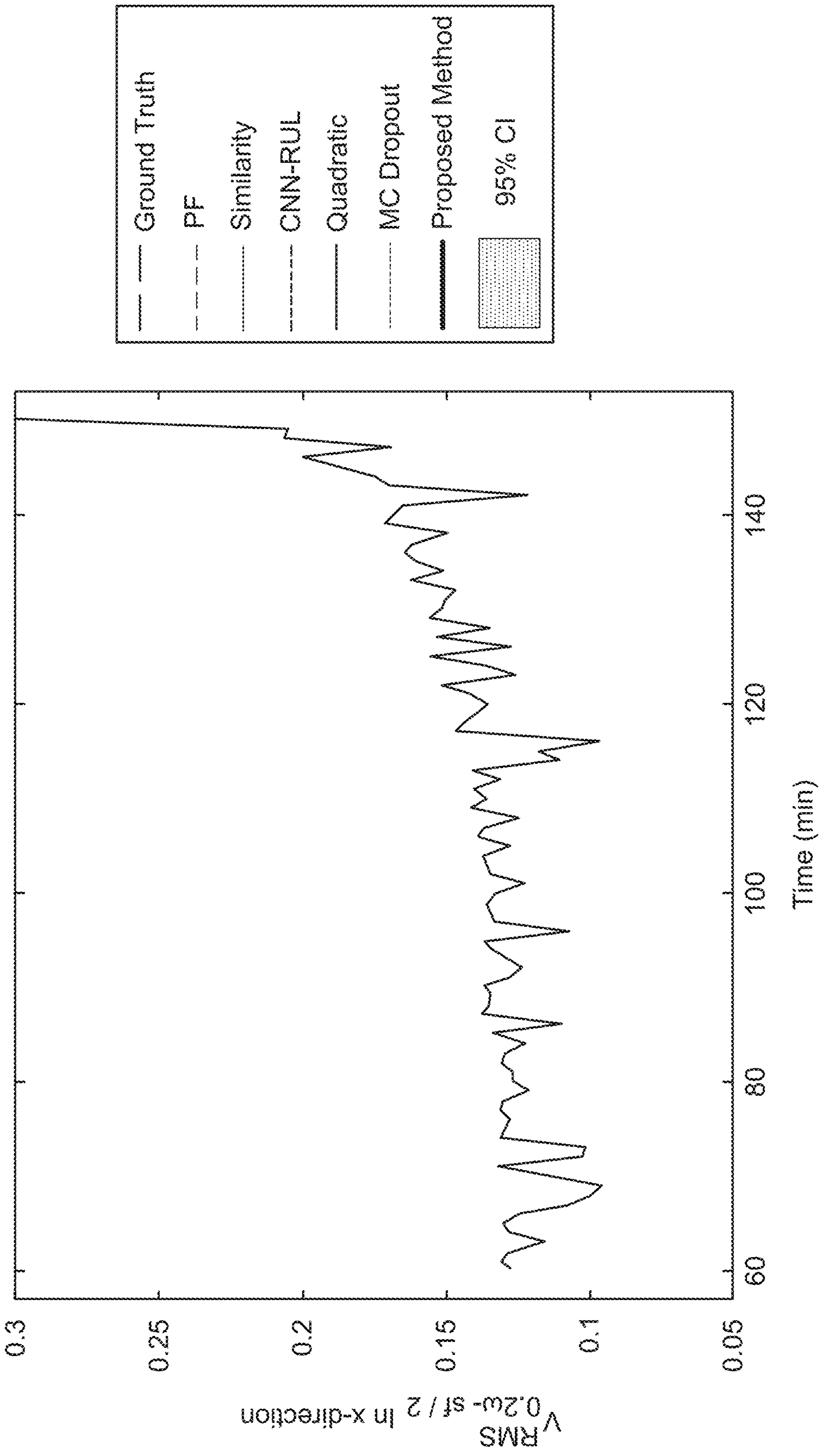
Figure 11C:
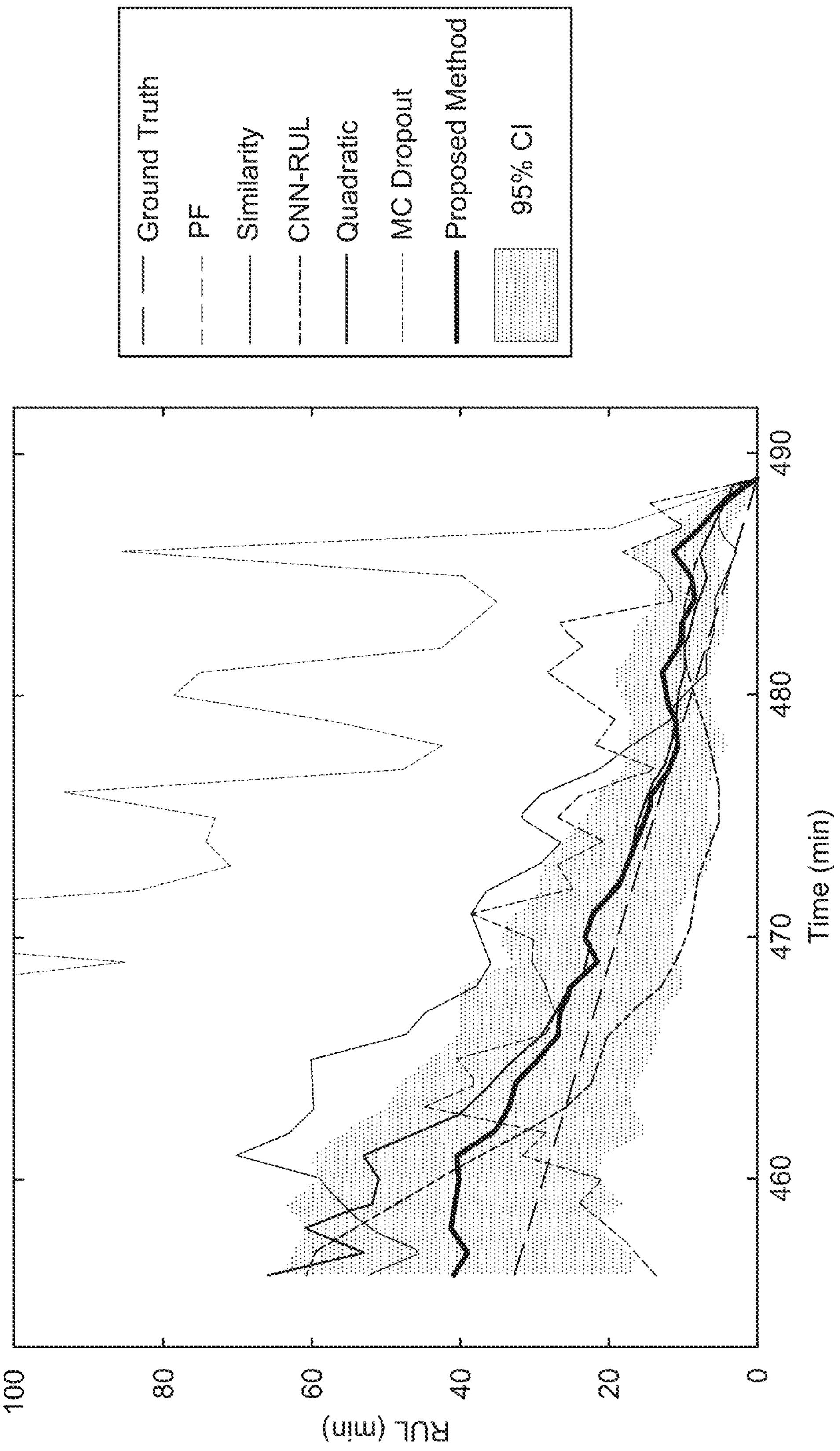
Figure 11D:
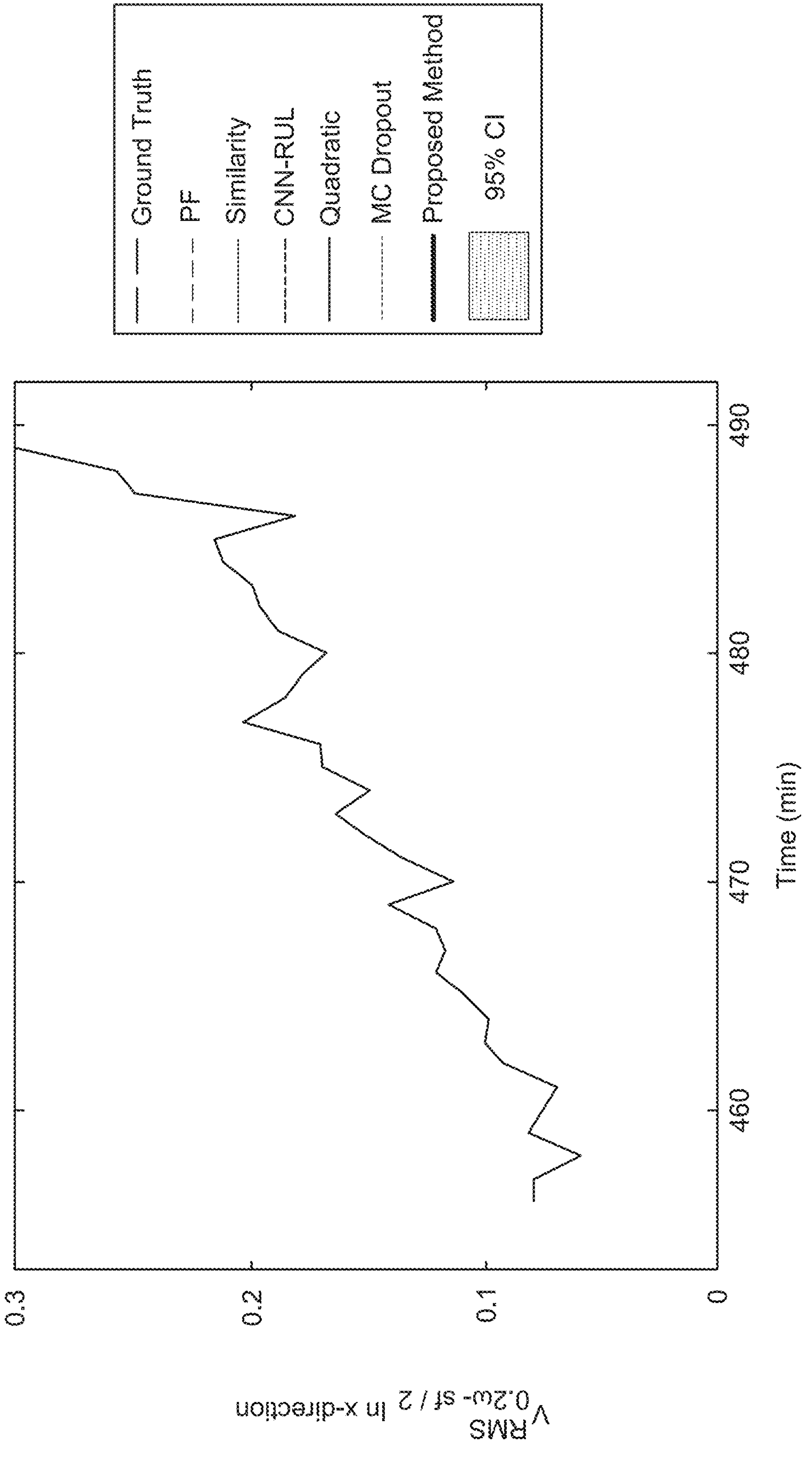
Figure 11E:
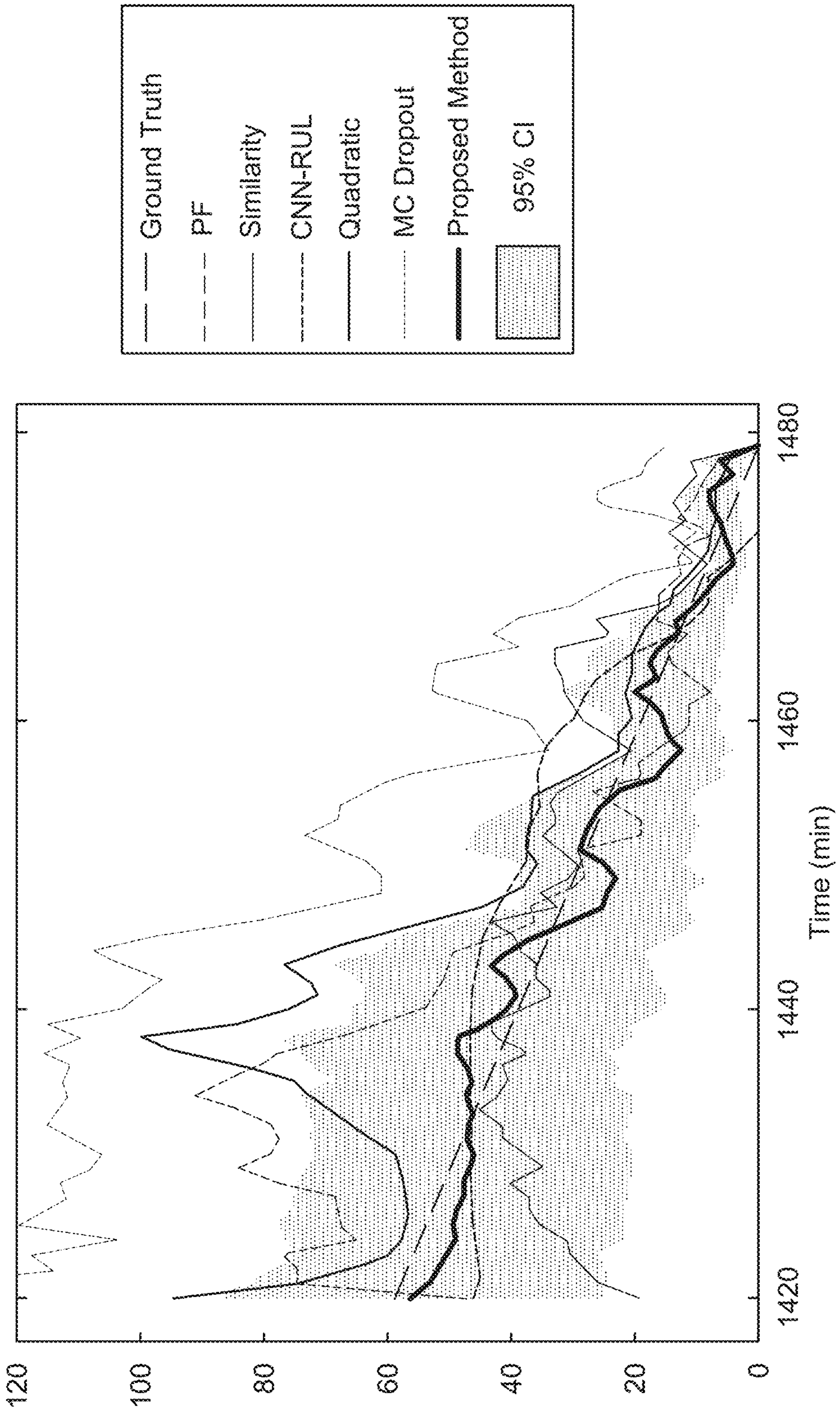
Figure 11F:
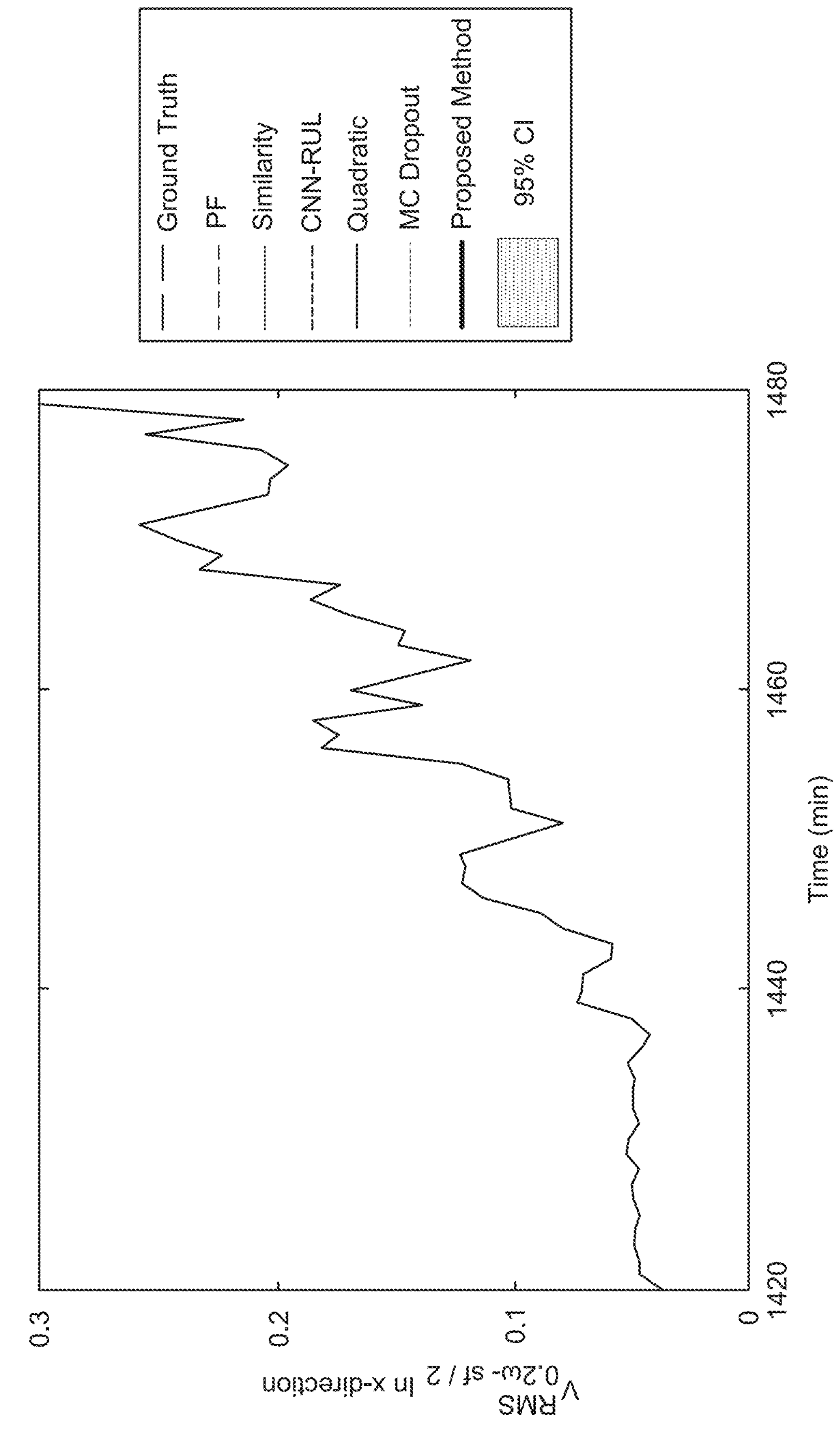

FIG. 11A, FIG. 11B, FIG. 11C, FIG. 11D, FIG. 11E, FIG. 11F illustrate RUL prediction results from various models for FIG. 11A: Bearing 1_3, FIG. 11C: Bearing 2_1 and FIG. 11E: Bearing 3_4, and their corresponding $$V^{RMS}_{0.2\omega-sf/2}$$

in FIG. 11B, FIG. 11D, and FIG. 11F respectively.

Figure 12A:
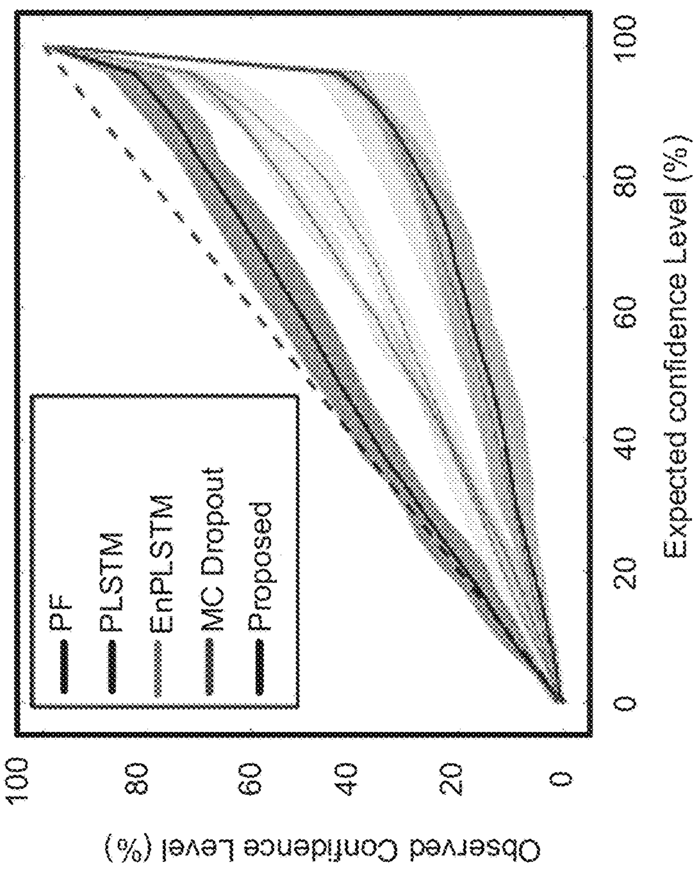
Figure 12B:
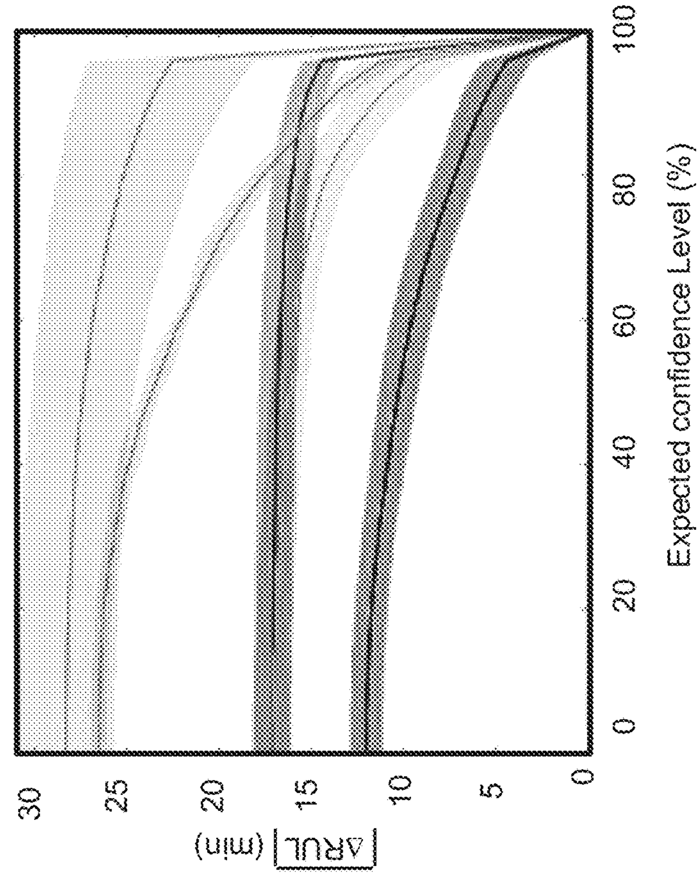

FIG. 12A and FIG. 12B show uncertainty quantification by each of the probabilistic prediction methods. FIG. 12A is a reliability plot showing the variation of the observed confidence level against the expected confidence level (the black dashed line is the ideal case) and FIG. 12B illustrates variation of average RUL prediction error for points outside the confidence intervals against the expected confidence level (a consistent inverse relationship is desired).

Figure 13A:
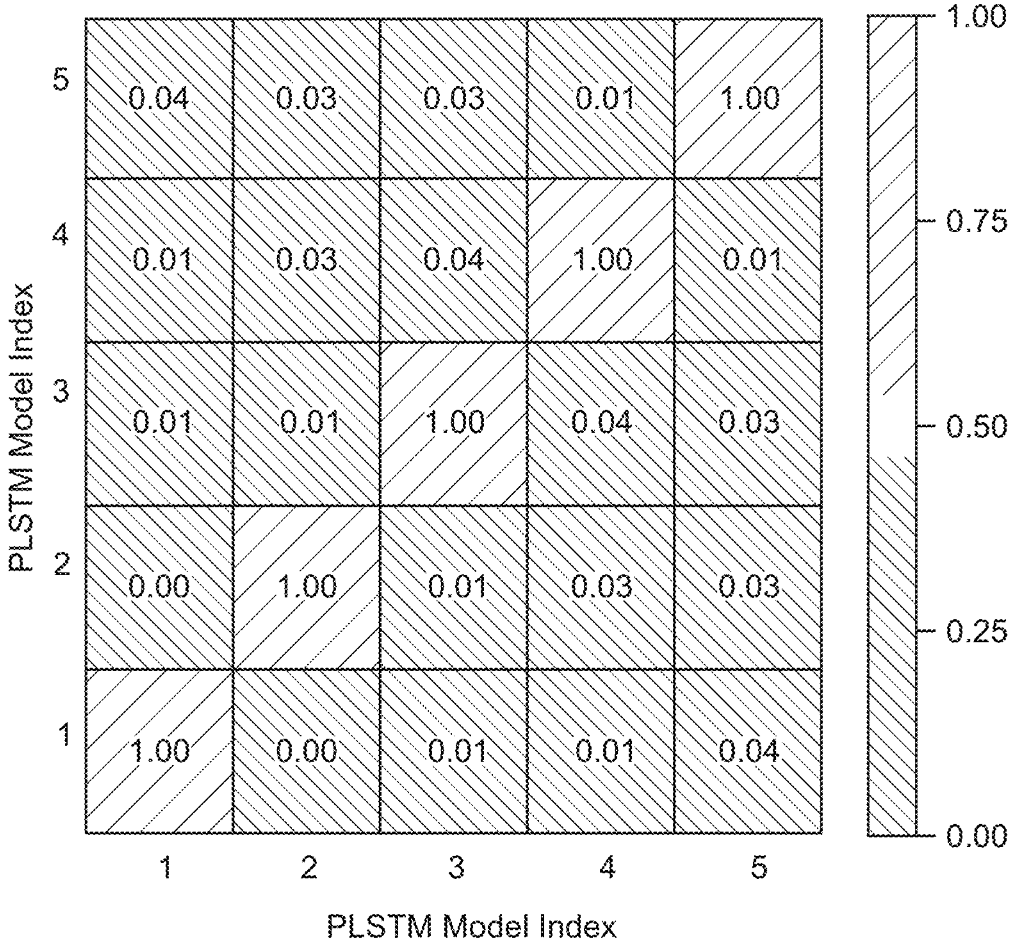
Figure 13B:
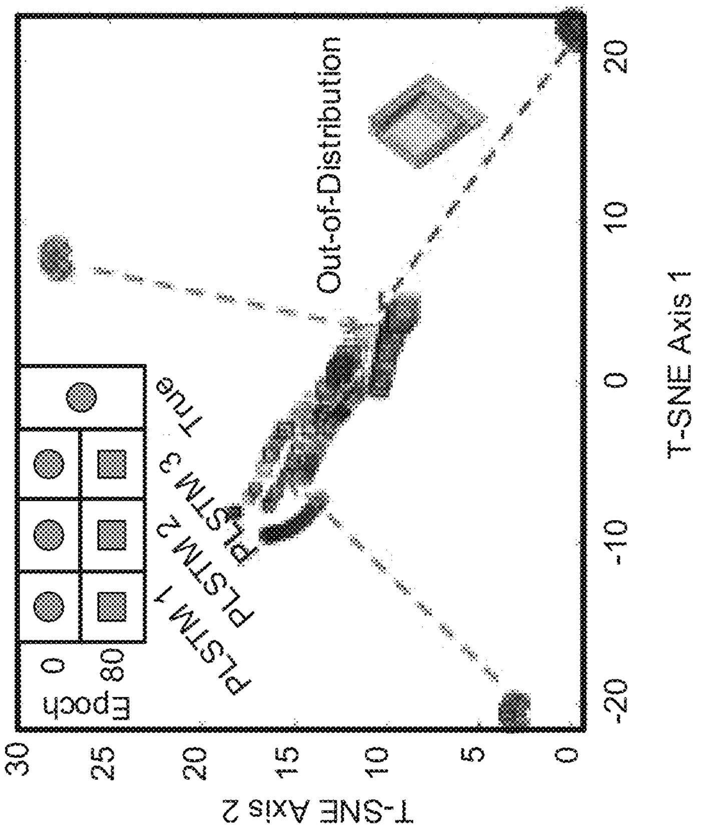
Figure 13C:
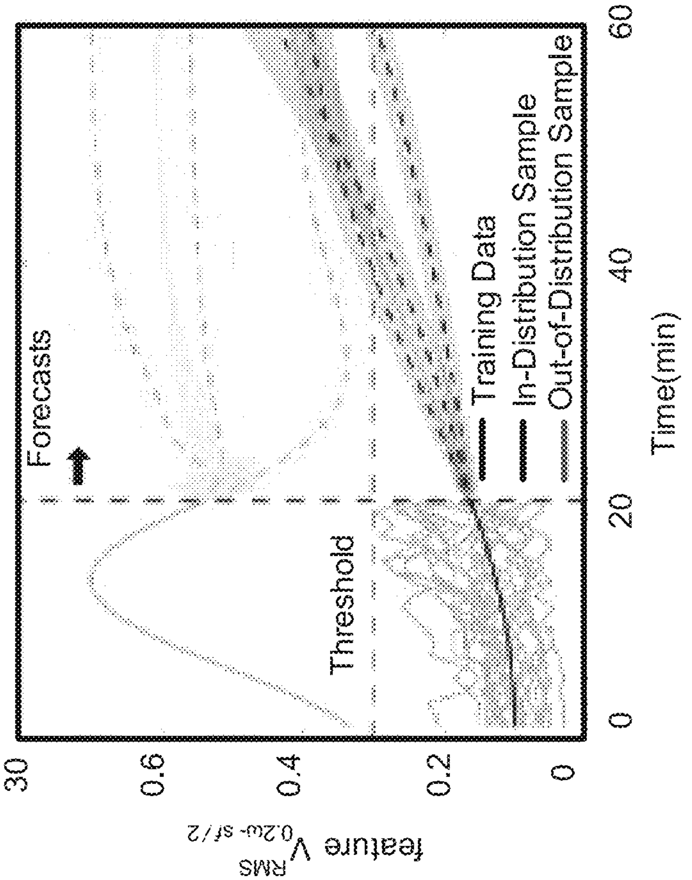

FIG. 13A illustrates cosine similarity of the weights of five PLSTM models trained for 80 epochs with different model weight initializations on the same training dataset. FIG. 13B is a t-SNE plot of forecasting 40 time-steps of $$V^{RMS}_{0.2\omega-sf/2}$$

by three representative PLSTM models at epochs 0 and 80 for Bearing 2_1. The ground truth of $$V^{RMS}_{0.2\omega-sf/2}$$

is also shown along with a sinusoidal out-of-distribution sample. The sizes of the squares and diamonds are proportional to the aleatoric uncertainty in forecast. FIG. 13C illustrates forecasting of the three PLSTM models for a sample within the training data distribution and the sinusoidal out-of-distribution sample.

Figure 14A:
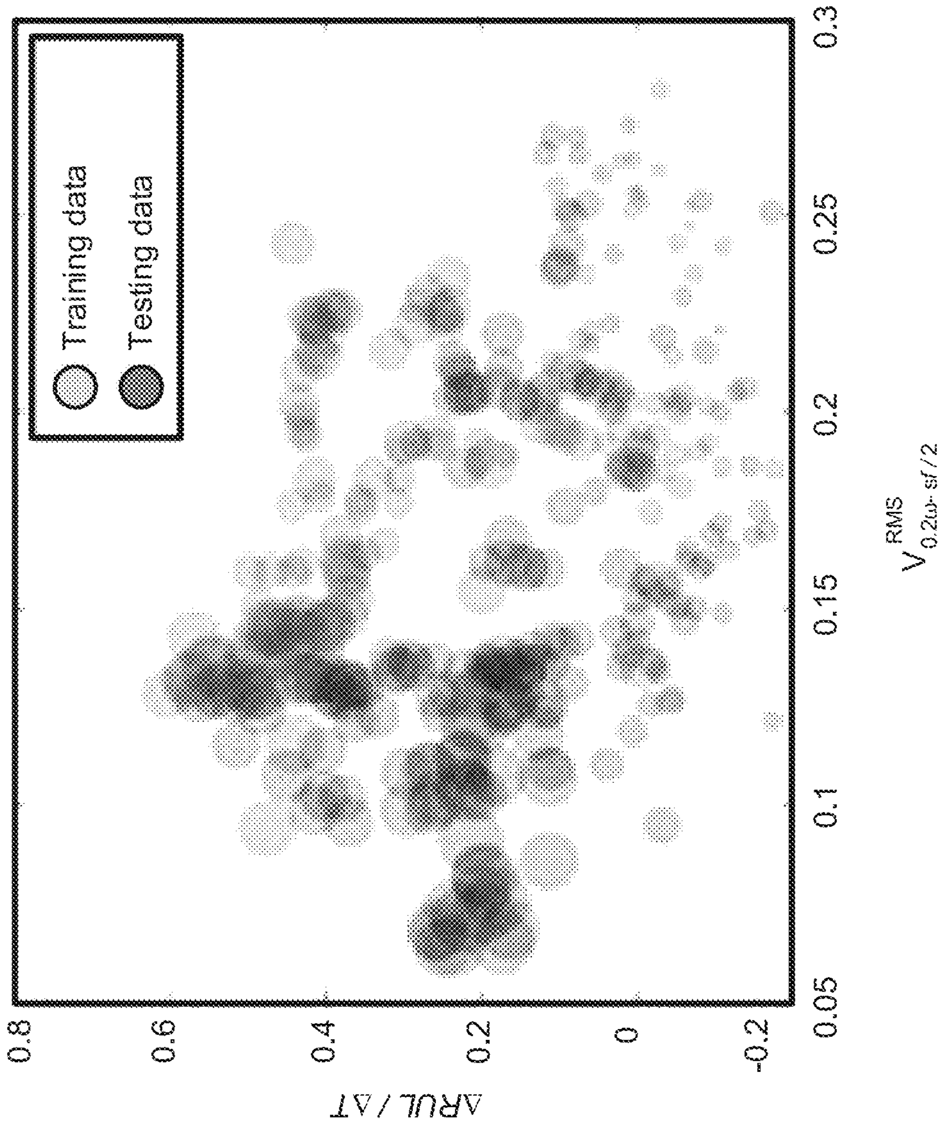
Figure 14B:
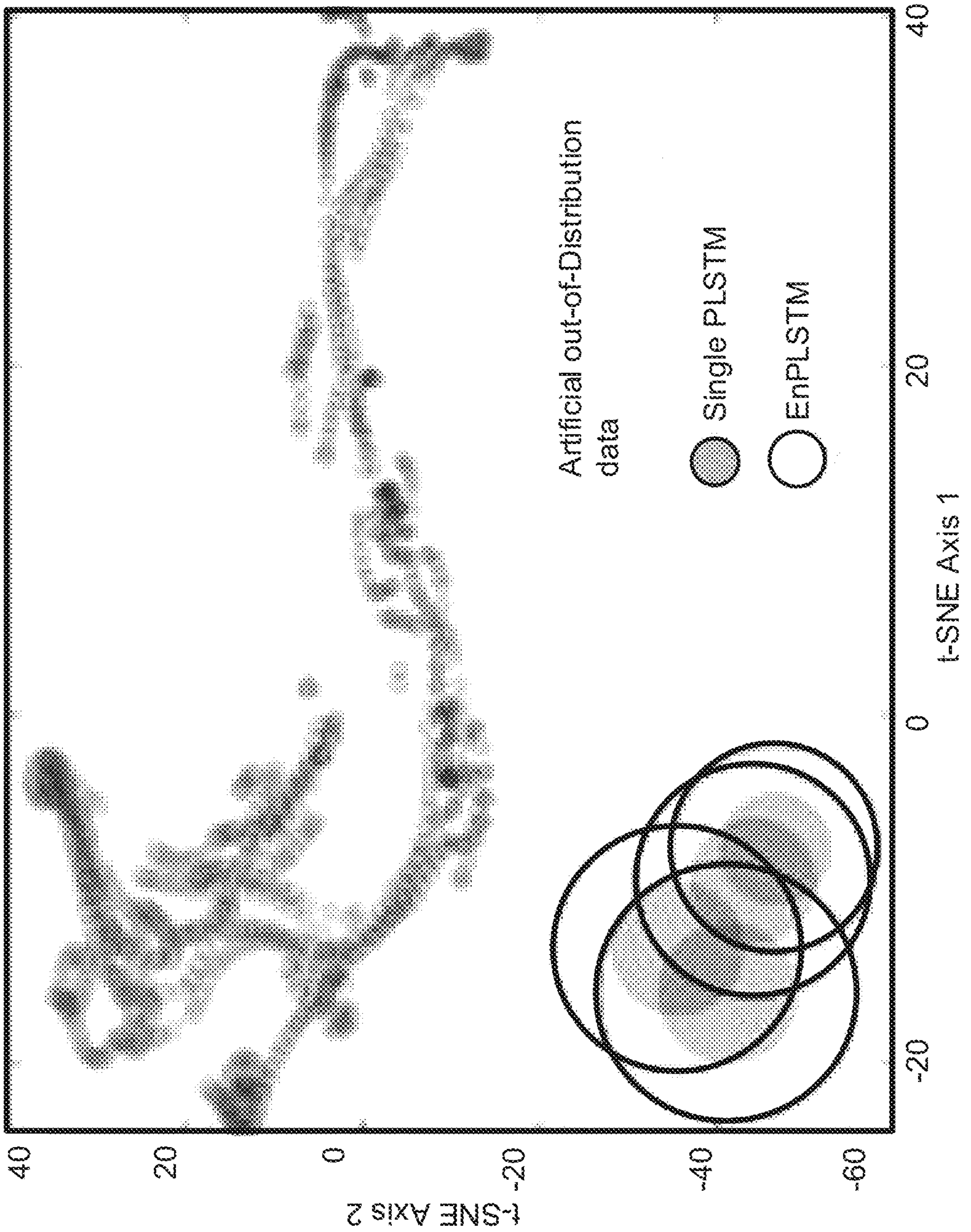

FIG. 14A illustrates error in RUL prediction for representative training and testing bearings from Fold-3 with the size of a circle proportional to the standard deviation of the RUL prediction, om, by one PLSTM model. FIG. 14B is a t-SNE plot of training and testing data for Fold-3, where each point corresponds to k-time steps of $$V^{RMS}_{0.2\omega-sf/2}.$$

Figure 14C:
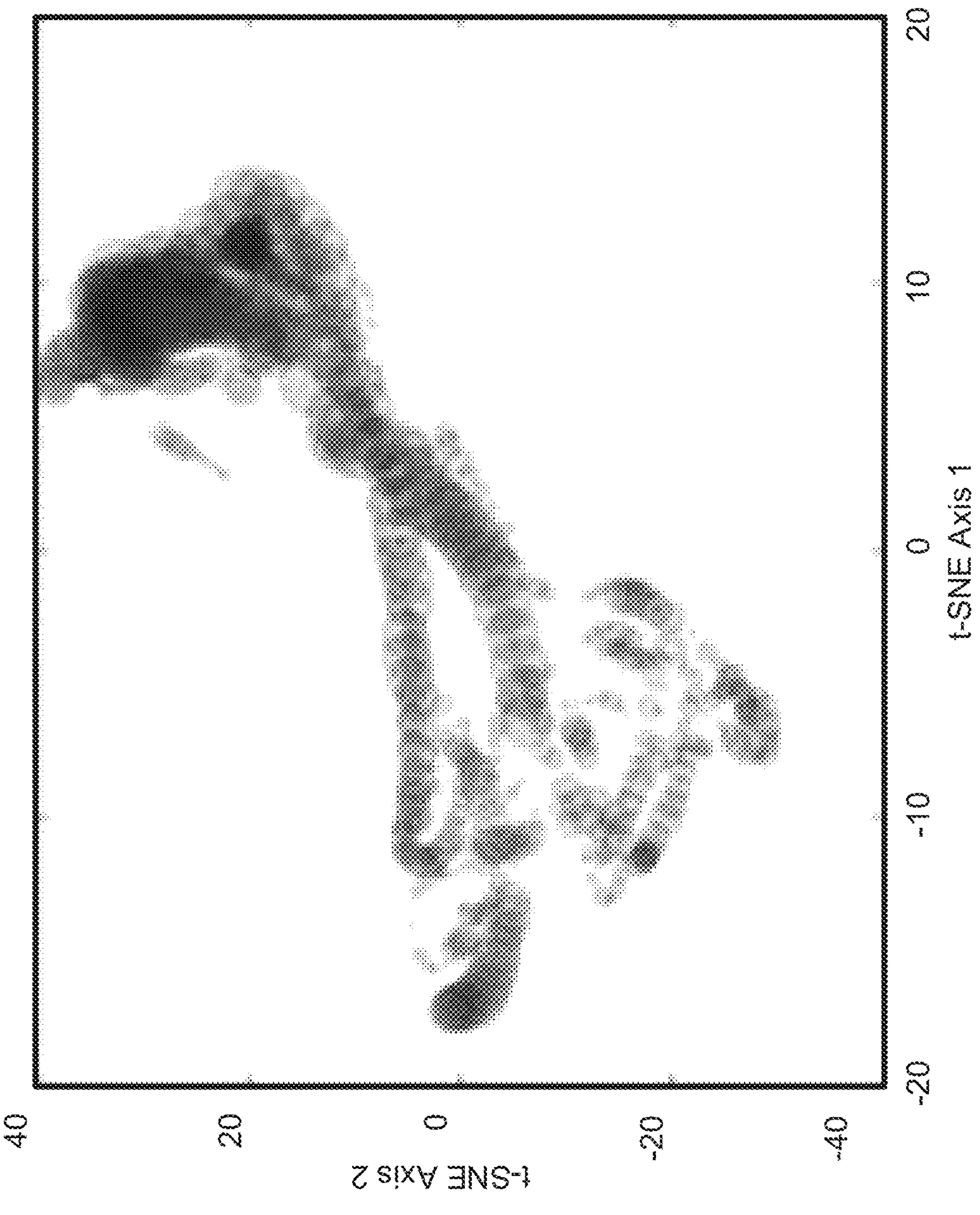
Figure 14D:
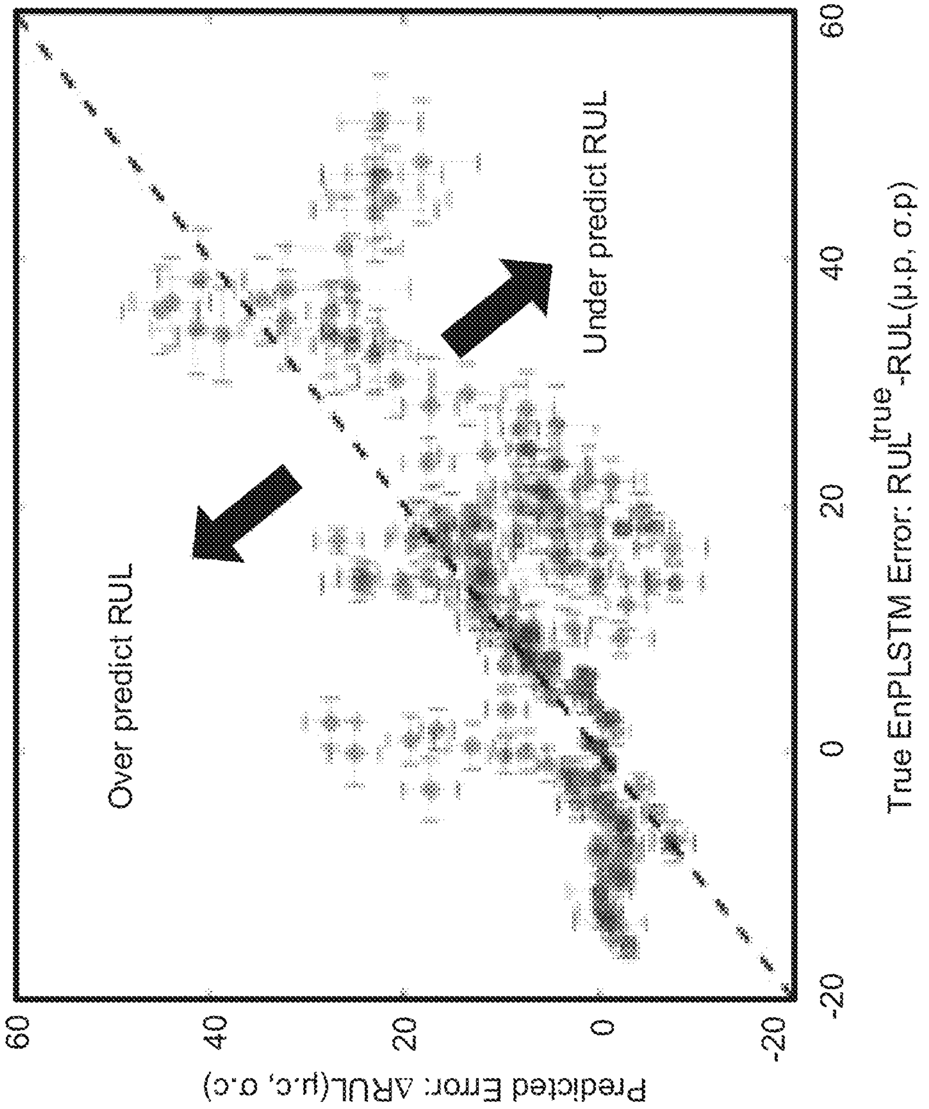

The symbol size is proportional to the standard deviation of the next-step feature prediction $$\sigma_p^{k+1}$$

from the single PLSTM model used in FIG. 14A. For the out-of-distribution samples, standard deviations of both single PLSTM and EnPLSTM are shown. FIG. 14C is a t-SNE plot of the input to the CLSTM model where the circle size is proportional to the RUL error. FIG. 14D illustrates comparing EnCLSTM RUL prediction error to the true prediction error of EnPLSTM. The horizontal and vertical error bars represent the variation in RUL prediction error from EnPLSTM and EnCLSTM for five runs respectively.

Figure 15:
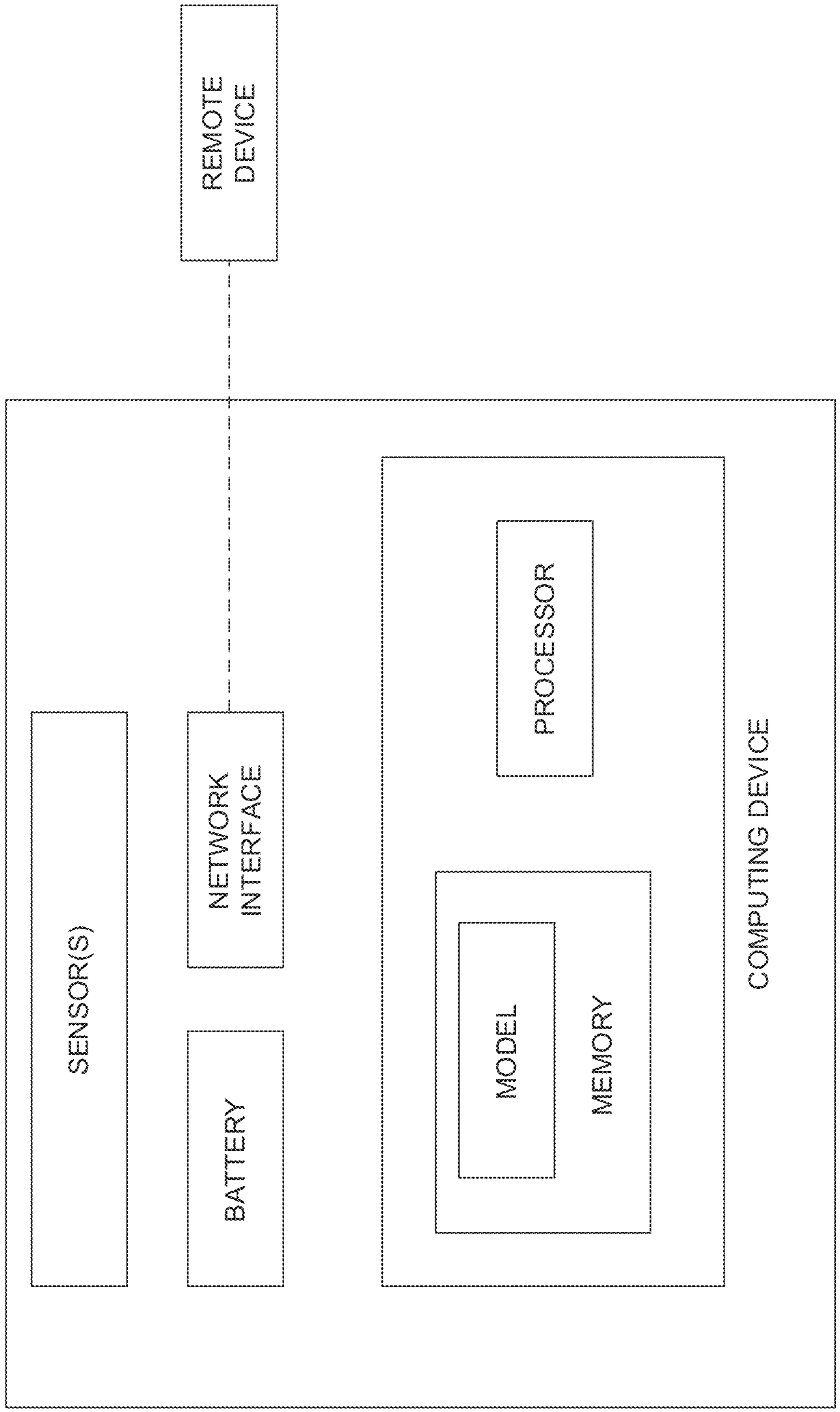

FIG. 15 illustrates one example of a sensor unit.

FIG. 16 includes Table 1 illustrates an architecture of a PLSTM network with Gaussian layer.

FIG. 17 includes Table 2 illustrates an architecture of a CLSTM model with Gaussian layer.

FIG. 18 includes Table 3, an algorithm for one example of a proposed predictor-corrector LSTM model for bearing prognostics.

FIG. 19 includes Table 4, is a summary of bearings from the XJTU-SY dataset.

FIG. 20 includes Table 5, evaluation metrics for various probabilistic models.

FIG. 21A and FIG. 21B include Table 6, a comparison of the various prognostic methods for all bearings.

DETAILED DESCRIPTION

1. Introduction

Prognostics and health management (PHM) technology has been receiving wide attention in recent years because of its potential to help reduce machine downtime, avoid catastrophic failure, and improve overall system reliability [1-3]. In the industrial environment, rolling element bearings are a predominant focus of PHM because of their presence in the rotating component of almost any critical piece of machinery [4-6]. The primary purpose of bearings is to reduce the rotational friction between multiple rotating parts while holding them in place. In an industrial setting, the bearings are often continuously operated under radial and/or axial loads and any catastrophic bearing failure may severely affect not just the bearing but also other connected components and/or processed outputs, leading to costly downtime and equipment replacement.

Therefore, detection of bearing faults [7,8] and predicting the remaining useful life (RUL) of the bearings with a certain degree of confidence can empower the maintenance engineer to schedule maintenance well before bearing failure.

Predicting the RUL of bearings has typically been approached in one of two ways: (1) by using a model-based approach where bearing failure mechanisms are modeled using mathematical constructs and (2) by using a data-driven approach where the failure data of a previous set of bearings will be used to train an offline model. In both cases, the generated model can be used to predict the RUL of a similar bearing at a given point in time.

A micro-level model-based approach to RUL prediction requires prior knowledge of a bearing's failure mechanisms and their explicit modeling [9]. This level of understanding of the physics of bearing degradation can lead to very accurate RUL estimates, but modeling extremely non-linear failure mechanisms, such as excessive loading, breakdown of lubrication, contamination, and bearing currents [10], along with the wide variation in bearing operating conditions, can severely limit the application of model-based approaches. On the other hand, a macro-level model-based prognostic approach includes simplification of the represented system by defining a certain relationship between the input variables, the state variables, and the system output. Previous research in this domain includes the use of the Kalman filter (and its derivatives) [11-17] and particle filter (PF) [18-20]. Notably, Singleton et al. uses an exponential form state equation to predict the bearing RUL using extended Kalman filter. Li et al. has proposed an improved exponential model where the first prediction time is adaptively determined, and the PF technique is used to reduce the errors associated with the stochastic noise. Qian et al. combines two-time scales by integrating phase space warping and a Paris crack growth model with PF to effectively predict the bearing RUL.

Data-driven approaches do not require prior knowledge about bearing failure mechanisms and can provide an estimate of bearing RUL that grows in credibility as more learning data is collected. However, the accuracy of the data-driven approach is heavily dependent on the amount of failure data available and is subject to typical reliability issues (such as overfitting) that present themselves frequently in modern data science. Machine learning techniques such as artificial neural networks (ANNs) [21-24], support/relevance vector machine (S/RVM) [25-29] are a few data-driven approaches often used in this domain of research. Recently, deep learning techniques are becoming more prominent due to their learning capability at multiple levels [30]. Among these, convolutional neural networks (CNN) [31-35] and recurrent neural networks (RNN) [23, 24] are gaining increased popularity due to their ability to store temporal information, which can be particularly useful in predicting the bearing health condition. Guo et al. was the first to construct a bearing health indicator based on a feature selection criterion and used the health indicator to train a recurrent neural network (RNN). Wang et al. developed a new framework of recurrent convolutional neural networks (RCNN) combined with variational inference to determine probabilistic RUL prediction. Peng et al. proposed a Bayesian deep-learning-based method for uncertainty quantification in the field of prognostics.

The long short-term memory (LSTM) architecture is a special class of RNN that has the ability to store long-term feature dependencies, and it is also being explored for prognostic applications [38-41]. Mao et al. used CNN to extract bearing degradation features which are then fed into an LSTM model for RUL prediction. Although many of these deep learning methods show promising results, these models often consist of a large number of parameters, requiring extensive computational resources and time even for making predictions, particularly if Bayesian methods are involved for uncertainty quantification. The scalability of such models, especially in an embedded industrial internet of things (IIoT) platform or soft-sensor applications [43], is not clear. To this end, we attempt to advance the current state-of-the-art in bearing prognostics in the following ways:

1) We use the International Organization of Standardization (ISO 10816) set standards for industrial machines to determine the end of life (EOL) for bearings as opposed to traditional heuristic approaches of using maximum or mean vibration amplitude. The ISO standards, which often evaluate excessive vibration in terms of velocity units like inches per second (ips), define "excessive" vibration from an industrial standpoint which could be quite different from what is seen in a lab-based experiment. Particularly, a lab-based experiment can allow for a catastrophic bearing failure but this is not the case in an industrial setting where a catastrophic failure can cost millions of dollars.
2) We extract velocity domain root mean square (RMS) features while accounting for characteristic bearing fault frequencies. These features are then used to determine the first prediction time (FPT) and to train the proposed model. Simultaneously, we also extract features from both the time and frequency domains of acceleration, velocity, and jerk vibration signals, which are used to train other correlation-based models, such as CNNs, for comparison. Similar to the approach presented in Ref. [24], a total of twenty-four features are selected based on their Pearson correlation coefficient and monotonicity which indicates the variation of the bearing health condition with time.
3) We develop a simple and scalable ensemble of lightweight deep LSTM networks (EnLSTM) that can provide a probabilistic prediction of RUL. As opposed to complex and heavy parameter deep learning models, our proposed model uses multiple lightweight models to enable embeddability on vibration measuring sensors for online prognostics of bearing failure. A simple data augmentation technique is used during the training phase of the LSTM networks to improve the accuracy and robustness of RUL prediction.

4) We propose a two-step algorithm consisting of (a) a predictor step (EnPLSTM): which forecasts a selected feature to a certain threshold for an initial RUL prediction, (b) a corrector step (EnCLSTM): which corrects the prediction of the EnPLSTM, and (c) temporal fusion: which weighs in the predictions from the recent past to make a smoother final prediction. Each individual LSTM model provides aleatoric uncertainty of predictions through the use of a custom Gaussian layer. These LSTM models, when combined to form an ensemble, can help estimate the epistemic uncertainty in bearing health forecasts. This method ensures robust RUL predictions that are less sensitive to measurement noise and also provide consistent predictions that do not vary vastly between successive measurements.

5) Several metrics for quantifying uncertainty are used to compare the proposed model with other probabilistic methods such as optimized PF and Bayesian-like Monte-Carlo (MC) Dropout [44]. We also investigate how the ensemble EnPLSTM model works by demonstrating that the training of each individual PLSTM model takes a different optimization route. We show how exploring the functional/forecast modes provides a better measure of uncertainty.

The rest of this disclosure is organized as follows. In section 2, we first formally introduce the overall methodology followed by a discussion on relevant feature extraction while considering characteristic bearing fault frequencies. Following this, we present an LSTM architecture with the inclusion of a Gaussian layer to account for aleatoric uncertainty in the feature forecast and use this to develop the EnPLSTM and EnCLSTM. In section 3, we implement the proposed model on a publicly available bearing dataset from accelerated degradation experiments and establish the superiority of our model when compared to other deterministic as well as probabilistic contemporary models. Particularly in section 3, we reason why the ensemble predictor and corrector work well for the bearing dataset by identifying scenarios where the model would fail.

2. Methodology

Figure 1:
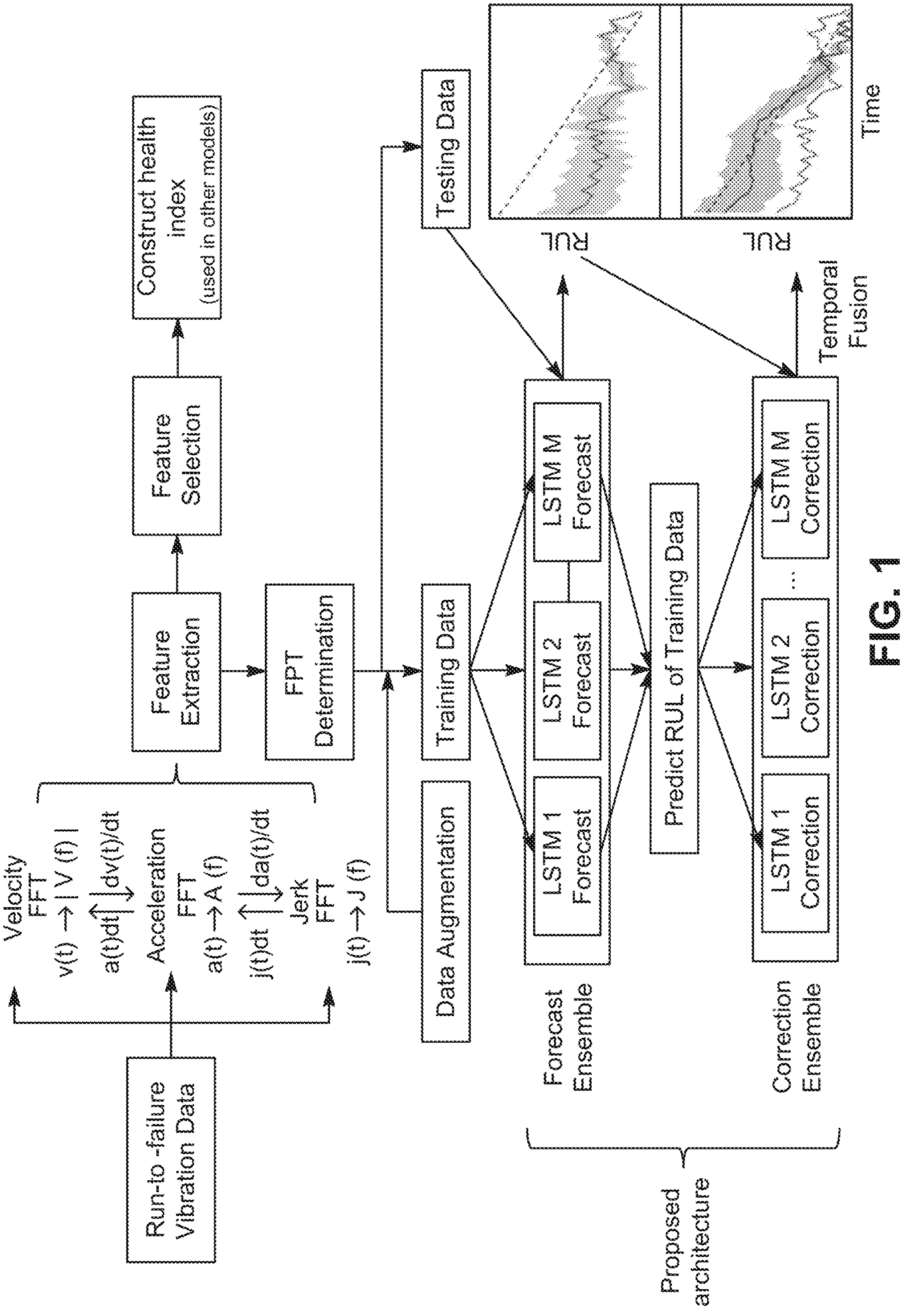
FIG. 1 is a schematic of one example of a bearing prognostic algorithm.

In the introduction, we established that probabilistic RUL prediction of rolling element bearings is critically important for scheduling maintenance. In this section, we describe the technical approach for achieving confident RUL predictions. We first describe the features extracted from the vibration signals and then detail the proposed EnP/CLSTM algorithm after which we briefly present model-based approaches like particle filter, similarity, and exponential/quadratic regression, and a CNN data-driven approach. The detailed flow chart of the proposed bearing prognostic algorithm is shown in FIG. 1. In a later section, we show the advantage of the proposed method by using a case study of a run-to-failure bearing dataset.

The state of bearing health is often captured through vibration measurements collected in the radial direction. Bearing defects can usually be classified as either (1) single-point defects or (2) generalized roughness [45]. The former type of defect is localized, such as a spall or a pit, on an otherwise smooth bearing surface, producing four different characteristic fault frequencies. Generalized roughness arises when larger areas of the bearing component surfaces become coarse, irregular, or deformed. In this study, we limit our observations to single/multi-point defects, where the characteristic fault frequencies [46,47] are functions of rotational speed and can be obtained for flaws in the outer race $$BPFO = \frac{\omega N}{2}\left(1 - \frac{B}{P}\cos\phi\right),$$

inner race $$BPFI = \frac{\omega N}{2}\left(1 - \frac{B}{P}\cos\phi\right),$$

on one of the ball bearings $$BSF = \frac{\omega N}{2B}\left(1 - \frac{B^2}{P^2}\cos^2\phi\right),$$

or in the cage $$FTF = \frac{\omega}{2}\left(1 - \frac{B}{P}\cos\phi\right).$$

Here ω is the shaft rotational speed in Hz, B is the ball diameter, P is the pitch diameter, ϕ is the contact angle, and N is the number of balls. A bearing with a particular defect shows harmonics of the corresponding fault frequency, and discrepancies arise whenever there is slippage. Moreover, when the fault is sufficiently pronounced, the vibrations are accompanied by sidebands around these characteristic frequencies. We, therefore, consider a frequency band around each fault frequency (see FIG. 5) to capture the fault signatures.

2.1 Feature Extraction in Velocity Domain

Figure 2:
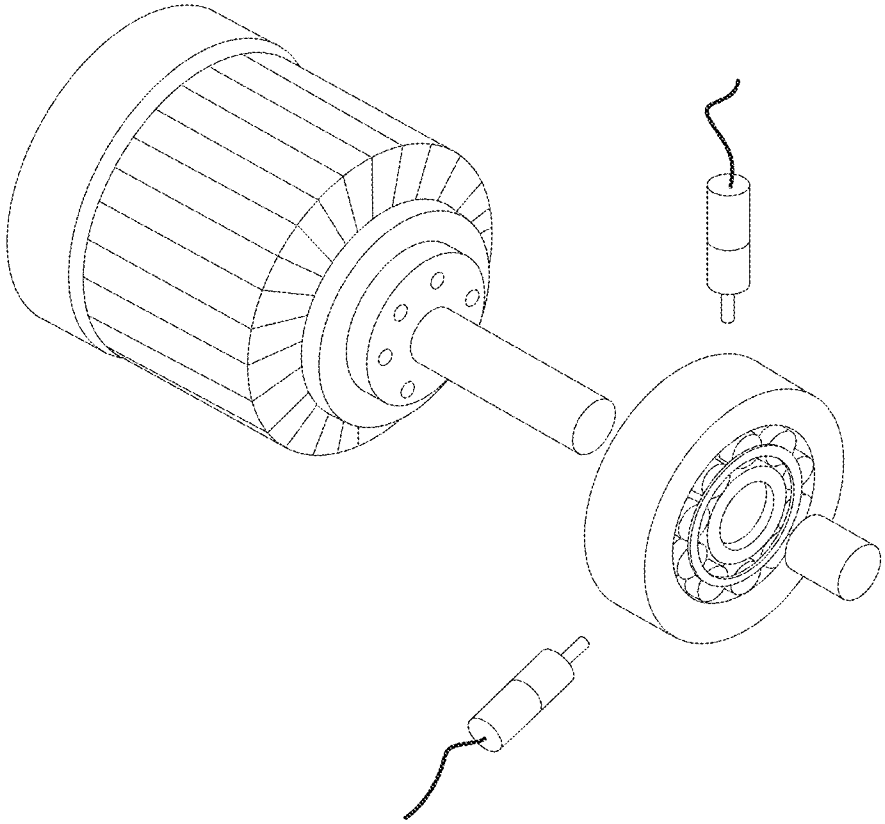
FIG. 2 illustrates one example of sensor mounting in the radial direction.

Most academic bearing run-to-failure datasets provide vibration data in the acceleration domain whereas the ISO standards for defining end-of-life or alarm amplitudes are in the velocity domain [48-50]. This is because the magnitude of a signal in the acceleration domain increases with the frequency of that signal, whereas velocity provides a more stable representation of energy that is independent of shaft or rotational speed. Moreover, the vibration in the velocity domain is less susceptible to amplifier overloads that typically show up in the high-frequency domain which can compromise the fidelity of low-frequency signals [51]. To this end, we propose the bearing be considered unusable or require immediate maintenance if the overall velocity RMS in the frequency range of 0:2ω-12:8 kHz (for a sampling frequency of sf=25.6 kHz) in a single-sided fast Fourier transform (FFT) spectrum exceeds a certain threshold. According to the ISO standards [50], the threshold value varies with the type of application, but we choose a statistical value of 0.3ips assuming a medium-sized motor [48]. In situations where vibration sensors are mounted both horizontally and vertically along the radial direction (see FIG. 2), we define the bearing to reach its end-of-life when the RMSs of both the horizontal and vertical velocities exceed 0.3ips.

In addition to the velocity and acceleration domains, studying the jerk domain, which is the differential of the acceleration vibration signal, can be important to detect abnormal vibration signals, particularly at low rotational speeds [52,53]. Although the case study which we present later employs a moderate operating speed, we nevertheless find and show later in section 2.2 that the features extracted from the jerk domain show good correlations with RUL for the bearings.

In practice, accelerometers are widely used due to their availability, small form factor, and low cost as opposed to velocity sensors which are expensive and bulky. Unless directly measured, the velocity vibration v(t) can be obtained by numerical integration of the acceleration vibration signal $$v(t) = \int_0^t a(t)$$

dt and the jerk signal can be obtained by differentiating the same, $$j(t) = \frac{da(t)}{dt}.$$

After integration, the vibration signal will be modulated with a low frequency signal as a numerical artifact stemming from the assumption that the initial condition for integration is v(t=0)=0. To avoid this effect, we consider the frequency signal beyond 0.2ω. One can use a high-pass filter or just extract the RMS values from the frequency domain (for all three signals a(t), v(t) and j(t)) within certain frequency ranges using Parseval's theorem which is based on the principle of energy conservation. In particular, the RMS of a signal x(t) can be calculated both in the time domain and based on a single-sided frequency spectrum X(t) with frequency resolution of df as:

$$x^{RMS} = \sqrt{\frac{1}{n_f}\sum_{i=1}^{n_t} x(i)^2} = \sqrt{|X(0)| + \sum_{f=df}^{sf/2} \frac{|X(f)|^2}{2}} \tag{1}$$

where nt is the total number of points in the time domain signal during the sampling period of $t_s$ and $n_t=t_s \times sf$. The RMS value between two frequencies $f_1$ and $f_2$ can therefore be calculated as $$x_{f_1-f_2}^{RMS} = \sqrt{\sum_{f=f_1}^{f_2} \frac{X(f)^2}{2}}$$

Note that the summation is over the discrete X(f) values between $f_1$ and $f_2$ and FFT hereafter refers to the single-sided FFT spectrum. In this study, we use two physics-based features extracted from the velocity domain:

$$V_{BFF-sf/2}^{RMS} \text{ and } V_{02\omega-sf/2}^{RMS},$$

where BFF refers to beginning of bearing fault frequencies BFF=0.9 min (BPFO, BPFI, BSF)−sf/2. The pre-factor of 0.9 ensures a 10% frequency error margin for the onset of bearing degradation owing due to shaft speed variations.:

$$V_{BFF-sf/2}^{RMS}$$

is used to determine the FPT for bearing prognostics and $$V_{0.2\omega-sf/2}^{RMS}.$$

is used to determine whether a bearing has failed or requires immediate maintenance based on ISO standards, which is approximately 0.3ips for a medium-sized electric motor [48].

2.2. Proposed Model

2.2.1. Fundamental LSTM Architecture

Figure 3:
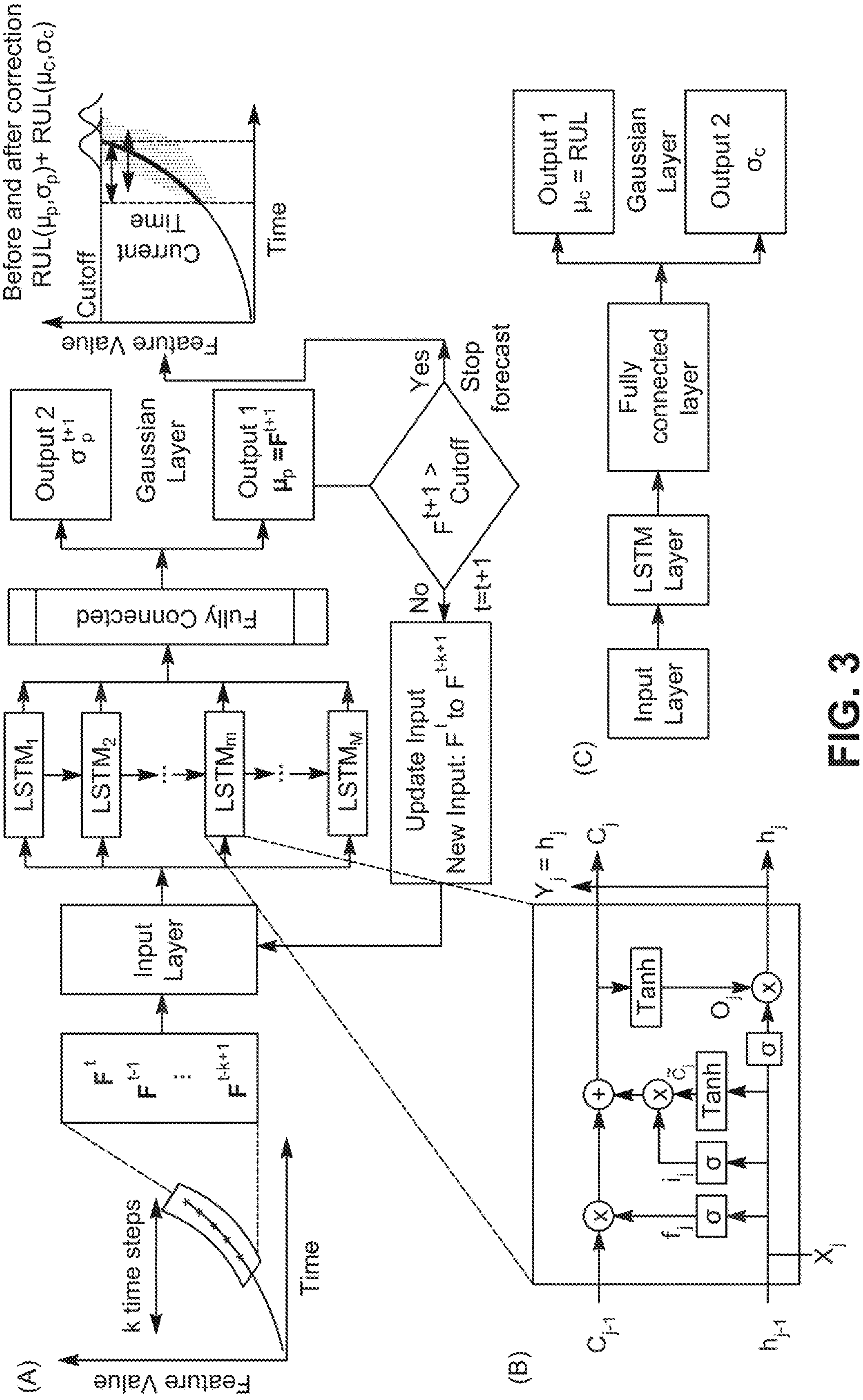
FIG. 3 illustrates one example of a predictor LSTM architecture, an example of a fundamental LSTM unit, and an example of a Corrector LSTM schematic.

The proposed model utilizes LSTM networks for forecasting the bearing health condition. LSTMs utilize memory cells in addition to standard RNN units which help in retaining useful information for both long and short periods of time and do not face the issue of vanishing gradients common to RNNs. The basic architecture of the proposed model is shown in FIG. 3. The structure of an LSTM memory cell is shown in FIG. 3, panel B where each cell contains three gates (1) forget gate, (2) input gate, and (3) output gate. The equations for the gates within the memory cell can be described as Forget Gate:

$f_j=\sigma(w_f[h_{j-1},X_j]+b_f)$ (3) where the sigmoid layer takes the input $X_j$ and the output of the previous LSTM block $h_{j-1}$ to determine which parts from the old output be removed and $w_f$ is the weight of the forget gate with bias $b_f$.

Input Gate:

$$i_j = \sigma(w_i[h_{j-1}, X_j] + b_i) \tag{4}$$

$$\tilde{c}_j = \tanh(w_c[h_{j-1}, X_j] + b_c) \tag{5}$$

$$c_j = f_j \otimes c_{j-1} + i_j \otimes \tilde{c}_j \tag{6}$$

where the sigmoid layer decides which of the new information be stored and tanh(·) creates all possible values from the input $X_j$. These two are then multiplied to update the new cell state $\tilde{c}_j$. This new memory is added to the previous cell state $c_{j-1}$ after the forget $w_i$ and $w_c$ are the respective weights of the input gate with corresponding biases $b_i$ and $b_c$.

Output Gate:

$$o_j = \sigma(w_o[h_{j-1}, X_j] + b_o) \tag{7}$$

$$h_j = o_j \otimes \tanh(c_j) \tag{8}$$

where the sigmoid layer determines the output of the cell. tanh(·) generates all possible values which when multiplied to the output $o_j$ becomes selective of the output. $w_o$ and $b_o$ are respectively the weight and bias of the output gate. One important thing to note is the use of tanh(·) in the input and the output gates overcome the vanishing gradient problem where the second derivative of the internal state variables can sustain for a long range before becoming zero.

2.2.2 Gaussian Layer for Uncertainty Quantification

Traditional deep neural networks (DNNs) like LSTMs are designed for a single output prediction (or a point prediction), which can be viewed as an overconfident prediction. For practical applications like bearing failure, overconfident RUL predictions are dangerous and costly as they might either lead to premature maintenance requests (due to an early prediction) or catastrophic failure of the bearing and connected equipment (due to a late prediction). On the other hand, models that quantify the uncertainty of RUL prediction allow the user to make risk-based maintenance decisions that balance out maintenance resource requirements while avoiding early maintenance triggers stemming from low confidence prediction models. Probabilistic DNNs are often achieved through Bayesian formalism where the parameters of the DNN are subjected to a prior distribution and after training, the posterior distribution over the parameters is computed which can then be used to quantify predictive uncertainty. To make the Bayesian implementation tractable for DNNs, a variety of approximations such as Markov Chain Monte Carlo (MCMC) are used. However, Bayesian methods are computationally more expensive and model training takes more time when compared to non-Bayesian methods. To address this issue in DNNs, Monte Carlo dropout was proposed by Gal et al. [44]. Also, Lakshminarayanan et al. proposed a simple and scalable technique for predictive uncertainty estimation by using a proper scoring rule during training combined with model ensembles [56], which we use in our work for estimating uncertainty in bearing prognostics. For input features x, we use an LSTM network to model the prediction distribution $p_\theta(y|x)$ for real-valued output y and h are the parameters of the LSTM network. We first state the methodology for a single LSTM model and then later combine them to generate an ensemble of LSTM models.

A scoring rule is used to measure the quality of the prediction $p_\theta(y|x)$ giving a higher numerical score to better-calibrated predictions. Let the scoring rule be $S(p_\theta(y|x))$ and the true distribution be q(y, x). The expected scoring rule is $$S(p_\theta, q) = \int q(y, x) S(p_\theta, (y, x))\, dydx \tag{9}$$

$$S(p_\theta, q) \leq S(p, q);\ S(p_\theta, q) = S(q, q)\ iff\ p_\theta(y|x) = q(y|x) \tag{10}$$

Therefore, by minimizing the loss function $\mathcal{L}(\theta) = -S(p_\theta, q)$, $p_\theta(y|x)$ can approach $q(y|x)$. When maximizing the likelihood, the score function can be given as $S(p_\theta(y, x)) = \log p_\theta(y|x)$ which satisfies the Gibbs inequality. Commonly used loss functions like mean squared error stated as $$MSE = \sum_{n=1}^{N} (y_n - \mu(x_n))^2$$

for a training dataset containing N datapoints of (x, y) do not capture predictive uncertainty. We, therefore, devise a Gaussian layer (see FIG. 3, panel A) which gives two outputs: the predicted mean $\mu(x)$ and variance $\sigma^2(x)$. By treating the sample values to obey the Gaussian distribution with the predicted mean and variance, we minimize the negative log-likelihood (NLL) criterion $$-\log p_\theta(y_n|x_n) = \frac{\log \sigma_\theta^2(x)}{2} + \frac{(y - \mu_\theta(x))^2}{2\sigma_\theta^2(x)} + \text{constant} \tag{11}$$

In other words, training the model using the scoring rule gives two outputs: mean $\mu(x)$ and variance $\sigma^2(x)$ accounting for the aleatoric uncertainty, which is a measure of the variation within each prediction model. On the other hand, the accuracy of a deep learning model depends on the amount of data available, leading to epistemic uncertainty which we capture through an ensemble of LSTM networks. With the availability of more data, the predictions of the LSTM networks in the ensemble tend to merge, thereby reducing the epistemic uncertainty. Each LSTM network in the ensemble is trained independently through different weight initializations and shuffling the input data. To that end, we train M=5 LSTM models on the same data that only differ through the learned parameters $\theta_m$. One could also change the number of LSTM unit cells among different LSTM networks and still obtain good uncertainty estimations. We then treat the ensemble as a uniformly weighted mixture model and combine the predictions as $$P(y|x) = \frac{1}{M} \sum_{m=1}^{M} p_{\theta_m}(y|x) \tag{12}$$

In our study, $p_{\theta_m}(y|x)$ refers to the Gaussian probability distribution of the forecast trajectory of $$V_{0.2\omega-sf/2}^{RMS}$$

of each of the M LSTM models. We can further derive that the ensemble of all the LSTM models to also be Gaussian with the mean and variance taking the following forms $$\mu_*(x) = \frac{1}{M} \sum_{m=1}^{M} \mu_{\theta_m}(x) \tag{13}$$

$$\sigma_*^2(x) = \frac{1}{M} \sum_{m=1}^{M} \left(\sigma_{\theta m}^2(x) + \mu_{\theta m}^2(x)\right) - \mu_*^2(x). \tag{14}$$

2.2.3 Proposed Model Architecture

The proposed model is an ensemble of multiple simple LSTMs with a Gaussian layer for uncertainty quantification. The proposed method involves three steps 1) Predictor LSTM ensemble (EnPLSTM): where the feature $$V_{0.2\omega-sf/2}^{RMS}$$

is forecasted to a certain alarm threshold and hence predict the RUL.

2) Corrector LSTM ensemble (EnCLSTM): where the output of the EnPLSTM is used to determine the possible correction to the RUL.

3) Temporal fusion: where the predictions from the recent past are considered to provide a final RUL prediction.

2.2.3.1. Predictor LSTM Ensemble (EnPLSTM).

The EnPLSTM consists of individual predictor LSTM (PLSTM) models for which the input at any time t consists of the feature values of the previous k timesteps, $F^{t-k+1}$, $F^{t-k+2}$, . . . , $F^t$ (k is also called the lookback time step). The input has the form (#samples×k×$n_{features}$) with the output being the next-step feature prediction, $F^{t+1}$ (here $n_{features}$=1 as we only forecast $$F = V^{RMS}_{0.2\omega-sf/2}).$$

We then march forward in time until the cutoff is reached at $T_{cutoff}$ and determine the mean value of RUL as $$\mu_m^{RUL}(t) = T_{cutoff} - t.$$

The use of a Gaussian layer for each PLSTM model provides information about the uncertainty in the forecast feature which can then be used to determine the uncertainty in the RUL prediction at every time instant $$\sigma_m^{RUL}(t).$$

After performing the ensemble of all the PLSTMs using eqns. (13) and (14), we obtain RUL($\mu_{*p}$, $\sigma_{*p}$) as the final output of the EnPLSTM. The schematic in FIG. 3 (panel A) refers to just one PLSTM network and Table 1 lists the various layers in each PLSTM model with k=20. The Gaussian layer in Table 1 has two outputs—the mean and standard deviation of the next step prediction. Each PLSTM model consists of 16,142 parameters which is at least two orders of magnitude smaller than some of the other contemporary deep learning models that quantify uncertainty [36].

2.2.3.2. Corrector LSTM Ensemble (EnCLSTM).

The input and output of the PLSTM model are respectively the features from the previous k time steps and the next step prediction. We observe the RUL prediction of a trained EnPLSTM shows deviation from $RUL^{true}$ even for the training dataset. We note that our approach of forecasting is different from the commonly used bearing prognostic approach of directly mapping features to RUL, in which case we can expect a good RUL fit at least for the training dataset. In other words, RUL becomes a secondary outcome of the EnPLSTM method unlike a primary output when developing feature-RUL mapping models. Therefore, the EnPLSTM is used to evaluate the error in RUL prediction on the training dataset. The error in forecasting for each bearing can be quantified as $\Delta RUL(t)=RUL^{true}(t)-RUL(t)$.

A shown in FIG. 3 (panel C), the architecture of the CLSTM model is similar to that of the PLSTM model with two differences: (1) the input now includes RUL($\mu_{*p}$) the EnPLSTM model, in addition to the input to the predictor step, and (2) the output is now ΔRUL(t), rather than the next-step feature prediction. Unlike the EnPLSTM (which is a one-step-ahead prediction), the EnCLSTM attempts to map the RUL prediction error. The architecture of a single CLSTM model is shown in Table 2 with the LSTM layer having 80 hidden units. The shape of the input layer is (sample, 20, 2) with a lookback of 20-time steps with two features:

$$RUL(\mu_{*p}) \text{ and } V^{RMS}_{0.2\omega-sf/2}.$$

The final output from the Gaussian layer is the mean and standard deviation of the error correction ΔRUL($\mu_c$, $\sigma_c$). After training, the CLSTM model gives an estimate of the mean and standard deviation of the error ΔRUL($\mu_c$, $\sigma_c$), which after ensemble (following the same logic as in eqns. 13-14) becomes ΔRUL($\mu_{*c}$, $\sigma_{*c}$).

The correction term ΔRUL($\mu_{*c}$, $\sigma_{*c}$) can be positive or negative, however, in our experience, we find that the PLSTM model, generally, underpredicts the RUL during the early stage of bearing degradation but converges to actual RUL in the second half of the bearing life. In other words, at the beginning of bearing degradation, the CLSTM model plays a significant role but loses importance as the bearing approaches EOL. To this end, we combine ΔRUL($\mu_c$, $\sigma_c$) and ΔRUL($\mu_{*c}$, $\sigma_{*c}$) a weight which is a function of the feature value $$W\left(F = V^{RMS}_{0.2\omega-\frac{sf}{2}}\right).$$

The net RUL prediction RUL($\mu_{final}$, $\sigma_{final}$) can be stated as $$RUL(\mu_{net}, \sigma_{net}) = RUL(\mu_{*p}, \sigma_{*p}) + W\left(F = V^{RMS}_{0.2\omega-\frac{sf}{2}}\right)\times \Delta RUL(\mu_{*c}, \sigma_{*c}) \tag{15}$$

A logistic sigmoidal function is used as the weight function $$W\left(F = V^{RMS}_{0.2\omega-\frac{sf}{2}}\right)$$

with the sigmoid midpoint $F_0$ pinned at 1.25 times the feature value at FPT.

$$W(F) = 1 - \frac{1}{1 + e^{-\alpha(F-F_0)}} \tag{16}$$

where α determines the growth rate/steepness of the sigmoidal curve and $$F_0 = 1.25\times F(t = t_{FPT}) = 1.25\times V^{RMS}_{0.2\omega-\frac{sf}{2}}(t = t_{FPT}).$$

2.2.3.3. Temporal Fusion.

Rapid changes in the vibration measurements can often lead to highly time-varying RUL predictions, especially when using data mapping models like the CLSTM. Sudden changes in the RUL predictions are not physically meaningful from a maintenance perspective. We, therefore, devise a simple technique where the RUL predictions in the recent past are weighed in to make a final prediction. A simple half-normal weighting function is used to determine the importance of the RUL predictions where the predictions closest to the current time get more weight than those in the distant past. At a time t, the RUL prediction after temporal fusion RUL($\mu_{tf}$(t)) can be stated as $$RUL(\mu_{tf}(t)) = \sum\nolimits_{i=0}^{L} \overline{W_{tf,i}} \times (RUL(\mu_{net}(t-i)) - i) \tag{17}$$

$$W_{tf,i} = \frac{1}{\sigma_{tf}} e^{\left(-\left(\frac{i\Delta f}{2\sigma_{tf}}\right)^2\right)} \tag{18}$$

-continued $$\overline{W_{tf,i}} = \frac{W_{tf,i}}{\sum_{i=0}^{L} W_{tf,i}} \tag{19}$$

where L is the number of discrete past RUL predictions the user wants to consider, $\Delta t$ is the time interval between two consecutive RUL predictions and $\sigma_{tf}$ is a user-defined parameter that accounts for the spread of the half-normal curve. A larger value of $\sigma_{tf}$ would give more similar weights to recent RUL predictions whereas a smaller value of $\sigma_{tf}$ gives more importance to the current RUL prediction at time t. The weights across the (L+1) RUL predictions are normalized in Eq. (19). We observe that performing temporal fusion provides smoother RUL prediction curves while also reducing the RMSE error. The entire algorithm is presented in Table 3.

2.3. Models for Comparison

In this section, we briefly present three data-driven approaches, which are (1)CNN-based feature-RUL mapping, (2) similarity based interpolation, (3) Monte Carlo (MC) Dropout, and two model-based approaches, (1) optimized particle filter and (2) regression fitting. In a later section, we compare the performance of the proposed model against these four benchmark models typically employed in prognostic literature.

CNN

Traditionally, CNN was used for image processing to capture spatial and temporal dependencies of image features by application of several filters [57-59]. Many bearing prognostic models were built upon a CNN framework [31-33] and we, therefore, adopt a basic CNN architecture in our study to compare against our proposed method. Each input sample at a given time t of the CNN model is the set of 24 features for the previous 20-time steps and the output is the corresponding RUL of the bearing.

The CNN model consists of six convolution blocks, a dropout layer, and two fully connected layers. The convolution blocks contain three layers, namely, 1-D convolution, 1-D batch normalization, and a Leaky ReLU nonlinear activation function. The dropout layer serves to prevent overfitting of the training data. The two fully connected layers further reduce the features generated by the convolution blocks to a single output, the estimated RUL. The CNN model was implemented using PyTorch in a Python environment configured to run on a single Nvidia RTX-2070 video card with κ Gb of onboard graphics memory. The model was trained for 100 epochs using AdamW optimizer with beta 1 of 0.5, beta 2 of 0.999, weight decay of 0.01, and initial learning rate of 0.001. The training was performed with mean squared error as the loss function.

2.3.2. Similarity-Based Interpolation

Figure 4A:
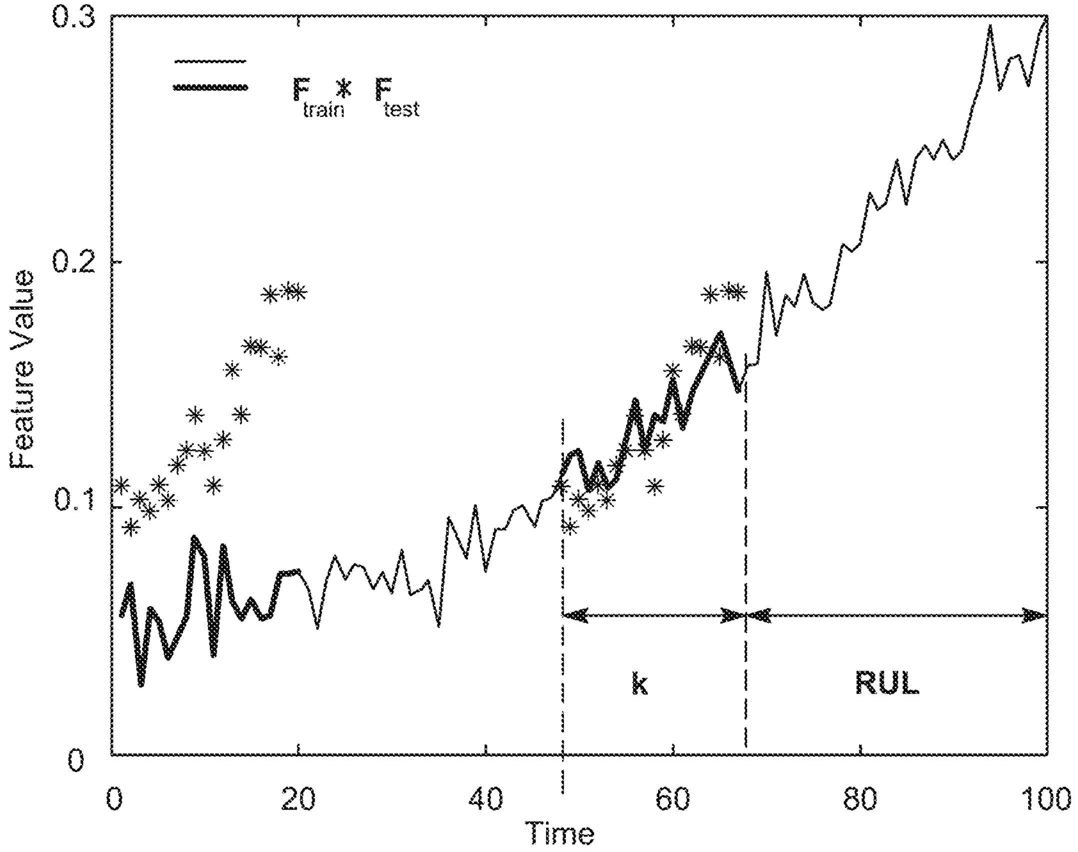
FIG. 4A illustrates a depiction of similarity-based interpolation for RUL prediction.
Figure 4B:
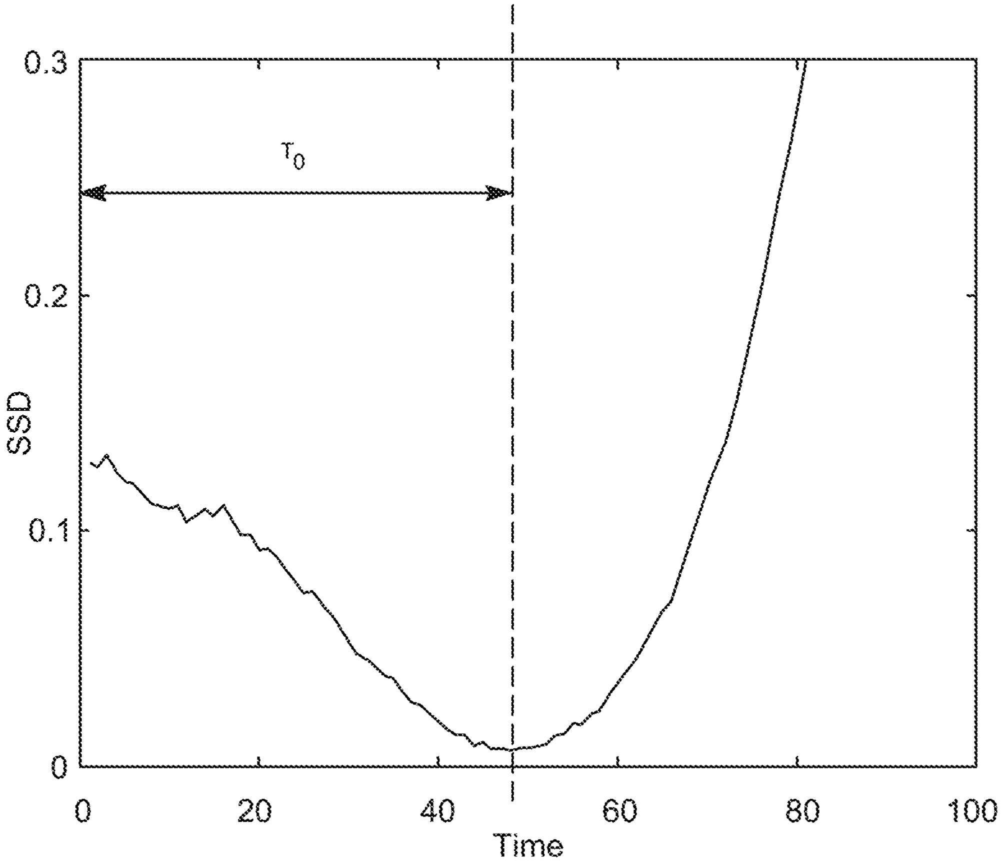
FIG. 4B illustrates a variation of SSD and determination of $T_0$.

Similarity-based interpolation is a data-driven prognostic approach where a portion of the bearing health data, such as the feature development $F_{test}$ from a test bearing is compared against similar feature(s) from the training dataset $F_{train}$. The hypothesis of this method is that the partial $F_{test}$ is similar to an equal-sized portion from $F_{train}$, the time-scale of which is determined by optimizing the difference between the two data [60-63]. To predict the RUL of a test bearing at time t, the test feature $F_{test}$ in our study will be the $$V^{RMS}_{0.2\omega-\frac{sf}{2}}(t-l+1 \rightarrow t)$$

respect to each training bearing, $F_{test}$ is displaced along the time axis and the time instant which the sum of squared differences (SSD) between $F_{test}$ and $F_{train}$ is minimum is determined. FIG. 4 depicts the procedure for determining $T_0$. Mathematically, this can be stated as $$\min SSD = \sum_{j=1}^{k} (F_{test}(t-j+1) - F_{train}(T_0+k-j))^2 \tag{20}$$

subject to $T_0 \epsilon [0, L-k]$ where L is the total life of the training bearing dataset. $T^0$ determined from Eq. (20) is then used to calculate RUL based on the training dataset given as $$RUL = L - k - T_0 \tag{21}$$

In many cases, the training dataset consists of run-to-failure vibration data from multiple bearings (say $n_{train}$ in number) and RUL determined from Eq. (21) for each of the bearings in the training dataset can be added using a simple weight function which is the inverse of SSD. In other words, a smaller value of SSD indicates greater similarity, and the appropriate RUL is given greater importance. This can be stated as $$RUL_{net} = \frac{1}{W} \sum_{i=1}^{n_{train}} W_i \times RUL_i \tag{22}$$

$$W = \sum_{i=1}^{n_{train}} W_i \tag{23}$$

$$W_i = \frac{1}{SSD_i} \tag{24}$$

A major advantage of this method is the non-requirement of defining failure. However, this method cannot guarantee that the RUL prediction converges to true RUL as the bearing is close to EOL.

2.3.3. Optimized Particle Filter

Particle filter (PF) is based on the concepts of Bayesian inference and the sequential Monte Carlo method and excels in modeling dynamic non-linear systems [64]. PF has been found to be successful in other bearing prognostics studies [65-67]. A set of random particles approximately satisfying the model equations are used for estimating the potential RUL with uncertainty. However, this method is very sensitive to the initial guess of the system state and resampling strategies and improper selection of the same often leads to degeneracy or leading to loss of particle diversity [68]. The fundamentals of PF are briefly described with our implementation of PF with optimized initial states utilizing Latin-hypercube sampling.

Modeling the state and measurement equations for bearings can be quite complex as the failure modes are quite diverse and we, therefore, use a combination of exponential and linear terms in describing the development of bearing features over time. Mathematically, we use the following equations:

State Transition Equation:

$$a_t = a_{t-1} + u_{1,t},\ b_t = b_{t-1} + u_{2,t},\ c_t + u_{3,t} \tag{25}$$

Measurement Equation:

$$y_t = a_t e^{b_t(t-FPT)} + c_t(t - t_{FPT}) + v_t \tag{26}$$

$y_t$ is the feature measurement (obtained from vibration data) at time t, $u_1$, $u_2$, $u_3$, v are the Gaussian noise variables with a certain standard deviation (and zero mean). Proper execution of PF involves the following steps (1) particle initialization, (2) state update, (3) particle weight update, (4) resampling, and (5) state estimation (which we describe in Table D.1).

As measurements are collected in real-time, the system parameters of the particles are trained to start from the initial guess, and the updated state of the particles is used to forecast the features until a threshold is reached and hence obtain the $RUL^j$ for the $j^{th}$ particle. The effective RUL is obtained by a weighted sum of $j^{th}$. This can be mathematically expressed as $$RUL^j(t) = \underset{t^*}{\text{Solve}}\left(a_t^j e^{b_t^j t^*} + c_t^j t^* = \text{cutoff}\right) - (t - t_{FPT}) \tag{27}$$

$$RUL(t) = \sum_{j=1}^{N_p} W_t^j \times RUL^j(t) \tag{28}$$

Often the selection of the initial state values (which can be considered as hyperparameters) is heuristic and can change from bearing to bearing which defeats the purpose of a generalized PF model. To this end, we develop the PF algorithm by optimizing the initial state parameters $\{a_0, b_0, c_0\}$ on the training bearing dataset by minimizing an RUL prediction error metric and using the same initial state for the test bearings.

3. Case Study Using the XJTU-SY Dataset

In this section, we demonstrate the advantage of our proposed prognostic method utilizing the run-to-failure vibration data provided by Ref. [29]. We also compare our proposed method against the methods described in Section 2.3.

3.1. Dataset

Figure 5A:
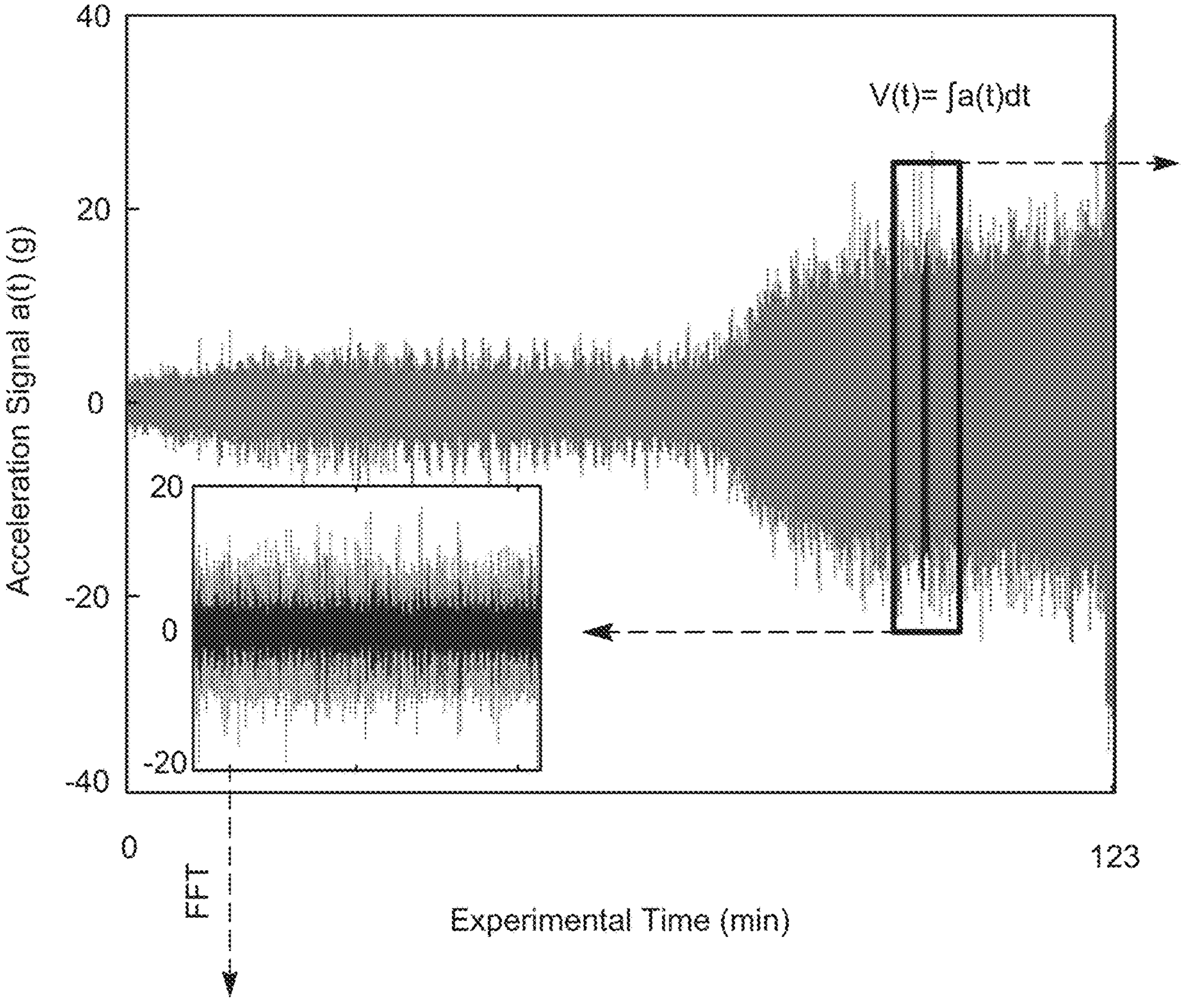
FIG. 5A illustrates a run-to-failure vibration data for Bearing 1_1 with a snapshot of the vibration signal collected at t=100 min.
Figure 5B:
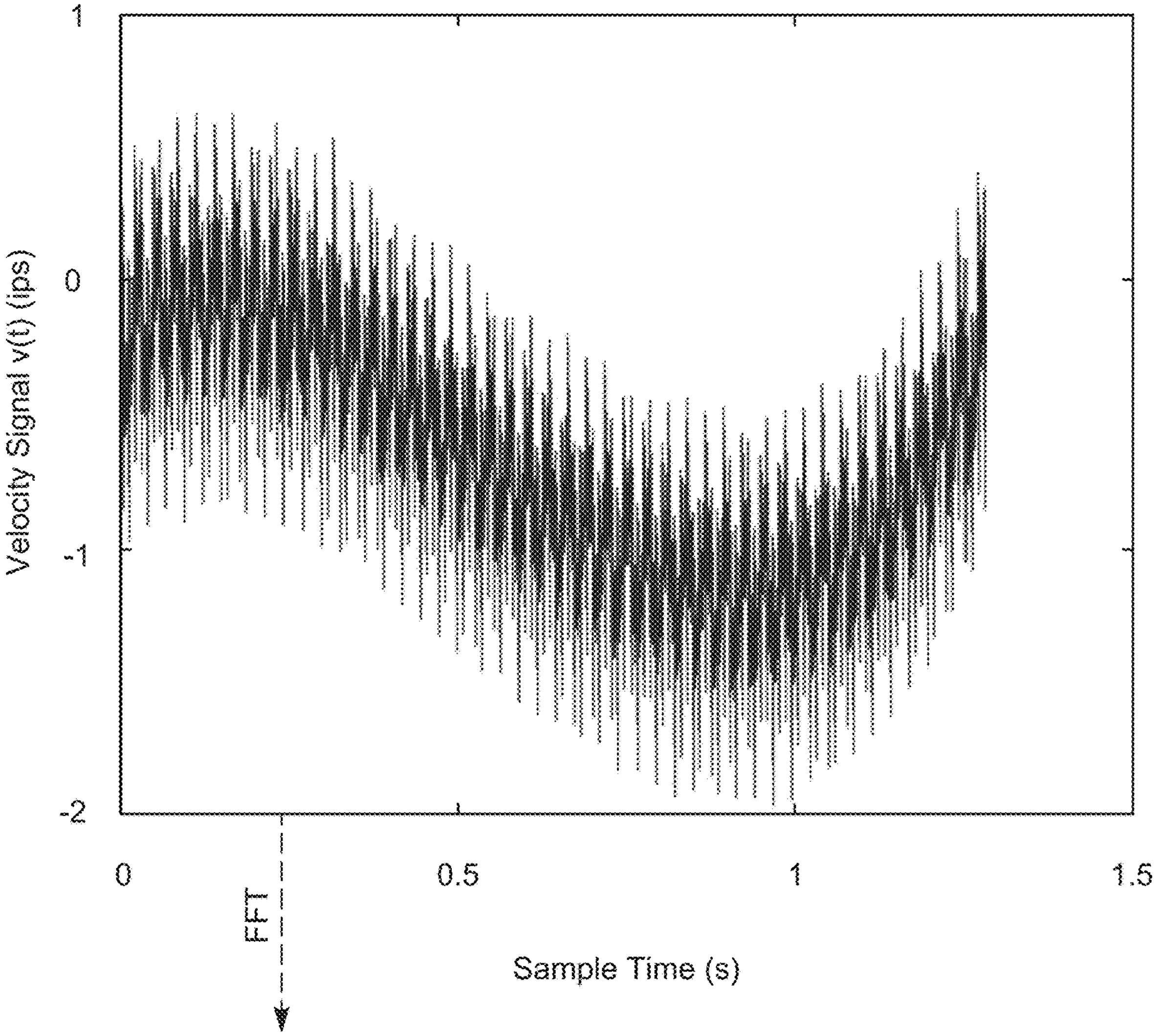
FIG. 5B illustrates a corresponding velocity signal at t=100 min.
Figure 5C:
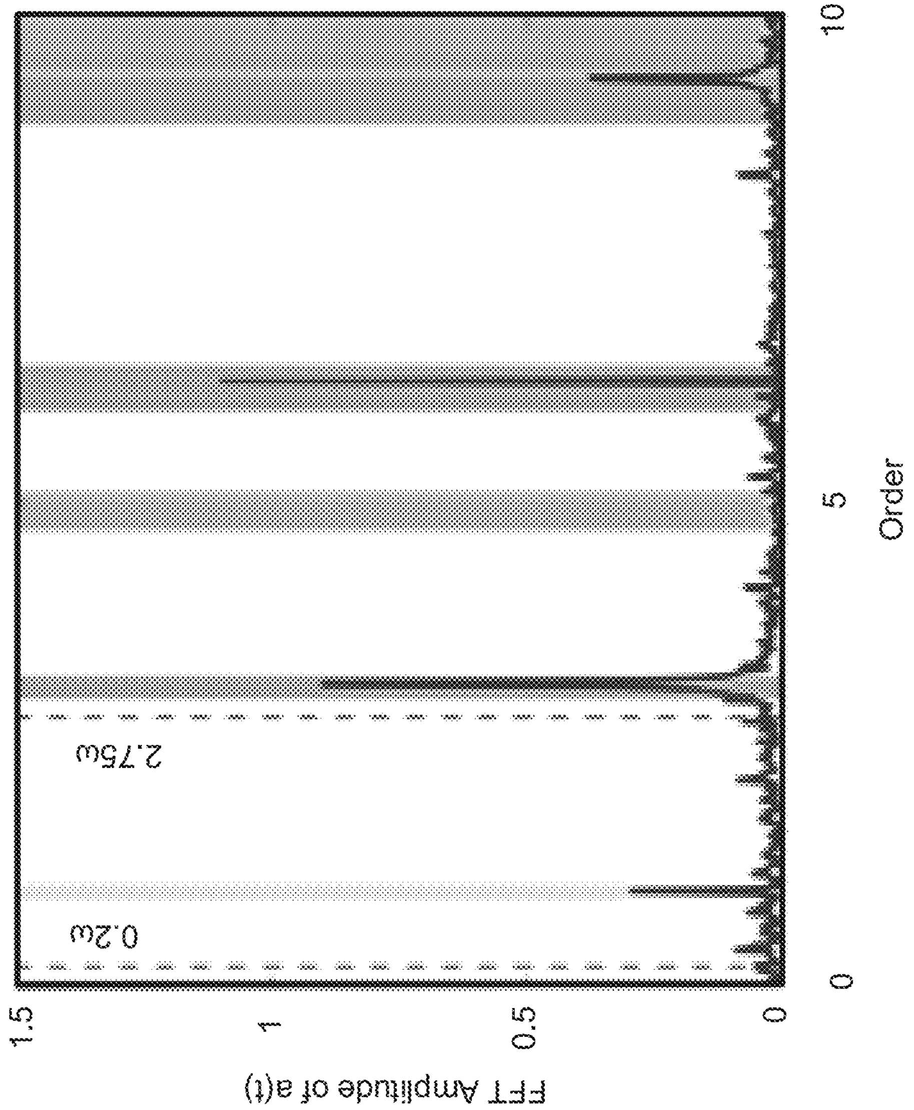
FIG. 5C illustrates the FFT spectra of the acceleration signals along with BPFO and BPFI.
Figure 5D:
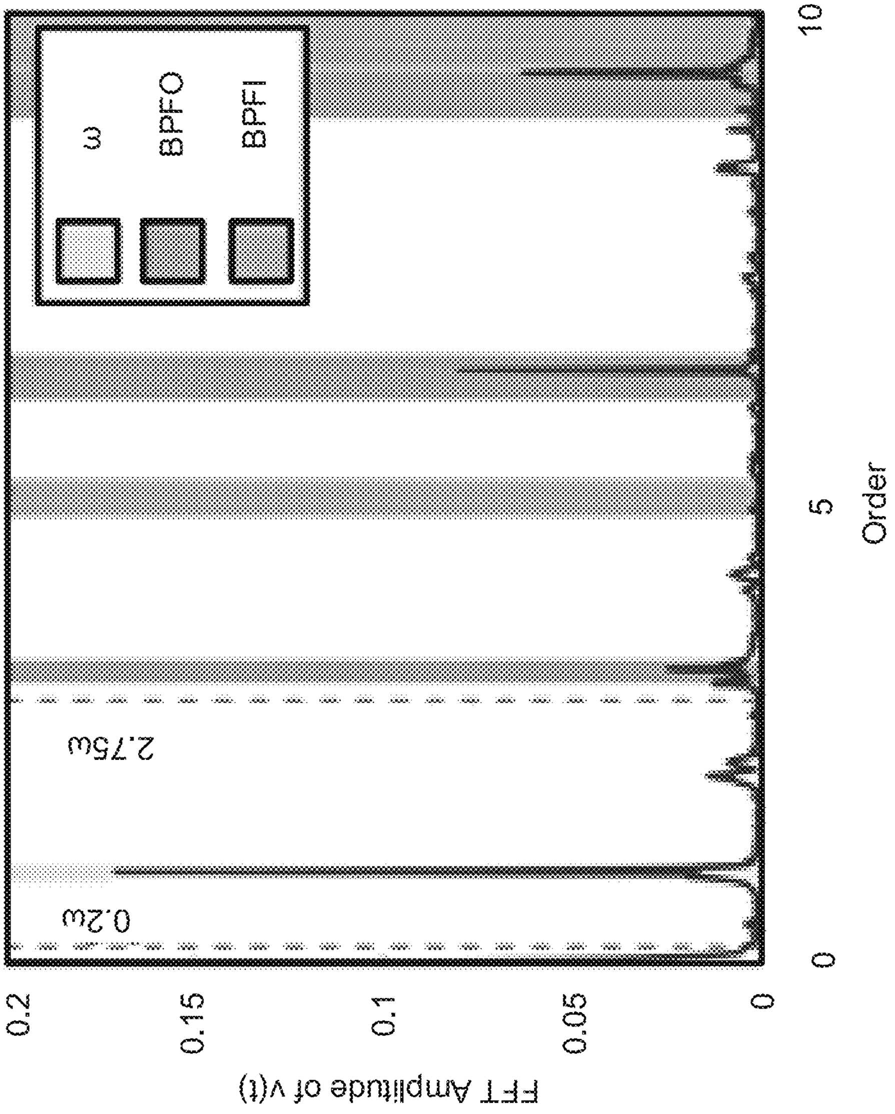
FIG. 5D illustrates the FFT spectra of the velocity signals along with BPFO and BPFI.

The XJTU-SY bearing dataset consists of run-to-failure vibration data of 15 rolling element bearings (LDK UER204). The failure of these bearings is accelerated by applying a radial load. The 15 bearings are divided into three groups of 5 bearings and each group is subject to a certain radial load and rotational speed (see Table 4). Two PCB 352C33 accelerometers are mounted perpendicularly along the radial direction, which the authors of Ref. refer to as horizontal and vertical directions. We refer to the same as vibrations in the x and y directions consistent with the schematic shown in FIG. 2. Data is collected for 1.28 sec every minute at a sampling frequency of 25:6 kHz. For further details regarding the experimental setup, we refer the readers to Ref. [29]. FIG. 5A shows the run-to-failure vibration data obtained from the accelerometer mounted in the x direction for Bearing 1_1. The reported total life of the bearing is 123 min with vibration measurements taken at every minute. For purposes of illustration, we highlight the vibration data obtained at t=100 min in FIG. 5A and also show the corresponding FFT of this signal in FIG. 5C. Since the provided data is obtained from accelerometers whereas our proposed method is primarily aimed at bearing prognostics using ISO standards, we first convert the acceleration signal into the velocity domain by integration (see section 2). The result of integration is shown in FIG. 5B and the corresponding FFT of v(t=100) is presented in FIG. 5D. Numerical integration of the acceleration signal introduces low-frequency component as can be seen by a wavy nature of v(t) This can also be seen in the FFT of v(t) in FIG. 5D where we can observe large amplitudes in the very low-frequency domain of $<0.2\omega$. This numerical artifact is taken care of by considering the RMS value calculated from $f<0.2\omega$. The fault frequencies for this bearing are determined to be BPFO=3.080 and BPFI=4.92ω. In FIG. 5C and FIG. 5D, we also show 1×, 2× and 3×BPFO±5% Hz bands, 1× and 2×BPFI±5% Hz bands (as defined in section 2.1). One can observe peaks in BPFO bands indicating an outer race fault which is also confirmed in Ref. [29]. Also, the process of integration into the velocity domain preserves the peaks at characteristic fault frequencies.

3.2. FPT Determination

Figure 6:
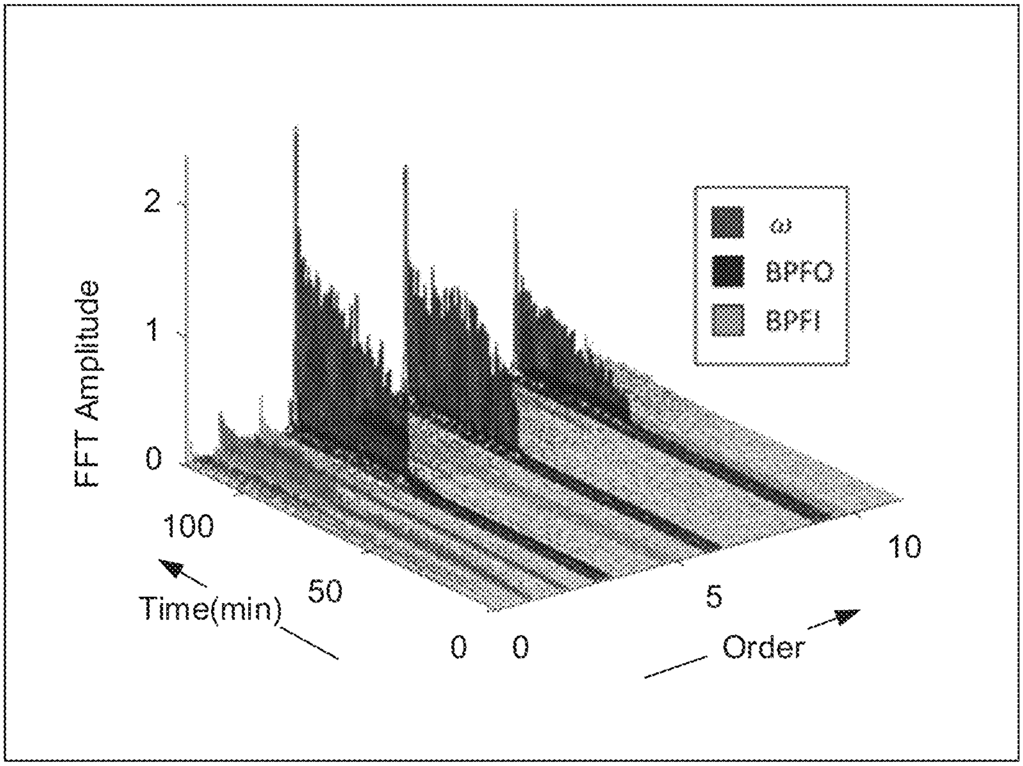
FIG. 6 is a waterfall plot of the FFT for Bearing 1_1 with characteristic fault frequency bands.

The bearing prognostic algorithm is triggered at FPT as this marks the beginning of bearing degradation. Before we present the results of FPT on this dataset, we first show a waterfall plot revealing the development of a bearing fault in the frequency domain. FIG. 6 shows the FFT waterfall plot of Bearing 1_1 within the first ten orders of shaft frequency. One can observe the advent of an outer race defect at around 80 min which is accompanied by an increase in FFT amplitudes in the BPFO characteristic frequency range (and its harmonics). We have suppressed the DC component (f=0 Hz) of the FFT for presentation purposes.

As stated in section 2.3, FPT is determined by the 2σ method applied on $$V^{RMS}_{BFF-sf/2}$$

where BFF refers to the bearing fault frequencies BFF=0.9 min(BPFO, BPFI, BSF). In this study, we neglect BSF; and hence we get BFF≅2.75ω. We mark this frequency in FIG. 5C and FIG. 5D. In FIG. 7 we show the variation of $$V^{RMS}_{0.2\omega-sf/2}$$

and $$V^{RMS}_{2.75\omega-sf/2}$$

for two candidate bearings, Bearing 1_1 and Bearing 2_3, in both the x and y directions. Several observations can be made from FIG. 7. First, $$V^{RMS}_{0.2\omega-sf/2}$$

which is a measure of the overall health of the bearing assembly is always greater than $$V^{RMS}_{2.75\omega-sf/2}$$

which primarily measures the bearing health condition. This stems from the fact that the energy within the frequency range of 0.2ω–sf/2 and 2.75ω–sf/2. As a corollary, a large difference between $$V_{0.2\omega-sf/2}^{RMS} \text{ and } V_{2.75\omega-sf/2}^{RMS}$$

is indicative of synchronous defects such as shaft unbalance, misalignment and mechanical looseness. On the contrary, a smaller difference between the two RMS values indicates a good fit/assembly. As can be seen in FIG. 7, Bearing 1_1 experiences a relatively larger degree of synchronous faults RMS when compared to Bearing 2_3. Second, $$V_{2.75\omega-sf/2}^{RMS}$$

is much more stable than $$V_{0.2\omega-sf/2}^{RMS}$$

and is therefore a good metric to determine the FPT using the 2σ method. On the other hand, $$V_{0.2\omega-sf/2}^{RMS}$$

is used to determine the EOL, based on the cutoff of 0.3 ips, as it reflects the overall vibration energy levels within the system. Third, the FPT and EOL vary in both directions for both bearings. We, therefore, determine the effective FPT conservatively by choosing the earlier occurrence of $t_{FPT_x}$ and $t_{FPT_y}$.

$$t_{FPT} = \min\left(t_{FPT_x}, t_{FPT_y}\right) \tag{29}$$

The effective EOL is determined when the overall RMS reaches the threshold value in both x and y directions to ensure good utility of the bearing and avoiding early maintenance.

$$t_{EOL} = \min\left(t_{EOL_x}, t_{EOL_y}\right) \tag{30}$$

3.3. Development of the Proposed Model

In this section, we first describe the test-train data for cross validation followed by a parametric study, focused on the PLSTM model. We then depict the advantage of the proposed model when compared to other models discussed in section 2.6.

3.3.1. Cross-Validation

A 5-fold cross-validation study is conducted on the set of 15 bearings. The five folds are as follows:

Fold-1: Bearing 1_1, Bearing 2_1, Bearing 3_1
Fold-2: Bearing 1_2, Bearing 2_2, Bearing 3_2
Fold-3: Bearing 1_3, Bearing 2_3, Bearing 3_3
Fold-4: Bearing 1_4, Bearing 2_4, Bearing 3_4
Fold-5: Bearing 1_5, Bearing 2_5, Bearing 3_5

While performing the cross-validation study, one fold is chosen to be the test set while the other four folds are used for training the models. For example, for the first cross-validation trial, Fold-1 serves as the test set whereas Folds 2, 3, 4, and 5 are used for training the model. Cross-validation ensures the generality of the model and any result of a bearing presented hereafter is obtained when the bearing is a part of the test set during the cross-validation study.

3.3.2. Evaluation Criteria

Several evaluation criteria are used to evaluate and compare the performance of all the models in terms of prediction error as well as uncertainty quantification. First, the root mean squared error (RMSE) is calculated as $$RMSE = \sqrt{\frac{1}{(T - t_{FPT} + 1)} \sum_{t=t_{FPT}}^{T} \left(RUL^{true}(t) - RUL(t)\right)^2} \tag{31}$$

where $RUL^{true}$ (t) and RUL (t) are respectively the true RUL and predicted RUL at time t and T is the total duration of RUL prediction. RMSE is a measure of the error in RUL prediction from FPT to EOL. Another important feature of a good prediction model is the convergence to the true RUL as bearing approaches EOL. To assess this, we use a weighted RMSE which can be defined as $$wtRMSE = \sqrt{\frac{1}{(T - t_{FPT} + 1)} \sum_{t=t_{FPT}}^{T} \overline{w(t)}\left(RUL^{true}(t) - RUL(t)\right)^2} \tag{32}$$

where $\overline{w(t)}$ is the weight assigned to the squared prediction error at time t and this weight increases as the bearing approaches its EOL. To obtain $\overline{w(t)}$, we first defined weight w(t) as w(t)=t–$t_{FPT}$ and then normalize as $$\overline{w(t)} = \frac{w(t)}{\sum_{t=t_{FPT}}^{T} w(t)}.$$

Uncertainty quantification metrics are adapted from Refs. [69,70] with a schematic shown in FIG. 8. A good prognostic model would have decreasing uncertainty when approaching EOL to provide more confident RUL predictions. To quantify this, an accuracy zone (see FIG. 8), bounded by $RUL^{true}$ (t)(1+α %), is used to determine several metrics: (1) α-accuracy, which is defined as the number of predicted RUL points within the accuracy region with respect to the total number of predictions, (2) β-probability, which is the average of the probability mass of the RUL ðtÞ PDF within the accuracy region and (3) percentage of early predictions (PEP) which measures the number of RUL(t) prediction below $RUL^{true}$(t). It is preferred that α-accuracy approaches 100% where most RUL prediction points are within the accuracy zone. Ideally, β probability should be equal to 1 indicating a model to have a compact confidence interval which also decreases as the bearing approaches EOL. The PEP metric provides insight into how conservative a given prognostic model is.

3.3.3. LSTM Parametric Study

A parametric study is important to optimize the model hyperparameters, such as the number of hidden units in the LSTM models, lookback k, the number of epochs, etc. For brevity, we only present the parametric study related to the number of hidden units in PLSTM. FIG. 9A shows both the RMSE and wtRMSE of the PLSTM model on the training dataset for six different numbers of hidden units within the LSTM layer. By using a fewer number of hidden units (and hence fewer parameters), the deep learning model is too simple and becomes less sensitive to variation in the input data. On the other hand, using too many hidden units makes the model overly complex for the amount of data available tending towards overfitting. For the XJTU-SY dataset, we find that using 60 hidden units provides minimum RMSE and wtRMSE.

Like any other prognostic model, LSTM-based architecture also has its limitations. Particularly in the bearing prognostic scenario, we find the following challenges: (1) very noisy feature data, (2) limited training data, and (3) most of the training data is in the domain pertaining to a healthy bearing suppressing learning from the bearing degradation domain. Although the third scenario can be tackled by considering only the bearing degradation data for training the LSTM network, this further accentuates the second problem of limited data. The use of data augmentation is particularly useful to address this aspect for a stable forecast. To demonstrate this, we use a simple toy example of linear degradation with noise to train and test an LSTM network as shown in FIG. 9B. When very little data is available and is noisy, the LSTM forecast can almost be flat especially near the onset of bearing degradation. By using data augmentation of duplicating the training data with added Gaussian noise, we observe the forecast to be much more intuitive and stable. To this end, for the XJTU-SY bearing dataset, we add Gaussian noise to $$V_{0.2\omega-sf/2}^{RMS}$$

as a simple data augmentation technique similar to Refs. [71, 72].

3.3.4. RUL Prediction Results

In this section, we first demonstrate the working of the EnP/CLSTM ensemble followed by depicting the RUL prediction results of certain bearings. Finally, we evaluate the various models in terms of accuracy and uncertainty quantification based on the metrics defined in section 2.4. The PLSTM model forecasts $$V_{0.2\omega-sf/2}^{RMS}$$

at a given instant in time till a cutoff of 0:3 ips is reached with uncertainty. FIG. 10A shows the $$V_{0.2\omega-sf/2}^{RMS}$$

forecast of five PLSTM models at t=2470 mins for Bearing 3_2 (cross-validation Fold-2). The use of the Gaussian layer provides information regarding the uncertainty of the forecast which translates to the uncertainty in RUL prediction for each PLSTM model in the form of RUL($\mu_m$, $\sigma_m$)$|_{m=1.5}$. The mean RUL prediction by each PLSTM model, RUL ($\mu_m$)$|_{m=1.5}$, is shown in FIG. 10B (we suppress showing the uncertainty for clarity). An effective RUL, RUL($\mu_{*p}$, $\sigma_{*p}$), calculated using $$\mu_{*p}(t)\frac{1}{5}\sum_{m=1}^{5}\mu_m^{RUL}(t) \text{ and } \sigma_{*p}^2(t)=\frac{1}{5}\sum_{m=1}^{5}\left(\sigma_m^{RUL^2}(t)+\mu_m^{RUL^2}(t)\right)-\mu_{*p}^2(t).$$

We observe from FIG. 10B that the ensemble of the five PLSTM models underpredicts the RUL in the first half of the prediction period and approaches the true RUL in the second half. After implementing the EnCLSTM, the RUL prediction in the first half is increased closer to the true RUL as shown by the line in FIG. 10B. However, the prediction sequences change drastically when there are sudden changes in the measurements. After implementing the temporal fusion step (section 2.5.3), the RUL prediction is smoothened. The 95% confidence interval around the RUL prediction accommodates most parts of the true RUL. Therefore, maintenance decisions can be confidently made according to the uncertainty in RUL prediction.

In FIG. 11A to FIG. 11F, we compare the RUL prediction results from PF, similarity-based interpolation, CNN-RUL correlation, quadratic regression fitting, MC Dropout, and the proposed method for three representative bearings, each from a unique operating condition, viz. Bearing 1_3 (cross-validation Fold-3), Bearing 2_1 (crossvalidation Fold-1), Bearing 3_4 (cross-validation Fold-4). FIGS. 11A and 11B show the RUL prediction of the different models and the corresponding $$V_{0.2\omega-sf/2}^{RMS}$$

for Bearing 1_3 respectively. Here, we can observe that the noisy feature data right from the start of FPT distracts the PF learning, similarity-based approach, and quadratic regression, thus drastically affecting the RUL prediction accuracy. In all the three bearings shown in FIG. 11A-11F, the proposed EnP/CLSTM model shows superior prognostic capability. Also, the similarity-based approach is often observed to overpredict the RUL in the provided bearing dataset. This is because the similarity of the feature development in the test bearing is mapped to an early stage of the training bearings, which leads to overpredicting the RUL. Data mapping methods such as the CNN-RUL, which are not built on physics, have a good chance of predicting highly varying RUL depending on the input.

In Table 5 (see FIG. 20), we compare the proposed model to several probabilistic RUL prediction models, namely optimized particle filter (section 2.3.3) and Bayesian-like Monte-Carlo (MC) Dropout [44]. The models are evaluated using the metrics defined in section 3.3.2 with α=30% in addition to NLL (Eq. (11)). Each entry of Table 5 is the t-distributed 95% confidence interval of all the test bearings. Each model is run independently for five times to ensure consistency. First, the non-Bayesian EnPLSTM model performs at least as good if not better when compared to MC Dropout as also concluded by Refs. [56,73]. Moreover, execution of MC Dropout for prognostics takes considerably longer time than EnP/CLSTM. For example, the execution of trained MC Dropout models on an Intel Core i5 processor with 16 GB RAM, computing the entire prognostic curve for Bearing 3_2 (FIGS. 10A and 10B), takes about 5 min whereas the EnP/CLSTM takes less than 30 s. Also, MC Dropout is observed to over-predict the RUL and hence has a low PEP value (see FIG. 11A to FIG. 11F). On the other hand, both PLSTM and EnPLSTM models provide more conservative RUL estimates and hence have high PEP. Low wtRMSE values of both PLSTM and EnPLSTM models indicate that these models have better accuracy in predicting RUL close to EOL. However, the NLL of the PLSTM is larger as this model only accounts for the aleatoric uncertainty and fails to provide good RUL predictions especially at the onset of bearing degradation. In practice, it is desired to have accurate uncertainty estimates from a model, particularly in safety-critical applications where the model is used in a decision-making framework. The reliability curve of a perfectly calibrated model will fall on the black dashed line in FIG. 12A, indicating that the observed confidence exactly matches the expected confidence. The PLSTM and PF models in FIG. 12A exhibit an extreme level of overconfidence in their RUL predictions, i.e. for most of the reliability curve, the model is observed to provide much lower confidence than is asked, or "expected" of it. The low observed confidence of PF stems from large prediction errors whereas for PLSTM, the overconfidence is primarily due to low aleatoric uncertainty in the forecasts albeit lower prediction errors (see FIG. 12B). The inclusion of the epistemic uncertainty in EnPLSTM leads to a better reliability curve closer to the ideal line. However, after correction, the proposed method is shown to have the best reliability curve of all the probabilistic models, with the least overall deviation from the ideal line. The average absolute prediction error $|\overline{\Delta RUL}|$ in FIG. 12B is calculated based on the RUL predictions outside the expected confidence intervals for all the bearings. The EnPLSTM and MC Dropout models also exhibit a high level of overconfidence with EnPLSTM having a lower $|\overline{\Delta RUL}|$. In the limit of low confidence level, both PLSTM and EnLSTM have similar $|\overline{\Delta RUL}|$. However, as EnPLSTM also accounts for epistemic uncertainty, $|\overline{\Delta RUL}|$ of EnPLSTM decreases significantly with an increase in the expected confidence level diverging from the $|\overline{\Delta RUL}|$ of PLSTM. The proposed method exhibits the lowest prediction error, indicating that the uncertainty estimates from the proposed model are better calibrated.

Table 6 (see FIG. 21A and FIG. 21B) lists the FPT and EOL for all bearings while also listing the RMSE and wtRMSE values for all the methods used for comparison. The proposed method gives minimum RMSE and wtRMSE values for most of the bearings. The cumulative RMSE and wtRMSE values shown in Table 6 for the different models is calculated similar to Eq. (D.5) where more importance is given to bearings that have larger prognostic durations. To further compare the performance of all the models across all bearings (when treated as test bearings during cross-validation), we plot the predicted RUL and true RUL for all 741 test samples.

3.3.5. Discussion on the Advantages of EnPLSTM

While Bayesian-like techniques tend to provide uncertainty around a single-mode, deep ensemble models explore diverse modes within the same function space [73]. Typically, deep ensemble models are generated with random initializations which when trained on the same training dataset, take different optimization trajectories in trying to describe the function space. In this disclosure, the function space corresponds to feature forecasting for bearing prognostics. The PLSTMs trained with different initializations have vastly dissimilar weights, as shown by the cosine similarity plot in FIG. 13A, even though the NLL loss (Eq. (11)) of each of these models is similar. Here, the cosine similarity of a pair of trained models with parameters $\theta_i$ and $\theta_j$ is defined as $(\theta_i \cdot \theta_j)/(\|\theta_i\|\ \|\theta_j\|)$. Each individual PLSTM model can therefore be hypothesized to have obtained different but related optimum modes within the function space which is also the reason for obtaining different forecast trajectories in FIG. 10A. To show this, we plot the t-Distributed Stochastic Neighbor Embedding (t-SNE) of the $$V_{0.2\omega-sf/2}^{RMS}$$

forecasts on Bearing 2_1 (cross-validation Fold-1) for three representative PLSTM models from FIG. 13A. Each datapoint on the t-SNE plot in FIG. 13B corresponds to forecasting forty time steps ahead of the current measurement. At the beginning of the training process (epoch=0), all three PLSTM models have distinct weights, a result of the random weight initialization process. After training for 80 epochs, each of the PLSTM model forecasts is observed to approach the true forecast distribution through different optimization routes (see FIG. 13B). The size of the squares in FIG. 13B is proportional to the aleatoric uncertainty in the forecast of each of the PLSTM models. The origin of epistemic uncertainty is precisely what is observed in FIG. 13C. The different model weight initializations lead to different trained models which lead to slightly different RUL predictions. The model-to-model variation in model weights and hence forecasts/RUL predictions directly quantifies the epistemic uncertainty. For samples that are outside the distribution of the training data, each PLSTM model predicts high aleatoric uncertainty which, when combined into an ensemble, provides an even larger epistemic uncertainty (FIG. 13C). When determining the RUL of bearings, if the time series describing the test bearing health condition is not seen during the training process, the proposed model would predict large uncertainties (both aleatoric and epistemic) indicating the model's lack of confidence in such an RUL prediction. In the case of a single model, there is no way to determine whether or not it has obtained a best forecast/RUL prediction, and therefore no way to quantify the epistemic uncertainty in its prediction. This is why a single data-driven model for prognostics should not be trusted.

3.3.6. Discussion on the Advantages of EnCLSTM

The EnPLSTM model often underpredicts the true RUL, especially at the beginning of bearing failure. This is true even for the bearings used to train the PLSTM as described in section 2.5.3. The main purpose of the EnCLSTM model is to correct this error and provide a more accurate RUL estimate. FIG. 14A, shows the variation of the normalized RUL error prediction obtained from one PLSTM against the feature $$V_{0.2\omega-sf/2}^{RMS}$$

for both RMS the training and testing datasets of a representative cross-validation fold, Fold-3. The circle symbol size in FIG. 14A is proportional to the uncertainty in prediction. At low $$V_{0.2\omega-sf/2}^{RMS}$$

values, indicative of the onset of bearing degradation, the predicted error and uncertainty are large. Ideally, the model error should not vary with time. However, in the case of RUL prediction, almost any model may exhibit high errors close to the FPT and then gradually increase in accuracy as the model is able to process more data over time. This is particularly true for LSTMs as they store relevant temporal information in their network architecture which is used at a later time to improve prediction accuracy. The errors in FIG. 14A exhibit a relatively clear decreasing trend with $$V^{RMS}_{0.2\omega-sf/2},$$

and for this reason, the error can be learned by another model. Error correction, delta-learning, and residual learning [75,76] are all names for these types of models which have been proposed for the same task of correcting model predictions using learned errors. Therefore, a data mapping based correction model CLSTM would help reduce the prediction error DRUL especially when combined with a weighting function $$W\left(F = V^{RMS}_{0.2\omega-\frac{sf}{2}}\right)$$

as mentioned in Eq. (15). However, this approach would only work if the training dataset and the testing dataset have similar input/output distributions. As shown in FIG. 14A, the training dataset (black) and the test dataset (blue) are found to have similar error distributions (output of CLSTM). The error in RUL from EnPLSTM is due to the accumulated uncertainty when forecasting $$V^{RMS}_{0.2\omega-sf/2}.$$

RMS A t-SNE plot in FIG. 14B reveals that the $$V^{RMS}_{0.2\omega-sf/2}$$

feature distributions of the training and testing datasets are also similar and the symbol size, which is proportional to the uncertainty of the next step prediction $$\left(\sigma_p^{k+1} \text{ from } Fig.\ 4A,\ 4B\right),$$

also indicate that the magnitude of aleatoric uncertainties at (k+1) time step are similar across training and testing datasets. However, for samples that are out of distribution, like the artificially generated sinusoidal-like time series shown as red circles in FIG. 14B, the uncertainty is large at the (k+1) time step even from a single PLSTM model (aleatoric uncertainty). When considering an ensemble, several PLSTM model disagreements in the forecast lead to an even larger epistemic uncertainty proving the effectiveness of the ensemble method in determining non confident predictions.

The t-SNE plot in FIG. 14C compares the train and test distributions of the EnCLSTM input which consists of k=20 lookback time steps of $$V^{RMS}_{0.2\omega-sf/2}$$

and RUL predictions from EnPLSTM (see Table 3). The symbol size in FIG. 14C is proportional to the EnPLSTM RUL prediction error $RUL^{true}-RUL(\mu_{*p}\sigma_{*p})$ for the training dataset and predicted error correction $\Delta RUL(\mu_{*c}\sigma_{*c})$ for the testing dataset. FIG. 14C indicates that the EnCLSTM inputs as well the magnitude of RUL corrections of the testing dataset are similar to the training dataset. The overlapping of the two datasets in the t-SNE space is a good indication of their distribution similarity which makes the predictions from the EnCLSTM model trustworthy. We further compare the predicted $\Delta RUL(\mu_{*c}\sigma_{*c})$ to that of true RUL errors of EnPLSTM in FIG. 14D, where, the horizontal and vertical error bars correspond to variation in RUL prediction errors from the EnPLSTM and EnCLSTM models for five independent runs, respectively. Ideally, EnCLSTM would predict the exact RUL error of EnPLSTM leading to a perfect RUL prediction model. However, the predictions from EnCLSTM deviate from the ideal line, indicating the model was not able to perfectly predict the RUL error. Regardless, when compared to the EnPLSTM model (i.e. without the correction term), the EnCLSTM model provides largely improved predictions of RUL error as evidenced by a significant improvement in the overall RUL evaluation metrics for EnP/CLSTM in Table 5 (FIG. 20). Even though the EnCLSTM model provides accurate predictions of RUL error, it is still susceptible to making errant predictions because of noise in the data. The implementation of weighted correction (Eq. (15)) and temporal fusion (Eq. (17)) restrict the influence of sudden noise spikes in the error correction predictions which are sometimes observed for data-mapping models like CLSTM. Although the analysis pertaining to FIG. 14A to FIG. 14D is described for Fold-3, we find similar observations for all the crossvalidation folds giving confidence in the effectiveness of reducing the prediction error through the implementation of EnCLSTM.

4. Conclusion

High productivity demands on modern-day machinery require intelligent solutions to avoid machine downtime and prevent catastrophic failures. In this disclosure, we present an ensemble approach to bearing prognostics that not only provides probabilistic RUL predictions but is also lightweight, making it suitable for embedding on IIoT platforms. To make our work more industrially relevant, we adopt the ISO standards for defining bearing failure, which is established in the velocity domain. We also incorporate physics by capturing energy-based features in the velocity domain (in the form of RMS) that reflect both characteristic bearing fault frequencies and overall bearing health. Unlike purely data-driven algorithms, the inclusion of bearing failure physics has the potential to generalize our approach to other bearings in different working conditions. The proposed algorithm is built upon a vanilla LSTM model with an added Gaussian layer to forecast an RMS feature (obtained from the velocity domain) while also obtaining the aleatoric uncertainty of such a forecast. The proposed algorithm consists of three major steps: (1) a predictor step PLSTM, where the feature is forecasted to a certain threshold by doing a one-step-ahead prediction and marching in time, (2) a corrector step CLSTM, which offsets the RUL prediction obtained from the predictor step and (3) temporal fusion, which effectively smoothens the RUL prediction based on the recent history of predictions. The proposed algorithm also uses an ensemble approach EnP/CLSTM because the limited amount of available bearing run-to-failure data causes deep learning models to train differently every time. By combining RUL predictions from models with a similar architecture that have been trained on the same dataset but with different initial conditions, we can capture the epistemic uncertainty in our predictions. Using a publicly available dataset, we show the superiority of our proposed model, in terms of accuracy as well as uncertainty quantification, when compared to other traditional models such as particle filter, similarity-based approaches, CNN-RUL correlation, Bayesian-like MC Dropout, and simple regression techniques. The proposed EnP/CLSTM model reduces the RMSE and wtRMSE by at least 50% when compared to Bayesian-like MC Dropout. To compare the uncertainty capability of models we introduce α-accuracy, β probability, and percentage of early prediction (PEP) metrics. The proposed model ensures around 50% of the RUL prediction points lie within the 30% α-accuracy region which is superior to all other models. In general, the LSTM-based models make conservative RUL predictions with high PEP. The proposed method has one order of magnitude faster execution time when compared to MC Dropout making it feasible for IIoT applications. The proposed predictive approach was developed with an IIoT deployment in mind, such as for a GraceSense™ Vibration & Temperature Node available from Grace Technologies, Inc. The main benefit of this embedded deployment is to reduce the need to wirelessly transmit raw acceleration data—in exchange for a small amount of additional computational capability and time. In a GraceSense™ node deployment, this results in a greater than 10,000× reduction in transmission requirements, which eliminates problems stemming from overcrowding of the 2.4 GHz band in industrial facilities and can allow a vibration node to predict the remaining useful life of a bearing once per hour for up to five years without needing a change of battery. This represents at least a 50× improvement in battery life for this node.

5. Options, Variations and Alternatives

In some embodiments the models may be implemented by a sensor module such as may be used to monitor industrial equipment within an industrial environment such as manufacturing, production, or other types of industrial environments. As shown in FIG. 15 a sensor unit is shown with a sensor housing. A battery may be disposed within the sensor housing. Alternatively, power may be supplied otherwise such as through a power interface (not shown). In some embodiments power may be provided through the network interface. The sensor module has one or more sensors which may include one or more accelerometers used to measure vibration data or any other sensors or combination of sensors which may be used in monitoring equipment health or status or other sensor data which may be used in predicting remaining life such as environment data. The one or more sensors may be operatively connected to a processor of a computing device. The computing device may further include a non-transitory machine-readable memory. A model such as those shown and described herein may be stored within the memory such as in a set of instructions which when executed by the processor implement the model. Output from the model may be communicated over the network interface to a remote device for reporting, display to an operator, or otherwise presenting the output or performing an action based on the output. Where a network interface is present, the network interface may be a wired interface, a wireless interface or other type of interface.

Although the models have been specifically applied in the context of bearings, it is to be understood that the present disclosure is not to be limited this specific example of industrial equipment but may be applied to other types of industrial equipment. It is noted, however, that bearing failures are highly impactful. Where machine data includes vibrations other types of predictions include: the need for lubrication, the need to change tools in CNC or other cutting operations; mechanical looseness like soft footing; shaft issues such as alignment problems, unbalance, eccentricity, and bent shaft; gearbox problems like tooth chipping and gear mesh alignment. In addition, where machine data does not necessarily include vibration data applications include determining the need for lubrication, the need to change tools in CNC or cutting operations, the need for cleaning or other general maintenance, and the formation of hotspots in electrical busbar. Of course, these are a merely a few of many different applications.

Although various methods, apparatus, and systems have been described throughout, it is to be understood that the present invention contemplates numerous options, variations, and alternatives as may be appropriate for use with a particular industrial machine and its component parts, failure modes for the industrial machine, the operating environment for the industrial machine, the type, number and placement of sensors, available computing resources, availability of training data, or other situations.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment or example.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments may be described herein as implementing mathematical methodologies including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. Where the term "processor" is used, it is to be understood that it encompasses one or more processors whether located together or remote from one other.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location. In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment or example.

The invention is not to be limited to the particular embodiments described herein. In particular, the invention contemplates numerous variations in the specific methodology used and structures provided as described herein. The foregoing description has been presented for purposes of illustration and description. It is not intended to be an exhaustive list or limit any of the invention to the precise forms disclosed. It is contemplated that other alternatives or exemplary aspects are considered included in the invention. The description is merely examples of embodiments, processes, or methods of the invention. It is understood that any other modifications, substitutions, and/or additions can be made, which are within the intended spirit and scope of the invention.

REFERENCES

[1] Y. Lei, N. Li, L. Guo, N. Li, T. Yan, J. Lin, Machinery health prognostics: a systematic review from data acquisition to RUL prediction, Mech. Syst. Signal Process. 104 (2018) 799-834, https://doi.org/10.1016/j.ymssp.2017.11.016.

[2] J. Z. Sikorska, M. Hodkiewiez, L. Ma, Prognostic modelling options for remaining useful life estimation by industry, Mech. Syst. Signal Process. 25 (5) (2011) 1803-1836, https://doi.org/10.1016/j.ymssp.2010.11.018.

[3] M. Kordestani, M. Saif, M. E. Orchard, R. Razavi-Far, K. Khorasani, Failure prognosis and applications—a survey of recent literature, IEEE Trans. Reliab. 70 (2) (2021) 728-748, https://doi.org/10.1109/TR.2019.2930195.

[4] M. Behzad, H. A. Arghan, A. R. Bastami, M. J. Zuo, Prognostics of rolling element bearings with the combination of Paris law and reliability method, in: 2017 Prognostics an System Health Management Conference (PHM-Harbin), 2017, pp. 1-6, https://doi.org/10.1109/PHM.2017.8079187.

[5] J. Wu, C. Wu, S. Cao, S. W. Or, C. Deng, X. Shao, Degradation data-driven timeto-failure prognostics approach for rolling element bearings in electrical machines, IEEE Trans. Ind. Electron. 66 (1) (2019) 529-539, https://doi.org/10.1109/TIE.2018.2811366.

[6] D. Wang, K. Tsui, Statistical modeling of bearing degradation signals, IEEE Trans. Reliab. 66 (4) (2017) 1331-1344, https://doi.org/10.1109/TR.2017.2739126.

[7] M. Sadoughi, C. Hu, Physics-based convolutional neural network for fault diagnosis of rolling element bearings, IEEE Sens. J. 19 (11) (2019) 4181-4192, https://doi.org/10.1109/JSEN.736110.1109/JSEN.2019.2898634.

[8] S. Shen, H. Lu, M. Sadoughi, C. Hu, V. Nemani, A. Thelen, K. Webster, M. Darr, J. Sidon, S. Kenny, A physics-informed deep learning approach for bearing fault detection, Eng. Appl. Artif. Intell. 103 (2021) 104295, https://doi.org/10.1016/j.engappai.2021.104295.

[9] W. K. Yu, T. A. Harris, A new stress-based fatigue life model for ball bearings, Tribol. Trans. 44 (1) (2001) 11-18, https://doi.org/10.1080/10402000108982420.

[10] A. Muetze, E. G. Strangas, The useful life of inverter-based drive bearings: methods and research directions from localized maintenance to prognosis, IEEE Ind. Appl. Mag. 22 (4) (2016) 63-73, https://doi.org/10.1109/MIAS.2015.2459117.

[11] R. K. Singleton, E. G. Strangas, S. Aviyente, Extended Kalman Filtering for Remaining-Useful-Life Estimation of Bearings, IEEE Trans. Ind. Electron. 62 (3) (2015) 1781-1790, https://doi.org/10.1109/TIE.2014.2336616.

[12] Y. Wang, Y. Peng, Y. Zi, X. Jin, K. Tsui, A two-stage data-driven-based prognostic approach for bearing degradation problem, IEEE Trans. Ind. Inform. 12 (3) (2016) 924-932, https://doi.org/10.1109/TII.2016.2535368.

[13] Y. Qian, R. Yan, S. Hu, Bearing degradation evaluation using recurrence quantification analysis and Kalman filter, IEEE Trans. Instrum. Meas. 63 (11) (2014) 2599-2610, https://doi.org/10.1109/TIM.2014.2313034.

[14] X. Jin, Y. Sun, Z. Que, Y. Wang, T. W. S. Chow, Anomaly detection and fault prognosis for bearings, IEEE Trans. Instrum. Meas. 65 (9) (2016) 2046-2054, https://doi.org/10.1109/TIM.2016.2570398.

[15] C. Anger, R. Schrader, and U. Klingauf, “Unscented Kalman filter with gaussian process degradation model for bearing fault prognosis,” 2012.
[16] L. Cui, X. Wang, Y. Xu, H. Jiang, J. Zhou, A novel Switching Unscented Kalman Filter method for remaining useful life prediction of rolling bearing, Measurement 135 (2019) 678-684, https://doi.org/10.1016/j.measurement.2018.12.028.
[17] X. Jin, Z. Que, Y. i. Sun, Y. Guo, W. Qiao, A data-driven approach for bearing fault prognostics, IEEE Trans. Ind. Appl. 55 (4) (2019) 3394-3401, https://doi.org/10.1109/TIA.2810.1109/TIA.2019.2907666.
[18] L. Liao, Discovering prognostic features using genetic programming in remaining useful life prediction, IEEE Trans. Ind. Electron. 61 (5) (2014) 2464-2472, https://doi.org/10.1109/TIE.2013.2270212.
[19] N. Li, Y. Lei, J. Lin, S. X. Ding, An improved exponential model for predicting remaining useful life of rolling element bearings, IEEE Trans. Ind. Electron. 62 (12) (2015) 7762-7773, https://doi.org/10.1109/TIE.2015.2455055.
[20] Y. Qian, R. Yan, R. X. Gao, A multi-time scale approach to remaining useful life prediction in rolling bearing, Mech. Syst. Signal Process. 83 (2017) 549-567, https://doi.org/10.1016/j.ymssp.2016.06.031.
[21] N. Gebraeel, M. Lawley, R. Liu, V. Parmeshwaran, Residual life predictions from vibration-based degradation signals: a neural network approach, IEEE Trans. Ind. Electron. 51 (3) (2004) 694-700, https://doi.org/10.1109/TIE.2004.824875.
[22] R. Huang, L. Xi, X. Li, C. Richard Liu, H. Qiu, and J. Lee, “Residual life predictions for ball bearings based on self-organizing map and back propagation neural network methods,” Mech. Syst. Signal Process., 21(1), pp. 193-207, January 2007, doi: 10.1016/j.ymssp.2005.11.008.
[23] F. O. Heimes, “Recurrent neural networks for remaining useful life estimation,” in 2008 International Conference on Prognostics and Health Management, October 2008, pp. 1-6. doi: 10.1109/PHM.2008.4711422.
[24] L. Guo, N. Li, F. Jia, Y. Lei, J. Lin, A recurrent neural network based health indicator for remaining useful life prediction of bearings, Neurocomputing 240 (2017) 98-109, https://doi.org/10.1016/j.neucom.2017.02.045.
[25] T. Benkedjouh, K. Medjaher, N. Zerhouni, S. Rechak, Remaining useful life estimation based on nonlinear feature reduction and support vector regression, Eng. Appl. Artif. Intell. 26 (7) (2013) 1751-1760, https://doi.org/10.1016/j.engappai.2013.02.006.
[26] T. H. Loutas, D. Roulias, G. Georgoulas, Remaining useful life estimation in rolling bearings utilizing data-driven probabilistic E-support vectors regression, IEEE Trans. Reliab. 62 (4) (2013) 821-832, https://doi.org/10.1109/TR.2013.2285318.
[27] A. Soualhi, K. Medjaher, N. Zerhouni, Bearing health monitoring based on Hilbert-Huang transform, support vector machine, and regression, IEEE Trans. Instrum. Meas. 64 (1) (2015) 52-62, https://doi.org/10.1109/TIM.2014.2330494.
[28] F. Di Maio, K. L. Tsui, E. Zio, Combining Relevance Vector Machines and exponential regression for bearing residual life estimation, Mech. Syst. Signal Process. 31 (2012) 405-427, https://doi.org/10.1016/j.ymssp.2012.03.011.
[29] B. Wang, Y. Lei, N. Li, N. Li, A hybrid prognostics approach for estimating remaining useful life of rolling element bearings, IEEE Trans. Reliab. 69 (1) (2020) 401-412, https://doi.org/10.1109/TR.2410.1109/TR.2018.2882682.
[30] Y. LeCun, Y. Bengio, and G. Hinton, “Deep learning,” Nature, 521(7553), Art. no. 7553, May 2015, doi: 10.1038/nature14539.
[31] B. Wang, Y. Lei, N. Li, T. Yan, Deep separable convolutional network for remaining useful life prediction of machinery, Mech. Syst. Signal Process. 134 (2019) 106330, https://doi.org/10.1016/j.ymssp.2019.106330.
[32] A. Z. Hinchi, M. Tkiouat, Rolling element bearing remaining useful life estimation based on a convolutional long-short-term memory network, Procedia Comput. Sci. 127 (2018) 123-132, https://doi.org/10.1016/j.procs.2018.01.106.
[33] Y. Yoo and J.-G. Baek, “A Novel Image Feature for the Remaining Useful Lifetime Prediction of Bearings Based on Continuous Wavelet Transform and Convolutional Neural Network,” Appl. Sci., 8(7), Art. no. 7, July 2018, doi: 10.3390/app8071102.
[34] L. Ren, Y. Sun, H. Wang, L. Zhang, Prediction of bearing remaining useful life with deep convolution neural network, IEEE Access 6 (2018) 13041-13049, https://doi.org/10.1109/Access.628763910.1109/ACCESS.2018.2804930.
[35] X. Li, W. Zhang, Q. Ding, Deep learning-based remaining useful life estimation of bearings using multi-scale feature extraction, Reliab. Eng. Syst. Saf. 182 (2019) 208-218, https://doi.org/10.1016/j.ress.2018.11.011.
[36] B. Wang, Y. Lei, T. Yan, N. Li, L. Guo, Recurrent convolutional neural network: A new framework for remaining useful life prediction of machinery, Neurocomputing 379 (2020) 117-129, https://doi.org/10.1016/j.neucom.2019.10.064.
[37] W. Peng, Z.-S. Ye, N. Chen, Bayesian Deep-Learning-Based Health Prognostics Toward Prognostics Uncertainty, IEEE Trans. Ind. Electron. 67 (3) (2020) 2283-2293, https://doi.org/10.1109/TIE.4110.1109/TIE.2019.2907440.
[38] M. Yuan, Y. Wu, L. Lin, Fault diagnosis and remaining useful life estimation of aero engine using LSTM neural network, in: 2016 IEEE International Conference on Aircraft Utility Systems (AUS), 2016, pp. 135-140, https://doi.org/10.1109/AUS.2016.7748035.
[39] P. Malhotra et al., “Multi-Sensor Prognostics using an Unsupervised Health Index based on LSTM Encoder-Decoder,” ArXiv160806154 Cs, August 2016, Accessed: Feb. 1, 2021. [Online]. Available: http://arxiv.org/abs/1608.06154.
[40] C.-G. Huang, H.-Z. Huang, Y.-F. Li, A bidirectional LSTM prognostics method under multiple operational conditions, IEEE Trans. Ind. Electron. 66 (11) (2019) 8792-8802, https://doi.org/10.1109/TIE.4110.1109/TIE.2019.2891463.
[41] S. Wu, Y. Jiang, H. Luo, S. Yin, Remaining useful life prediction for ion etching machine cooling system using deep recurrent neural network-based approaches, Control Eng. Pract. 109 (2021) 104748, https://doi.org/10.1016/j.conengprac.2021.104748.
[42] W. Mao, J. He, J. Tang, and Y. Li, “Predicting remaining useful life of rolling bearings based on deep feature representation and long short-term memory neural network," Adv. Mech. Eng., 10(12), p. 1687814018817184, December 2018, doi: 10.1177/1687814018817184.

[43] Y. Jiang, S. Yin, J. Dong, O. Kaynak, A review on soft sensors for monitoring, control, and optimization of industrial processes, IEEE Sens. J. 21 (11) (2021) 12868-12881, https://doi.org/10.1109/JSEN.2020.3033153.

[44] Y. Gal and Z. Ghahramani, "Dropout as a Bayesian Approximation: Representing Model Uncertainty in Deep Learning," in International Conference on Machine Learning, June 2016, pp. 1050-1059. Accessed: Nov. 5, 2020. [Online]. Available: http://proceedings.mlr.press/v48/gal16.html.

[45] J. R. Stack, T. G. Habetler, R. G. Harley, Fault classification and fault signature production for rolling element bearings in electric machines, IEEE Trans. Ind. Appl. 40 (3) (2004) 735-739, https://doi.org/10.1109/TIA.2004.827454.

[46] J. I. Taylor, The Vibration Analysis Handbook: A Practical Guide for Solving Rotating Machinery Problems. VCI, 2003.

[47] S. A. McInerny, Y. Dai, Basic vibration signal processing for bearing fault detection, IEEE Trans. Educ. 46 (1) (2003) 149-156, https://doi.org/10.1109/TE.2002.808234.

[48] "Literature Library," Rockwell Automation. https://www. rockwellautomation.com/en-us/support/documentation/literature-library. html (accessed Oct. 28, 2020).

[49] R. L. Eshleman, Basic Machinery Vibrations: An Introduction to Machine Testing, Analysis, and Monitoring, VIPress, 1999.

[50] 14:00-17:00, "ISO 10816-3:2009," ISO. https://www.iso.org/cms/render/live/en/sites/isoorg/contents/data/standard/05/05/50528.html (accessed Oct. 28, 2020).

[51] "Sensor Selection Guide." Wilcoxon Research. [Online]. Available: https://wilcoxon.com/wp-content/uploads/2018/11/TN16_Sensor-selection-guide_2018.pdf.

[52] N. Henmi, S. Takeuchi, New method using piezoelectric jerk sensor to detect rolling bearing failure, Int. J. Autom. Technol. 7 (5) (2013) 550-557, https://doi.org/10.20965/ijat.2013.p0550.

[53] D. Eager, A.-M. Pendrill, N. Reistad, Beyond velocity and acceleration: jerk, snap and higher derivatives, Eur. J. Phys. 37 (6) (2016) 065008, https://doi.org/10.1088/0143-0807/37/6/065008.

[54] H. J. Nussbaumer, The Fast Fourier Transform, in: H. J. Nussbaumer (Ed.), Fast Fourier Transform and Convolution Algorithms, Springer, Berlin, Heidelberg, 1981, pp. 80-111, https://doi.org/10.1007/978-3-662-00551-4_4.

[55] J. M. Bernardo, A. F. M. Smith, Bayesian Theory, John Wiley & Sons, 2009.

[56] B. Lakshminarayanan, A. Pritzel, C. Blundell, Simple and scalable predictive uncertainty estimation using deep ensembles, Adv. Neural Inf. Process. Syst. 30 (2017) 6402-6413.

[57] J. Gu et al., "Recent Advances in Convolutional Neural Networks," ArXiv151207108 Cs, October 2017, Accessed: Dec. 31, 2020. [Online]. Available: http://arxiv.org/abs/1512.07108.

[58] N. Q. K. Le, Q.-T. Ho, E. K. Y. Yapp, Y.-Y. Ou, H.-Y. Yeh, DeepETC: A deep convolutional neural network architecture for investigating and classifying electron transport chain's complexes, Neurocomputing 375 (2020) 71-79, https://doi.org/10.1016/j.neucom.2019.09.070.

[59] J. N. Sua, S. Y. Lim, M. H. Yulius, X. Su, E. K. Y. Yapp, N. Q. K. Le, H.-Y. Yeh, M. C. H. Chua, Incorporating convolutional neural networks and sequence graph transform for identifying multilabel protein Lysine PTM sites, Chemom. Intell. Lab. Syst. 206 (2020) 104171, https://doi.org/10.1016/j.chemolab.2020.104171.

[60] T. Wang, Jianbo Yu, D. Siegel, and J. Lee, "A similarity-based prognostics approach for Remaining Useful Life estimation of engineered systems," in: 2008 International Conference on Prognostics and Health Management, October 2008, pp. 1-6. doi: 10.1109/PHM.2008.4711421.

[61] P. Wang, B. D. Youn, C. Hu, A generic probabilistic framework for structural health prognostics and uncertainty management, Mech. Syst. Signal Process. 28 (2012) 622-637, https://doi.org/10.1016/j.ymssp.2011.10.019.

[62] C. Hu, B. D. Youn, P. Wang, and J. Taek Yoon, "Ensemble of data-driven prognostic algorithms for robust prediction of remaining useful life," Reliab. Eng. Syst. Saf., vol. 103, pp. 120-135, July 2012, doi: 10.1016/j.ress.2012.03.008.

[63] C. Hu, B. D. Youn, and P. Wang, "Time-Dependent Reliability Analysis in Operation: Prognostics and Health Management," in: C. Hu, B. D. Youn, and P. Wang, (Eds.) Engineering Design under Uncertainty and Health Prognostics, Cham: Springer International Publishing, 2019, pp. 233-301. doi: 10.1007/978-3-319-92574-5_8.

[64] N. J. Gordon, D. J. Salmond, A. F. M. Smith, Novel approach to nonlinear/non-Gaussian Bayesian state estimation, IEE Proc. F Radar Signal Process. 140 (2) (April 1993) 107-113, https://doi.org/10.1049/ip-f-2.1993.0015.

[65] J. Deutsch, M. He, and D. He, "Remaining Useful Life Prediction of Hybrid Ceramic Bearings Using an Integrated Deep Learning and Particle Filter Approach," Appl. Sci., 7(7), Art. no. 7, July 2017, doi: 10.3390/app7070649.

[66] Y. Chang, H. Fang, A hybrid prognostic method for system degradation based on particle filter and relevance vector machine, Reliab. Eng. Syst. Saf. 186 (June 2019) 51-63, https://doi.org/10.1016/j.ress.2019.02.011.

[67] Y. Qian, R. Yan, Remaining useful life prediction of rolling bearings using an enhanced particle filter, IEEE Trans. Instrum. Meas. 64 (10) (October 2015) 2696-2707, https://doi.org/10.1109/TIM.2015.2427891.

[68] G. G. Rigatos, Particle filtering for state estimation in nonlinear industrial systems, IEEE Trans. Instrum. Meas. 58 (11) (2009) 3885-3900, https://doi.org/10.1109/TIM.2009.2021212.

[69] A. Saxena et al., "Metrics for evaluating performance of prognostic techniques," in 2008 International Conference on Prognostics and Health Management, October 2008, pp. 1-17. doi: 10.1109/PHM.2008.4711436.

[70] D. Roman, S. Saxena, V. Robu, M. Pecht, and D. Flynn, "Machine learning pipeline for battery state-of-health estimation," Nat. Mach. Intell., 3(5), Art. no. 5, May 2021, doi: 10.1038/s42256-021-00312-3.

[71] W. Qian, S. Li, P. Yi, K. Zhang, A novel transfer learning method for robust fault diagnosis of rotating machines under variable working conditions, Measurement 138 (2019) 514-525, https://doi.org/10.1016/j.measurement.2019.02.073.
[72] T. e. Han, C. Liu, R. Wu, D. Jiang, Deep transfer learning with limited data for machinery fault diagnosis, Appl. Soft Comput. 103 (2021) 107150, https://doi.org/10.1016/j.asoc.2021.107150.
[73] S. Fort, H. Hu, and B. Lakshminarayanan, "Deep Ensembles: A Loss Landscape Perspective," ArXiv191202757 Cs Stat, June 2020, Accessed: Jun. 17, 2021. [Online]. Available: http://arxiv.org/abs/1912.02757.
[74] L. van der Maaten, G. Hinton, Visualizing Data using t-SNE, J. Mach. Learn. Res. 9 (86) (2008) 2579-2605.
[75] Y. Chang, H. Fang, Y. Zhang, A new hybrid method for the prediction of the remaining useful life of a lithium-ion battery, Appl. Energy 206 (2017) 1564-1578, https://doi.org/10.1016/j.apenergy.2017.09.106.
[76] K. Liu, Y. Shang, Q. Ouyang, W. D. Widanage, A data-driven approach with uncertainty quantification for predicting future capacities and remaining useful life of lithium-ion battery, IEEE Trans. Ind. Electron. 68 (4) (2021) 3170-3180, https://doi.org/10.1109/TIE.4110.1109/TIE.2020.2973876.
[77] C. Hu, G. Jain, P. Tamirisa, T. Gorka, Method for estimating capacity and predicting remaining useful life of lithium-ion battery, Appl. Energy 126 (2014) 182-189, https://doi.org/10.1016/j.apenergy.2014.03.086.
[78] C. Hu, H. Ye, G. Jain, C. Schmidt, Remaining useful life assessment of lithium-ion batteries in implantable medical devices, J. Power Sources 375 (2018) 118-130, https://doi.org/10.1016/j.jpowsour.2017.11.056.
[79] M. S. Arulampalam, S. Maskell, N. Gordon, T. Clapp, A tutorial on particle filters for online nonlinear/non-Gaussian Bayesian tracking, IEEE Trans. Signal Process. 50 (2) (2002) 174-188, https://doi.org/10.1109/78.978374.
[80] M. D. Mckay, R. J. Beckman, W. J. Conover, A comparison of three methods for selecting values of input variables in the analysis of output from a computer code, Technometrics 21 (2) (1979) 239-245, https://doi.org/10.2307/1268522.
[81] T. Li, M. Bolic, P. M. Djuric, Resampling methods for particle filtering: classification, implementation, and strategies, IEEE Signal Process. Mag. 32 (3) (2015) 70-86, https://doi.org/10.1109/MSP.7910.1109/MSP.2014.2330626.
[82] W. Ahmad, S. A. Khan, M. M. M. Islam, J.-M. Kim, A reliable technique for remaining useful life estimation of rolling element bearings using dynamic regression models, Reliab. Eng. Syst. Saf. 184 (2019) 67-76, https://doi.org/10.1016/j.ress.2018.02.003.
[83] B. Wang, Y. Lei, N. Li, and J. Lin, "An improved fusion prognostics method for remaining useful life prediction of bearings," in: 2017 IEEE International Conference on Prognostics and Health Management (ICPHM), June 2017, pp. 18-24. doi: 10.1109/ICPHM.2017.7998300.

What is claimed is:

1. A method for predicting remaining useful life for industrial equipment, the method comprising:

monitoring machine sensor data for the industrial equipment in an industrial environment using at least one sensor;

applying a two-tier model implemented by a computing device by executing a set of instructions from a non-transitory machine readable memory using a processor of the computing device; and wherein the two-tier model receives as input sensor data comprising the machine sensor data and applies physics of failure of the industrial equipment to determine a prediction for remaining useful life for the industrial equipment, uncertainty in the prediction for the remaining useful life for the industrial equipment, and an explanation to the prediction for the remaining useful life for the industrial equipment;

wherein the explanation is generated by the two-tier model from the sensor data and identifies at least one sensor event detected during operation of the industrial equipment and at least one physics-based failure mode characterization associated with the at least one sensor event.

2. The method of claim 1 wherein the two-tier model comprises a forecast tier and a classification tier.

3. The method of claim 1 wherein the explanation to the remaining useful life for the industrial equipment is based on sensor events detected during operation of the industrial equipment in the industrial environment that correspond to the physics-based characterizations of that type of industrial equipment failure, wherein the sensor events comprise detectable changes in the machine sensor data associated with onset or progression of an identified failure mode.

4. The method of claim 3 wherein the physics-based characterizations of the industrial equipment failure are physics-based characteristic fault frequencies corresponding to the identified failure mode of the industrial equipment.

5. The method of claim 1 wherein the industrial equipment comprises a bearing.

6. The method of claim 5 wherein the bearing is a rolling element bearing.

7. The method of claim 6 wherein the machine sensor data further comprises shaft rotation speed and loading conditions associated with the rolling element bearing.

8. The method of claim 1 wherein the two-tier model comprises a physics-based deep learning method.

9. The method of claim 8 wherein the two-tier model is an ensemble model.

10. The method of claim 9 wherein the ensemble model is a two-stage Long Short-Term Memory (LSTM) model ensemble.

11. The method of claim 1 wherein the machine sensor data comprises vibration data and the at least one sensor comprises an accelerometer.

12. A sensor module comprising a housing, the at least one sensor, the computing device disposed within the housing, and the non-transitory machine readable memory disposed within the housing and configured for performing the method of claim 1.

13. The sensor module of claim 12 further comprising a battery disposed within the housing and wherein the sensor module is powered by the battery.

14. A sensor module for predicting remaining useful life for industrial equipment in an industrial environment, the sensor module comprising:

a sensor housing;

a processor disposed within the sensor housing;

at least one sensor for sensing machine data for the industrial equipment, the at least one sensor operatively connected to the processor; and wherein the processor is configured to:

apply a two-tier model which receives as input sensor data comprising the machine data and applies physics of failure of the industrial equipment to determine a prediction for remaining useful life for the industrial equipment, uncertainty in the prediction for the remaining useful life for the industrial equipment, and an explanation to the prediction for the remaining useful life for the industrial equipment, wherein the explanation is generated by the two-tier model from the sensor data and identifies at least one sensor event detected during operation of the industrial equipment and at least one physics-based failure mode characterization associated with the at least one sensor event.

15. The sensor module of claim 14 wherein the two-tier model comprises a forecast tier and a classification tier.

16. The sensor module of claim 15 wherein the two-tier model comprises a physics-based deep learning method.

17. The sensor module of claim 14 wherein the model is a two-stage Long Short-Term Memory (LSTM) model ensemble.

18. The sensor module of claim 14 wherein the industrial equipment comprises a bearing.

19. The sensor module of claim 18 wherein the bearing is a rolling element bearing.

20. The sensor module of claim 19 wherein the sensor data further comprises shaft rotation speed and loading conditions associated with the rolling element bearing.

21. The sensor module of claim 14 wherein the machine data comprises vibration data.

22. The sensor module of claim 14 wherein the at least one sensor comprises at least one accelerometer for sensing vibration data.

23. The sensor module of claim 14 further comprising a network interface operatively connected to the processor and wherein the sensor module is configured to communicate output from the model through the network interface.

24. The sensor module of claim 23 wherein the network interface is a wireless network interface.

25. The sensor module of claim 14 further comprising a battery disposed within the sensor housing and wherein the sensor module is powered by the battery.

26. A method for predicting remaining useful life for industrial equipment, the method comprising:

monitoring machine sensor data for the industrial equipment in an industrial environment using at least one sensor module comprising a computing device having a non-transitory machine readable memory, at least one sensor and a processor, the at least one sensor comprising at least one accelerometer for sensing machine vibration data;

applying a two-tier model implemented by the computing device by executing a set of instructions from a non-transitory machine readable memory using a processor of the computing device of the sensor module, wherein the two-tier model comprises a physics-based deep learning method and is a two-stage Long Short-Term Memory (LSTM) model ensemble, and wherein the two-tier model receives as input sensor data comprising the machine sensor data and applies physics of failure of the industrial equipment to determine output comprising a prediction for remaining useful life for the industrial equipment, uncertainty in the prediction for the remaining useful life for the industrial equipment, and an explanation to the prediction for the remaining useful life for the industrial equipment, wherein the explanation is generated by the two-tier model from the sensor data and identifies at least one sensor event detected during operation of the industrial equipment and at least one physics-based failure mode characterization associated with the at least one sensor event; and communicating the output from the at least one sensor module to a computer having a user interface for conveying the output to a user.

* * * * *